US008958911B2

(12) United States Patent
Wong et al.

(10) Patent No.: US 8,958,911 B2
(45) Date of Patent: Feb. 17, 2015

(54) MOBILE ROBOT

(75) Inventors: Cheuk Wah Wong, Bedford, MA (US);
Eben Rauhut, Watertown, MA (US);
Brian C. Benson, Winchendon, MA (US); Peter J. Lydon, Peabody, MA (US); Michael T. Rosenstein, Westford, MA (US); Michael Halloran, Waltham, MA (US); Steven V. Shamlian, Watertown, MA (US); Chikyung Won, Tewksbury, MA (US); Mark Chiappetta, Chelmsford, MA (US); Justin H. Kearns, Somerville, MA (US); Orjeta Taka, Bedford, MA (US); Robert Todd Pack, Hollis, NH (US); Timothy S. Farlow, Billerica, MA (US); Jasper Fourways Vicenti, Medford, MA (US)

(73) Assignee: iRobot Corporation, Bedford, MA (US)

( * ) Notice: Subject to any disclaimer, the term of this patent is extended or adjusted under 35 U.S.C. 154(b) by 171 days.

(21) Appl. No.: 13/555,529

(22) Filed: Jul. 23, 2012

(65) Prior Publication Data
US 2013/0226344 A1    Aug. 29, 2013

Related U.S. Application Data

(60) Provisional application No. 61/604,794, filed on Feb. 29, 2012, provisional application No. 61/669,416, filed on Jul. 9, 2012.

(51) Int. Cl.
*B25J 9/16* (2006.01)
*G05D 1/02* (2006.01)

(52) U.S. Cl.
CPC .............. *B25J 9/1694* (2013.01); *Y10S 901/09* (2013.01); *Y10S 901/46* (2013.01); *Y10S 901/01* (2013.01); *G05D 1/024* (2013.01); *G05D 2201/0206* (2013.01); *G05D 2201/0211* (2013.01)
USPC ..................... 700/258; 901/1; 901/9; 901/46

(58) Field of Classification Search
CPC .............. G05D 1/0242; G05D 1/0251; G05D 2201/0211; G05D 2201/0206; G05D 1/0038; B25J 19/023; B25J 9/1694; B25J 9/1697; B25J 11/009; Y10S 901/09; Y10S 901/46; Y10S 901/01; G06F 19/3406; G06F 19/3418; G06K 9/00201; G06T 2207/10028
USPC ......... 700/247, 250, 252, 253, 255, 258, 259; 901/1, 46

See application file for complete search history.

(56) References Cited

U.S. PATENT DOCUMENTS 4,710,020 A * 12/1987 Maddox et al. .............. 356/3.13
4,772,875 A *  9/1988 Maddox et al. ............... 340/522

(Continued)

FOREIGN PATENT DOCUMENTS

JP    10143243 A    5/1998
JP    2000289985 A    10/2000

(Continued)

OTHER PUBLICATIONS

Australian examination report for related Application No. 2011256720 dated Mar. 27, 2014.

(Continued)

*Primary Examiner* — Jason Holloway
(74) *Attorney, Agent, or Firm* — Honigman Miller Schwartz and Cohn LLP

(57) ABSTRACT

A mobile robot including a robot body, a drive system supporting the robot body, and a controller in communication with the drive system. The robot also includes an actuator moving a portion of the robot body through a volume of space adjacent the mobile robot and a sensor pod in communication with the controller. The sensor pod includes a collar rotatably supported and having a curved wall formed at least partially as a surface of revolution about a vertical axis. The sensor pod also includes a volumetric point cloud sensor housed by the collar and observing the volume of space adjacent the robot from within the collar along an observation axis extending through the curved wall. A collar actuator rotates the collar and the volumetric point cloud sensor together about the collar axis.

25 Claims, 44 Drawing Sheets

(56) References Cited

U.S. PATENT DOCUMENTS

| | | | |
|---|---|---|---|
| 4,954,962 A * | 9/1990 | Evans, Jr. et al. | 701/28 |
| 5,202,661 A * | 4/1993 | Everett, Jr. et al. | 340/522 |
| 5,453,931 A * | 9/1995 | Watts, Jr. | 701/23 |
| 5,758,298 A * | 5/1998 | Guldner | 701/23 |
| 6,108,031 A | 8/2000 | King et al. | |
| 6,323,942 B1 | 11/2001 | Bamji | |
| 6,480,762 B1 | 11/2002 | Uchikubo et al. | |
| 6,515,740 B2 | 2/2003 | Bamji et al. | |
| 6,535,793 B2 | 3/2003 | Allard | |
| 7,115,849 B2 | 10/2006 | Dowski, Jr. et al. | |
| 7,158,317 B2 | 1/2007 | Ben-Eliezer et al. | |
| 7,340,077 B2 | 3/2008 | Gokturk et al. | |
| 7,433,024 B2 | 10/2008 | Garcia et al. | |
| 7,706,917 B1 * | 4/2010 | Chiappetta et al. | 700/245 |
| 7,885,738 B2 * | 2/2011 | Park et al. | 701/23 |
| 8,396,611 B2 | 3/2013 | Phillips et al. | |
| 8,401,275 B2 | 3/2013 | Wang et al. | |
| 8,532,823 B2 | 9/2013 | Mcelroy et al. | |
| 8,577,517 B2 | 11/2013 | Phillips et al. | |
| 8,594,844 B1 | 11/2013 | Gal | |
| 2001/0037163 A1 | 11/2001 | Allard | |
| 2003/0216834 A1 | 11/2003 | Allard | |
| 2006/0095170 A1 | 5/2006 | Yang et al. | |
| 2007/0100498 A1 * | 5/2007 | Matsumoto et al. | 700/245 |
| 2008/0106746 A1 | 5/2008 | Shpunt et al. | |
| 2008/0201014 A1 * | 8/2008 | Sonoura | 700/250 |
| 2008/0240502 A1 | 10/2008 | Freedman et al. | |
| 2009/0055023 A1 * | 2/2009 | Walters et al. | 700/259 |
| 2009/0096783 A1 | 4/2009 | Shpunt et al. | |
| 2009/0185274 A1 | 7/2009 | Shpunt | |
| 2009/0226113 A1 * | 9/2009 | Matsumoto et al. | 382/284 |
| 2010/0011523 A1 | 1/2010 | Larkowski et al. | |
| 2010/0020078 A1 | 1/2010 | Shpunt | |
| 2010/0034457 A1 | 2/2010 | Berliner et al. | |
| 2010/0118123 A1 | 5/2010 | Freedman et al. | |
| 2011/0264303 A1 | 10/2011 | Lenser et al. | |
| 2011/0288684 A1 * | 11/2011 | Farlow et al. | 700/264 |
| 2012/0185094 A1 * | 7/2012 | Rosenstein et al. | 700/259 |
| 2013/0013108 A1 | 1/2013 | Jacobsen et al. | |
| 2014/0247261 A1 | 9/2014 | Lenser et al. | |

FOREIGN PATENT DOCUMENTS

| | | | |
|---|---|---|---|
| JP | 200285305 A | 3/2002 | |
| JP | 2008004078 A | 1/2008 | |
| JP | 2009123061 A | 6/2009 | |
| JP | 2009217363 A | 9/2009 | |
| WO | WO-03102706 A1 | 12/2003 | |
| WO | WO-2007041295 A2 | 4/2007 | |
| WO | WO-2010120707 A1 | 10/2010 | |
| WO | WO-2011146254 A2 | 11/2011 | |
| WO | WO-2011146259 A2 | 11/2011 | |

OTHER PUBLICATIONS

Freire E. O., et al. "Prototyping a wheeled mobile robot embedding multiple sensors and agent-based control system", PROC. 43rd IEEE Midwest Symp. on Circuits and Systems, vol. 2, Aug. 8, 2000 (Sep. 8, 2000), pp. 926-929.

International Search Report and Written Opinion for Application No. PCT/US2013/028208 dated Jul. 9, 2013.

Canadian Office Action for related Application No. 2,800,372 dated Apr. 2, 2014.

Binotto A P D et al: "Real-time taks reconfiguration support applied to an UAV-based surveillance system", Computer Science and Information Technology, 2008. IMCSIT 2008. International Multiconference on, IEEE, Piscataway, NJ, USA, Oct. 20, 2008, pp. 581-588, XP031406238, ISBN: 978-83-60810-14-9.

International Search Report for application No. PCT/US2011/059863 dated Nov. 22, 2012.

Translation of Japanese Office Action for Application No. 2013-547475 dated Dec. 16, 2013.

Se, S.; Lowe, David G.; Little, J. (2001). "Vision-based mobile robot localization and mapping using scale-invariant features". *Proceedings of the IEEE International Conference on Robotics and Automation (ICRA)*. 2. pp. 2051.

Rothganger, F; S. Lazebnik, C. Schmid, and J. Ponce: 2004. 3D Object Modeling and Recognition Using Local Affine-Invariant Image Descriptors and Multi-View Spatial Constraints, ICCV.

Laptev, Ivan and Lindeberg, Tony (2004). "Local descriptors for spatio-temporal recognition". *ECCV'04 Workshop on Spatial Coherence for Visual Motion Analysis, Springer Lecture Notes in Computer Science*, vol. 3667. pp. 91-103.

Ivan Laptev, Barbara Caputo, Christian Schuldt and Tony Lindeberg (2007). "Local velocity-adapted motion events for spatio-temporal recognition". *Computer Vision and Image Understanding* 108: 207-229; Scovanner, Paul.

Ali, S; Shah, M (2007). "A 3-dimensional sift descriptor and its application to action recognition". *Proceedings of the 15th International Conference on Multimedia.* pp. 357-360.

Iryna Gordon and David G. Lowe, "What and where: 3D object recognition with accurate pose," *Toward Category-Level Object Recognition*, (Springer-Verlag, 2006), pp. 67-82.

Niebles, J. C. Wang, H. and Li, Fei-Fei (2006). "Unsupervised Learning of Human Action Categories Using Spatial-Temporal Words". *Proceedings of the British Machine Vision Conference (BMCV)*. Edinburgh.

Green et al., "Telepresence Surgery," 1995, IEEE, p. 324-329.

Mair, "The Technology and its Economic and Social Implications," 1997, IEEE, p. 118-124.

Shimoga et al., "Touch and Force Reflection for Telepresence Surgery," 1994, IEEE, p. 1049-1050.

\* cited by examiner

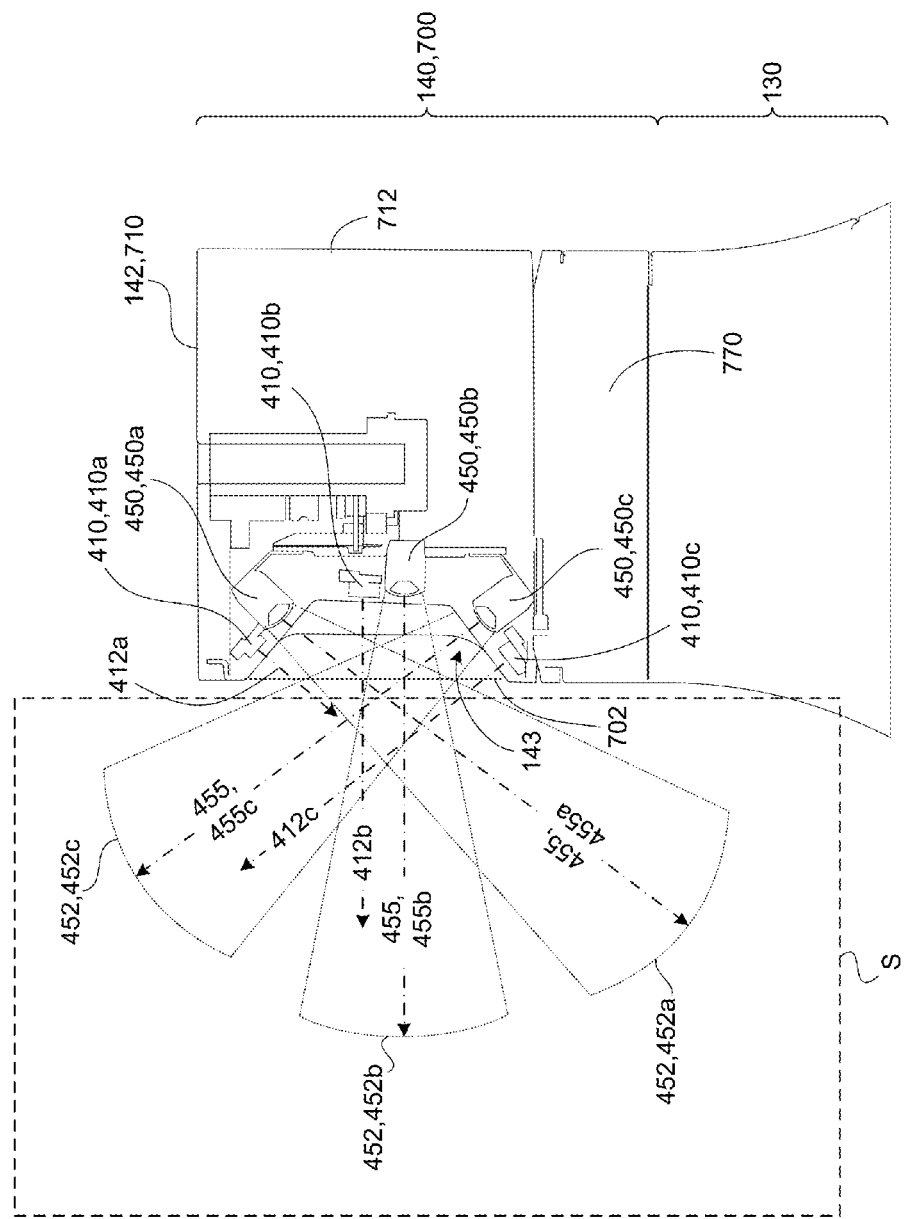

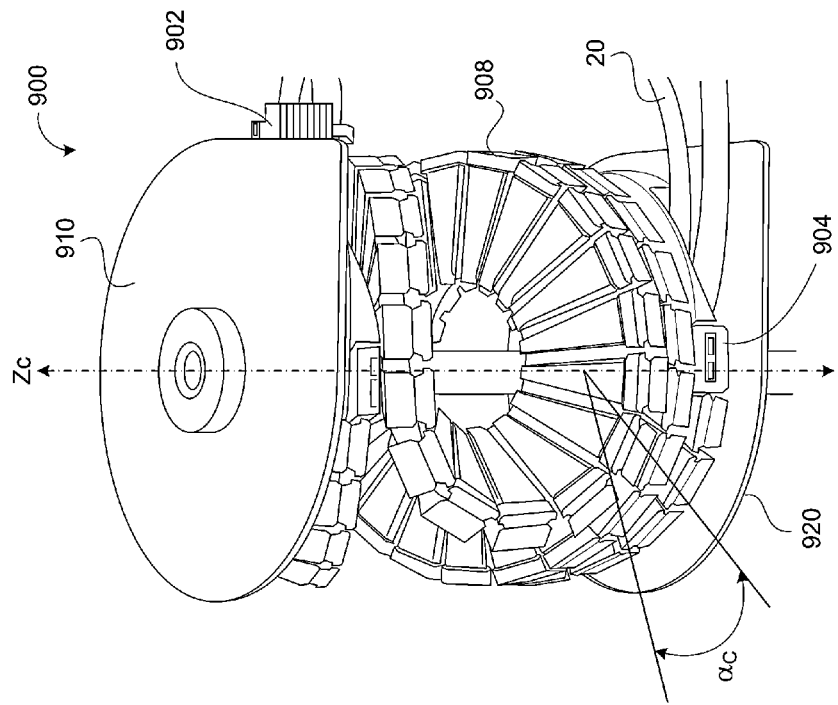
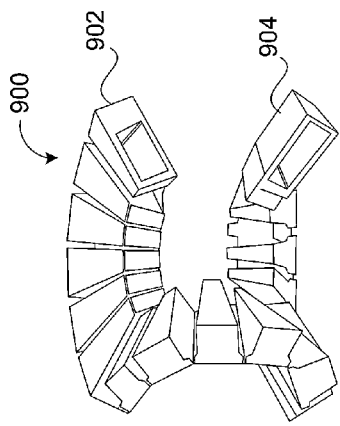
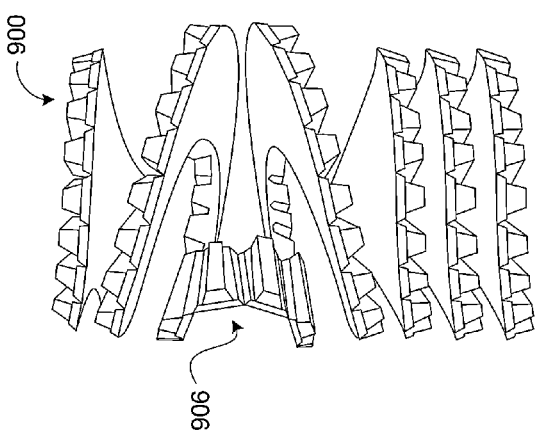
FIG. 9C
FIG. 9A
FIG. 9B

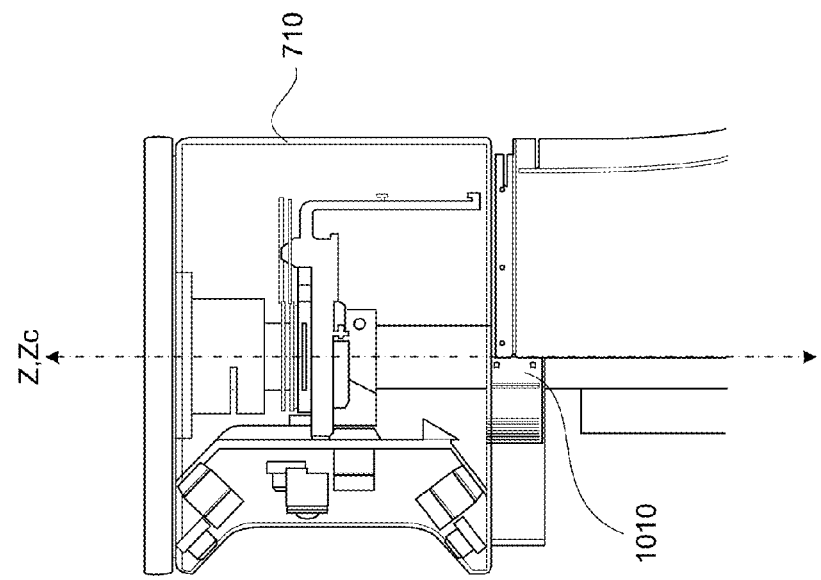
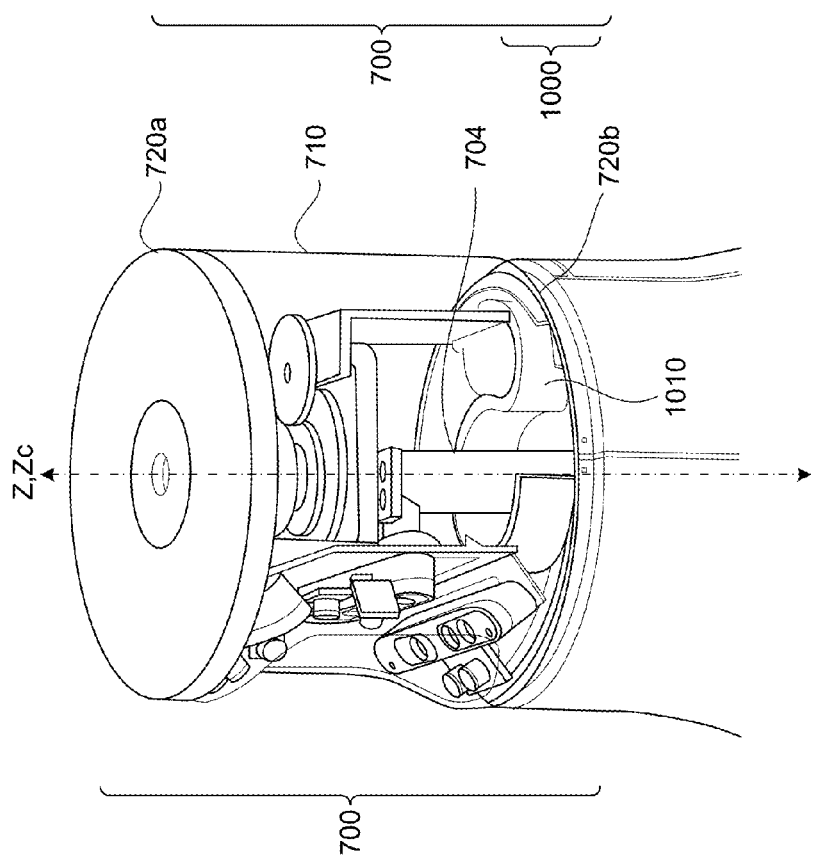
FIG. 10B
FIG. 10A

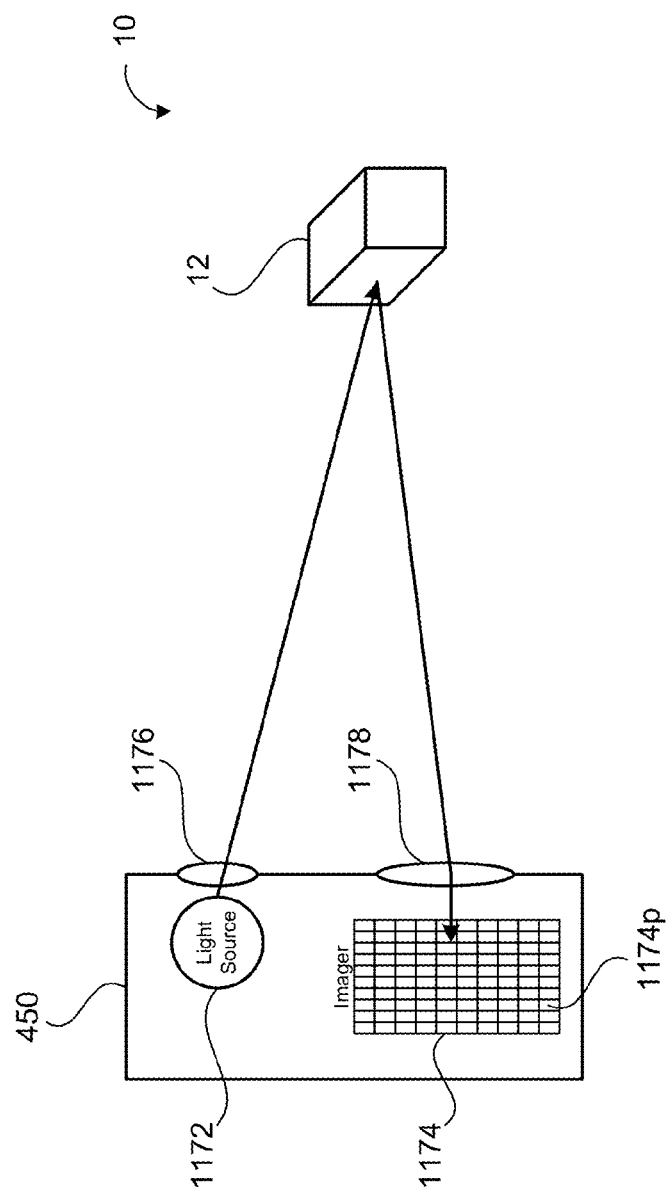

MOBILE ROBOT

CROSS REFERENCE TO RELATED APPLICATIONS

This U.S. patent application claims priority under 35 U.S.C. §119(e) to U.S. Provisional Application 61/604,794, filed on Feb. 29, 2012; and U.S. Provisional Application 61/669,416, filed on Jul. 9, 2012. The disclosures of these prior applications are considered part of the disclosure of this application and are hereby incorporated by reference in their entireties.

TECHNICAL FIELD

This disclosure relates to mobile robots.

BACKGROUND

A robot is generally an electro-mechanical machine guided by a computer or electronic programming. Mobile robots have the capability to move around in their environment and are not fixed to one physical location. An example of a mobile robot that is in common use today is an automated guided vehicle or automatic guided vehicle (AGV). An AGV is generally a mobile robot that follows markers or wires in the floor, or uses a vision system or lasers for navigation. Mobile robots can be found in industry, military and security environments. They also appear as consumer products, for entertainment or to perform certain tasks like vacuum cleaning and home assistance.

Some robots may use a variety of sensors to obtain data about its surrounding environment, for example, for navigation or obstacle detection and obstacle avoidance. A spinning LIDAR (light detection and ranging) sensor can be used to detect obstacle; however, it typically spins rather fast (e.g., 600 RPM to have a 10 Hz frame rate on any sector portion of the image) and is therefore generally not suitable for indoor operations. The spinning LIDAR has limited positioning on a robot. For example, its generally position on top with an unobstructed field of view, rather than in the middle of a robot, which generally has mechanical and electrical structures passing therethrough.

SUMMARY

One aspect of the disclosure provides a mobile robot including a robot body, a drive system supporting the robot body and configured to maneuver the robot over a floor surface, the drive system having a forward drive direction, and a controller in communication with the drive system. The robot also includes an actuator moving a portion of the robot body through a volume of space adjacent the mobile robot and a sensor pod in communication with the controller. The sensor pod includes a collar rotatably supported by the robot body and having a curved wall formed at least partially as a surface of revolution about a vertical axis of rotation with respect to the floor surface. The sensor pod also includes a volumetric point cloud sensor housed by the collar and observing the volume of space adjacent the robot from within the collar along an observation axis extending through the curved wall. The volumetric point cloud sensor captures three dimensional volumetric point clouds representative of obstacles within the observed volume of space. A collar actuator rotates the collar and the volumetric point cloud sensor together about the collar axis. All rotating portions of the volumetric point cloud sensor extend a lesser distance from the collar axis than an outermost point of the collar.

Implementations of the disclosure may include one or more of the following features. In some implementations, the surface of revolution of the curved wall sweeps about 360 degrees about the collar axis to form a substantially complete perimeter of the collar. The collar actuator may move the collar both clockwise and counter clockwise about the collar axis of rotation. In some examples, the sensor pod includes a shroud (e.g., infrared translucent cover) covering the rotating collar.

In some implementations, the sensor pod includes at least two volumetric point cloud sensors arranged to observe the volume of space adjacent the mobile robot from within the collar along different observation axes extending through the curved wall. Each volumetric point cloud sensors captures separate three dimensional volumetric point clouds of obstacles within the observed volume of space. The captured separate three dimensional volumetric point clouds may be of non-overlapping sub-volumes within the observed volume of space. Moreover, the observation axes of the at least two volumetric point cloud sensors are angled with respect to a plane normal to the collar axis to observe separate sub-volumes of the observed volume of space. The separate sub-volumes are displaced from one another along the collar axis by a distance greater than twice a diameter of the collar.

The observation axis of the volumetric point cloud sensor may be angled with respect to a plane normal to the collar axis to observe the volume of space adjacent the robot at a height along the collar axis that is greater than or equal to a diameter of the collar.

In some implementations, the sensor pod includes first and second volumetric point cloud sensors housed by the collar and observing a volume of space adjacent the sensor pod from within the collar along corresponding first and second observation axes extending through the curved wall. The first observation axis is different from the second observation axis. Each volumetric point cloud sensor captures three dimensional volumetric point clouds representative of obstacles within the observed volume of space.

The second volumetric point cloud sensor may be offset from a center axis of the robot by an offset distance equal to between about 0.8 and about 1.2 times an offset distance between the first volumetric point cloud sensor and the center axis of the robot. In some examples, the second volumetric point cloud sensor may be offset from the center axis of the robot by an offset distance substantially equal to an offset distance between the first volumetric point cloud sensor and the center axis of the robot. The second observation axis may be angled with respect to a plane normal to the collar axis by an angle of between about 45 degrees and about 65 degrees.

The actuator may move, with at least one degree of freedom, a manipulator or an end effector extending from the robot body into the observed volume of space. The end effector may be a display device, such as a tablet computer.

Another aspect of the disclosure provides a mobile robot that includes a robot body and a drive system supporting the robot body and configured to maneuver the robot over a floor surface. The drive system has a forward drive direction. The robot includes a controller in communication with the drive system, an actuator moving a portion of the robot body through a volume of space adjacent the robot, and a sensor pod in communication with the controller. The sensor pod includes a collar rotatably supported by the robot body and having a curved wall formed at least partially as a surface of revolution about a vertical axis of rotation with respect to the floor surface. The sensor pod also includes an infrared range sensor and a presence sensor, both housed by the collar and observing the volume of space adjacent the robot from within the collar along a corresponding observation axis extending through the curved wall. The infrared range sensor generates range value data representative of obstacles within the observed volume of space. The presence sensor generates presence value data representative of obstacles within the observed volume of space. A collar actuator rotates the collar, the infrared range sensor, and the presence sensor about the collar axis of rotation. All rotating portions of the infrared range sensor and the presence sensor extend a lesser distance from the collar axis of rotation than an outermost point of the collar.

In some implementations, the infrared range sensor is a structured-light three dimensional scanner, a time of flight camera, or a three-dimensional light detection and ranging sensor (e.g., Flash LIDAR). In some examples, the infrared range sensor includes one or more triangulation ranging sensors, such as position sensitive devices.

In some implementations, the presence sensor includes at least one of a sonar sensor, ultrasonic ranging sensor, a radar sensor, or pyrometer. Moreover, the presence sensor may sense at least one of acoustics, radiofrequency, visible wavelength light, or invisible wavelength light. The presence sensor may include a non-infrared sensor, for example, to detect obstacles having poor infrared response (e.g., angled, curved and/or specularly reflective surfaces). In some examples, the presence sensor detects a presence of an obstacle within a deadband of the infrared range sensor substantially immediately adjacent the infrared range sensor.

Yet another aspect of the disclosure provides a sensor pod that includes a collar having a curved wall formed at least partially as a surface of revolution about a collar axis. The sensor pod includes first and second volumetric point cloud sensors housed by the collar and observing a volume of space adjacent the sensor pod from within the collar along corresponding first and second observation axes extending through the curved wall. The first observation axis different from the second observation axis. Each volumetric point cloud sensor captures three dimensional volumetric point clouds representative of obstacles within the observed volume of space.

In some implementations, the observation axis of the second volumetric point cloud sensor is angled with respect to a plane normal to the collar axis and with respect to the first observation axis to observe a sub-volume of the observed volume of space displaced along the collar axis by a distance greater than or equal to a diameter of the collar. The first observation axis is angled with respect to a plane normal to the collar axis by between about 45 degrees and about 65 degrees.

The sensor pod may include a collar actuator rotating the collar and the volumetric point cloud sensors together about the collar axis. All rotating portions of the volumetric point cloud sensors extend a lesser distance from the collar axis of rotation than an outermost point of the collar. The surface of revolution of the curved wall may sweep about 360 degrees about the collar axis to form a substantially complete perimeter of the collar.

Another aspect of the disclosure provides a sensor pod that includes a first interface, a second interface spaced from the first interface, and a collar rotatably supported between the first and second interfaces. The collar has a curved wall formed at least partially as a surface of revolution about a collar axis. The sensor pod includes a volumetric point cloud sensor housed by the collar and observing the volume of space adjacent the robot from within the collar along an observation axis extending through the curved wall. The volumetric point cloud sensor captures three dimensional volumetric point clouds representative of obstacles within the observed volume of space. A collar actuator rotates the collar and the volumetric point cloud sensor together about the collar axis with respect to the first and second interfaces. A channel (e.g., a pipe) extends through the collar from the first interface to the second interface.

All rotating portions of the volumetric point cloud sensor may extend a lesser distance from the collar axis than an outermost point of the collar.

Another aspect of the disclosure provides a sensor pod that includes a first interface, a second interface spaced from the first interface, and a collar rotatably supported between the first and second interfaces. The collar has a curved wall formed at least partially as a surface of revolution about a collar axis. The sensor pod includes a volumetric point cloud sensor housed by the collar and observing the volume of space adjacent the robot from within the collar along an observation axis extending through the curved wall. The volumetric point cloud sensor captures three dimensional volumetric point clouds representative of obstacles within the observed volume of space. A collar actuator rotates the collar and the volumetric point cloud sensor together about the collar axis with respect to the first and second interfaces. A cable carrier disposed adjacent the collar and connected to one of the interfaces routes at least one cable to the rotatable collar.

In some implementations, the cable carrier includes an outer ring, an inner ring disposed concentrically with the outer ring along the collar axis, and a cable router having a first end connected to the outer ring and a second end connected to the inner ring. The cable router may wrap around the inner ring in a spiral arrangement or fold upon itself with a reverse bending radius between the outer and inner rings. The cable carrier may rotate within a range of +/−450 degrees of rotation or at least +/−270 degrees. The cable router may include interconnected links collectively maintaining a minimum bending radius of the cable router.

In some implementations, the cable carrier includes a first plate, a second plate spaced from the first plate along the collar axis, and a cable router having a first end connected to the first plate and a second end connected to the second plate. The cable router wraps around the collar axis in a clockwise direction and folds upon itself to wrap around the collar axis in a counter clockwise direction. The cable router may include interconnected links collectively maintaining a minimum bending radius of the cable router. Moreover, the cable carrier rotates within a range of +/−7000 degrees of rotation and/or may have a rotation speed up to 360 degrees per second. Lengths of cables routed by the cable carrier may be greater than or equal to three times a diameter of the collar diameter.

Another aspect of the disclosure provides a mobile robot that includes a drive system having a forward drive direction, a controller in communication with the drive system, and a volumetric point cloud imaging device supported above the drive system and directed to be capable of obtaining a point cloud from a volume of space that includes a floor plane in a direction of movement of the mobile robot. A dead zone sensor has a detection field arranged to detect an object in a volume of space undetectable by the volumetric point cloud imaging device. The controller receives point cloud signals from the imaging device and detection signals from the dead zone sensor and issues drive commands to the drive system based at least in part on the received point cloud and detection signals.

Implementations of the disclosure may include one or more of the following features. In some implementations, the dead zone sensor includes at least one of a volumetric point cloud imaging device, a sonar sensor, a camera, an ultrasonic sensor, LIDAR, LADAR, an optical sensor, and an infrared sensor. The detection field of the dead zone sensor may envelope a volume of space undetectable by the volumetric point cloud imaging device (i.e., a dead zone). In some examples, the volume of space undetectable by the volumetric point cloud imaging device is defined by a first angle, a second angle and a radius (e.g., 57°×45°×50 cm). The detection field of the dead zone sensor may be arranged between the volumetric point cloud imaging device and a detection field of the volumetric point cloud imaging device. In some examples, the dead zone sensor has a field of view extending at least 3 meters outward from the dead zone sensor. In this example, the dead zone sensor can be dual-purposed for relative short range within the dead zone and as a long range sensor for detecting objects relatively far away for path planning and obstacle avoidance.

In some implementations, the robot includes an array of dead zone sensors with at least one dead zone sensor having its detection field arranged to detect an object in the volume of space undetectable by the volumetric point cloud imaging device. The array of dead zone sensors may be arranged with their fields of view along the forward drive direction or evenly disbursed about a vertical center axis defined by the robot.

The imaging device, in some examples, emits light onto a scene about the robot and captures images of the scene along the drive direction of the robot. The images include at least one of (a) a three-dimensional depth image, (b) an active illumination image, and (c) an ambient illumination image. The controller determines a location of an object in the scene based on the images and issues drive commands to the drive system to maneuver the robot in the scene based on the object location. The imaging device may determine a time-of-flight between emitting the light and receiving reflected light from the scene. The controller uses the time-of-flight for determining a distance to the reflecting surfaces of the object.

In some implementations, the imaging device includes a light source for emitting light onto the scene and an imager for receiving reflections of the emitted light from the scene. The light source may emit the light in intermittent pulses, for example, at a first, power saving frequency and upon receiving a sensor event emits the light pulses at a second, active frequency. The sensor event may include a sensor signal indicative of the presence of an object in the scene. The imager may include an array of light detecting pixels.

The imaging device may include first and second portions (e.g., portions of one sensor or first and second imaging sensors). The first portion is arranged to emit light substantially onto the ground and receive reflections of the emitted light from the ground. The second portion is arranged to emit light into a scene substantially above the ground and receive reflections of the emitted light from the scene about the robot.

In some implementations, the imaging device includes a speckle emitter emitting a speckle pattern of light onto a scene along a drive direction of the robot and an imager receiving reflections of the speckle pattern from an object in the scene. The controller stores reference images of the speckle pattern as reflected off a reference object in the scene. The reference images are captured at different distances from the reference object. The controller compares at least one target image of the speckle pattern as reflected off a target object in the scene with the reference images for determining a distance of the reflecting surfaces of the target object. In some instances, the controller determines a primary speckle pattern on the target object and computes at least one of a respective cross-correlation and a decorrelation between the primary speckle pattern and the speckle patterns of the reference images.

To increase a lateral field of view, the imaging sensor may scan side-to-side with respect to the forward drive direction. Similarly, to increase a vertical field of view, the imaging sensor may scan up-and-down.

In some implementations, the controller ceases use of the received point cloud signals after a threshold period of time after receipt for issuing drive commands to the drive system. The controller may suspend cessation of use of the received point cloud signals upon determining the presence of an object in the volume of space undetectable by the volumetric point cloud imaging device based on the received detection signals from the dead zone sensor. Moreover, the controller may continue ceasing use of the received point cloud signals after the threshold period of time after receipt upon determining that the volume of space undetectable by the volumetric point cloud imaging device is free of any objects, for example, based on the received detection signals from the dead zone sensor.

Another aspect of the disclosure provides a mobile robot including a drive system configured to maneuver the robot over a floor surface. The drive system has a forward drive direction. The robot also includes a controller in communication with the drive system, a torso body defining a curved forward face supported above the drive system, and an array of sensors disposed on the curved forward face of the torso body. The array of sensors includes first, second, and third sensors in communication with the controller. The first sensor is arranged to aim downward and away from the robot body. The second sensor is arranged to aim away from the robot body substantially parallel with the floor surface. The third sensor is arranged to aim upward and away from the robot body.

In some implementations, at least one sensor includes an imaging sensor, such as a volumetric point cloud imaging device capable of obtaining a point cloud from a volume of space adjacent the robot. Additionally or alternatively, at least one sensor includes a sonar proximity sensor and/or an infrared proximity sensor.

The robot may include first and second imaging sensors disposed on the torso body and in communication with the controller. The first imaging sensor is arranged to aim downward and away from the robot body and the second imaging sensor is arranged to aim away from the robot body substantially parallel with the floor surface. The robot may also include a third imaging sensors disposed on the torso body and in communication with the controller. The third imaging sensor is arranged to aim upward and away from the robot body.

In some implementations, the robot includes first, second, and third proximity sensors disposed on the torso body. The first proximity sensor is arranged to aim downward and away from the robot body. The second proximity sensor is arranged to aim away from the robot substantially parallel to the floor surface. The third proximity sensor is arranged to aim upward and away from the robot. At least one proximity sensor may include a sonar sensor and/or an infrared sensor. Moreover, at least one sensor may scan side-to-side to increase a field of view of the sensor.

Another aspect of the disclosure provides a mobile robot including a robot body, a drive system supporting the robot body and configured to maneuver the robot over a floor surface, and a controller in communication with the drive system. The drive system has a forward drive direction. The robot also includes first, second, and third imaging devices disposed on the robot body and in communication with the controller. The first imaging sensor is arranged to aim downward and away from the robot body. The second imaging sensor is arranged to aim away from the robot body substantially parallel with the floor surface. The third imaging sensor is arranged to aim upward and away from the robot body.

Implementations of the disclosure may include one or more of the following features. In some implementations, the imaging sensors are disposed in a recess defined by the robot body while maintaining corresponding fields of view unobstructed by the robot body. At least one imaging sensor may be a volumetric point cloud imaging device capable of obtaining a point cloud from a volume of space adjacent the robot. Moreover, at least one imaging sensor may scan side-to-side with respect to the forward drive direction to increase a lateral field of view of the imaging sensor.

In some implementations, the robot includes first, second, and third proximity sensors disposed on the robot body. The first proximity has a sensing axis arranged substantially parallel with an imaging axis of the first imaging sensor. The second proximity has a sensing axis arranged substantially parallel with an imaging axis of the second imaging sensor. The third proximity has a sensing axis arranged substantially parallel with an imaging axis of the third imaging sensor. The first, second, and third proximity sensors may each be disposed adjacent the corresponding first, second, and third imaging sensors. In some examples, at least one proximity sensor may be a sonar sensor or an infrared sensor.

The drive system may be a holonomic drive system. In some implementations, the robot includes a base supporting the drive system, a leg extending upward from the base, and a torso supported by the leg. The torso supports the imaging sensors. The torso may include a torso body having a curved forward face defining a recess. The imaging sensors may be disposed in the torso recess while maintaining corresponding fields of view unobstructed by the torso body. The leg may have a variable height controlled by the controller.

Yet another aspect of the disclosure provides a method of operating a mobile robot. The method includes maneuvering the robot across a floor surface in a forward drive direction; receiving image data from first, second, and third imaging devices disposed on the robot, and maneuvering the robot across the floor surface based on the received image data. The first imaging sensor is arranged to aim downward and away from the robot. The second imaging sensor is arranged to aim away from the robot body substantially parallel with the floor surface. The third imaging sensor is arranged to aim upward and away from the robot. Each imaging sensor is directed along the forward drive direction.

In some implementations, the method includes receiving three-dimensional depth image data of a scene about the robot along a drive direction of the robot, determining a local perceptual space corresponding to an environment around the robot based on the received three-dimensional depth image data, and determining a location of an object in the scene. The method includes assigning a confidence level for the object location and maneuvering the robot in the scene based on the object location and corresponding confidence level. The method may include constructing an object occupancy map of the scene. In some examples, the method includes degrading the confidence level of each object location over time unless persisted with updated three-dimensional depth image data.

The method may include scanning at least one imaging sensor side-to-side with respect to the forward drive direction to increase a lateral field of view of the imaging sensor.

In some implementations, the method includes receiving proximity data from first, second, and third proximity sensors disposed on the robot and maneuvering the robot across the floor surface based on the received proximity data. The first proximity sensor has a sensing axis arranged substantially parallel with an imaging axis of the first imaging sensor. The second proximity sensor has a sensing axis arranged substantially parallel with an imaging axis of the second imaging sensor. The third proximity sensor has a sensing axis arranged substantially parallel with an imaging axis of the third imaging sensor. At least one proximity sensor may be a sonar sensor or an infrared sensor.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 6C is a section view of an exemplary body portion of a mobile robot.

FIGS. 9A and 9B are front views of exemplary cable routing systems.

FIG. 9C is a schematic view of an exemplary cable routing system for a rotating body portion of a mobile robot.

FIG. 10A is a perspective view of an exemplary rotating body portion of a mobile robot having a reverse bending radius cable routing system.

FIG. 10B is a side view of the rotating body portion shown in FIG. 10A.

FIG. 11 is a schematic view of an exemplary imaging sensor sensing an object in a scene.

Like reference symbols in the various drawings indicate like elements.

DETAILED DESCRIPTION

Figure 1:
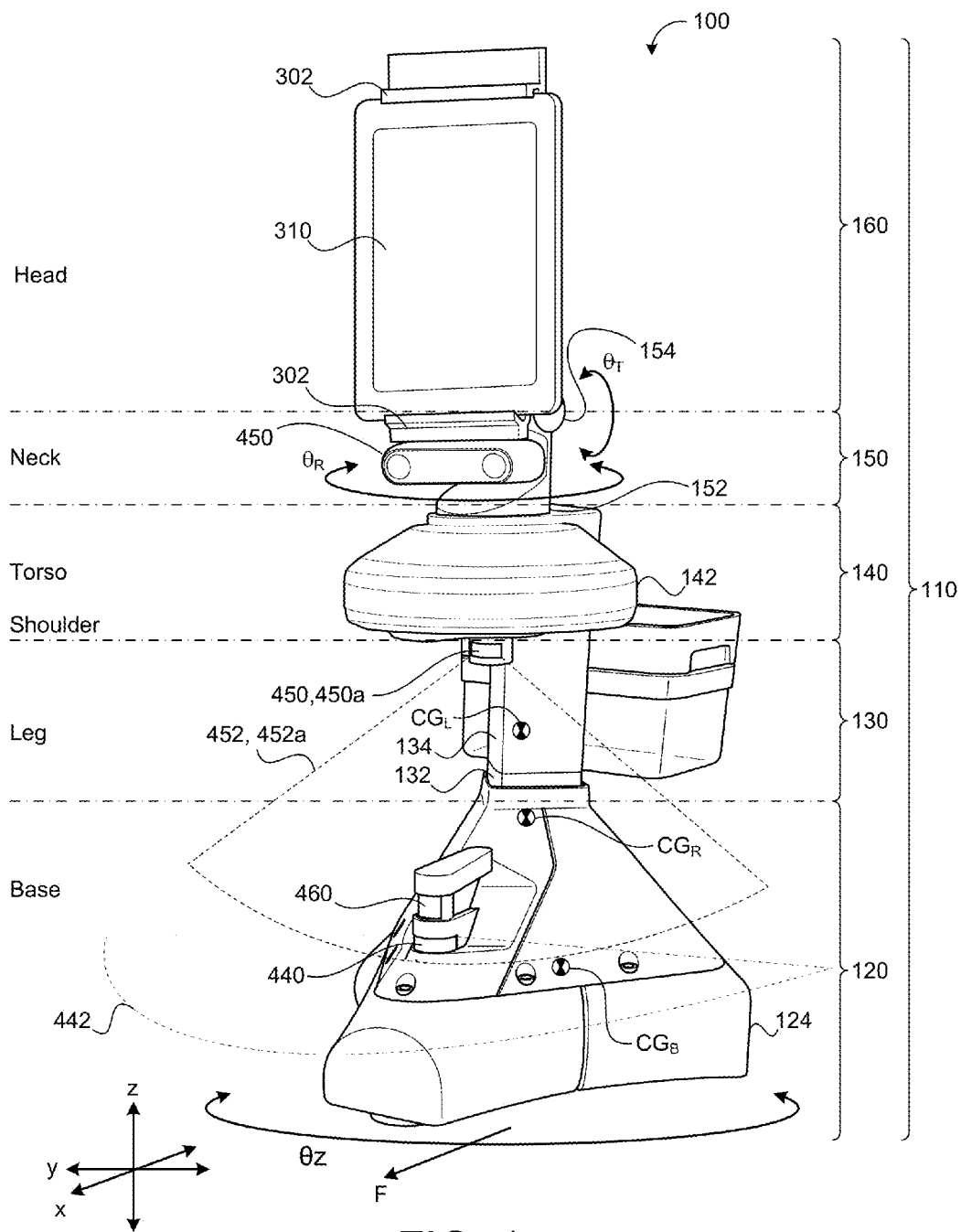
FIG. 1 is a perspective view of an exemplary mobile robot.

Mobile robots can interact or interface with humans to provide a number of services that range from home assistance to commercial assistance and more. In the example of home assistance, a mobile robot can assist elderly people with everyday tasks, including, but not limited to, maintaining a medication regime, mobility assistance, communication assistance (e.g., video conferencing, telecommunications, Internet access, etc.), home or site monitoring (inside and/or outside), person monitoring, and/or providing a personal emergency response system (PERS). For commercial assistance, the mobile robot can provide videoconferencing (e.g., in a hospital setting), a point of sale terminal, interactive information/marketing terminal, etc.

Referring to FIGS. 1-3C, in some implementations, a mobile robot 100 includes a robot body 110 (or chassis) that defines a forward drive direction F. The robot 100 also includes a drive system 200, an interfacing module 300, and a sensor system 400, each supported by the robot body 110 and in communication with a controller 500 that coordinates operation and movement of the robot 100. A power source 105 (e.g., battery or batteries) can be carried by the robot body 110 and in electrical communication with, and delivering power to, each of these components, as necessary.

The robot body 110, in the examples shown, includes a base 120, at least one leg 130 extending upwardly from the base 120, and a torso 140 supported by the at least one leg 130. The base 120 may support the drive system 200. The robot body 110 may also include a neck 150 supported by the torso 140. The neck 150 supports a head 160, which supports at least a portion of the interfacing module 300. The base 120 includes enough weight (e.g., by supporting the power source 105 (batteries) to maintain a low center of gravity $CG_B$ of the base 120 and a low overall center of gravity $CG_R$ of the robot 100 for maintaining mechanical stability.

Figure 2:
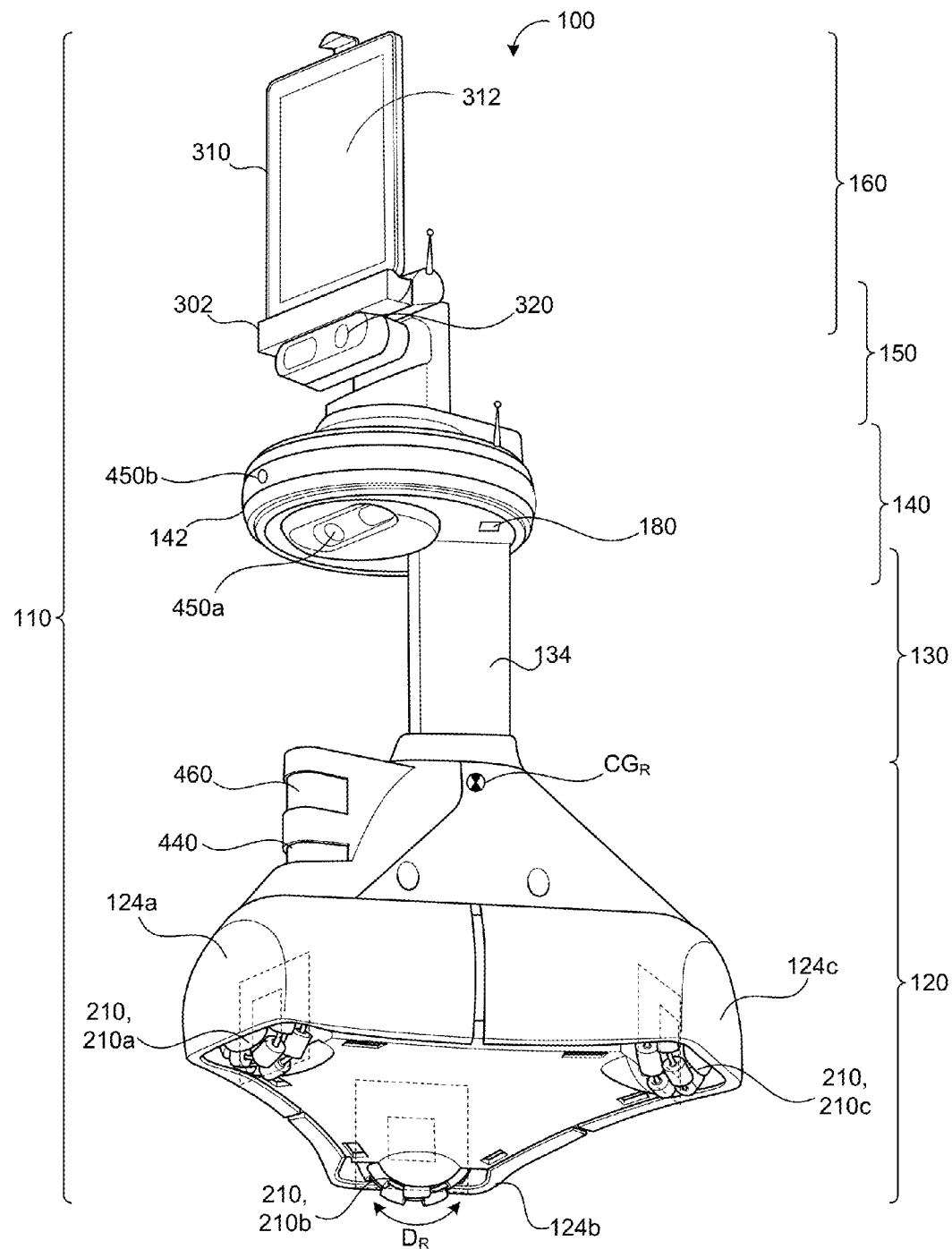
FIG. 2 is an elevated perspective view of an exemplary mobile robot.
Figure 3A:
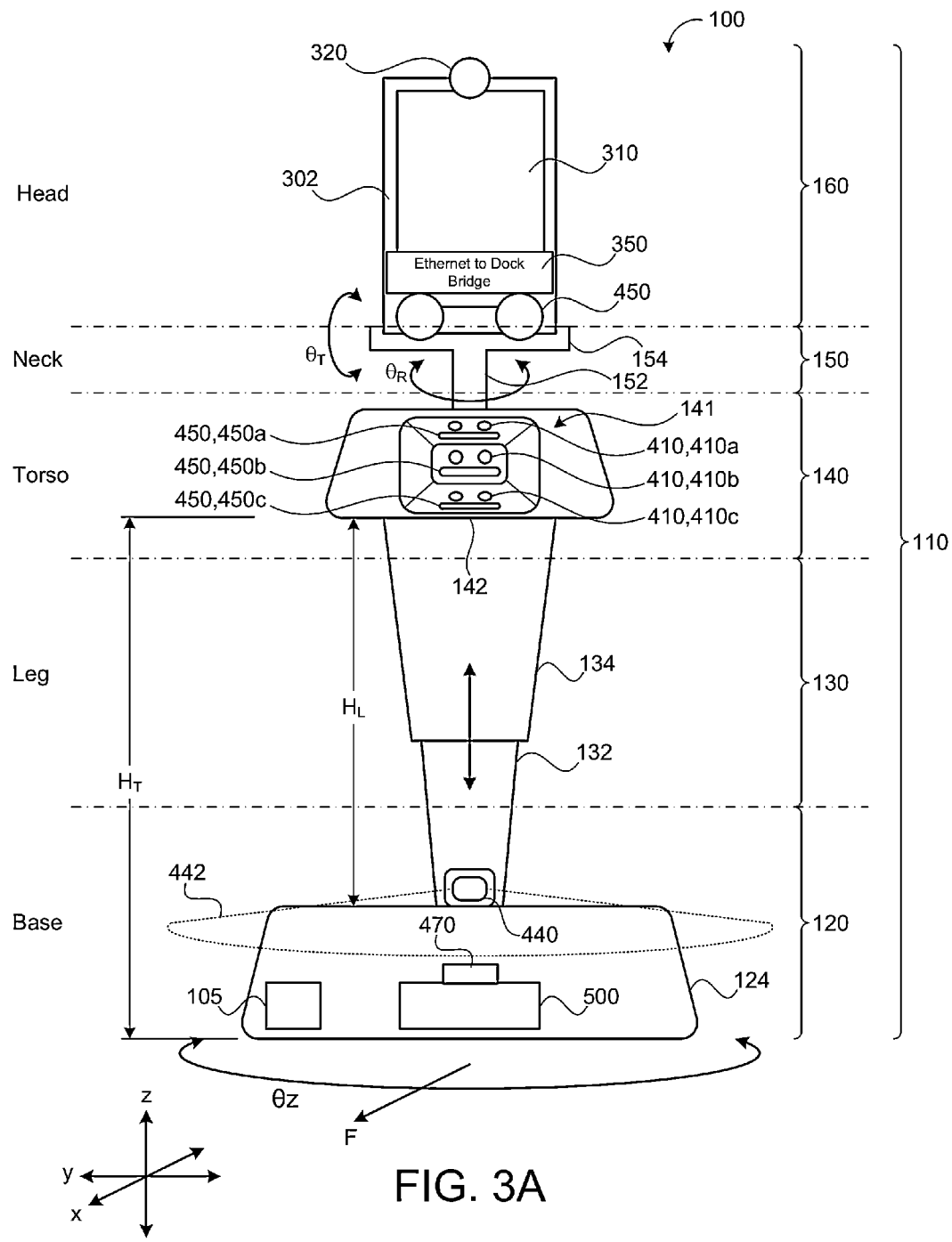
FIGS. 3A and 3B are schematic views of exemplary mobile robots.
Figure 3B:
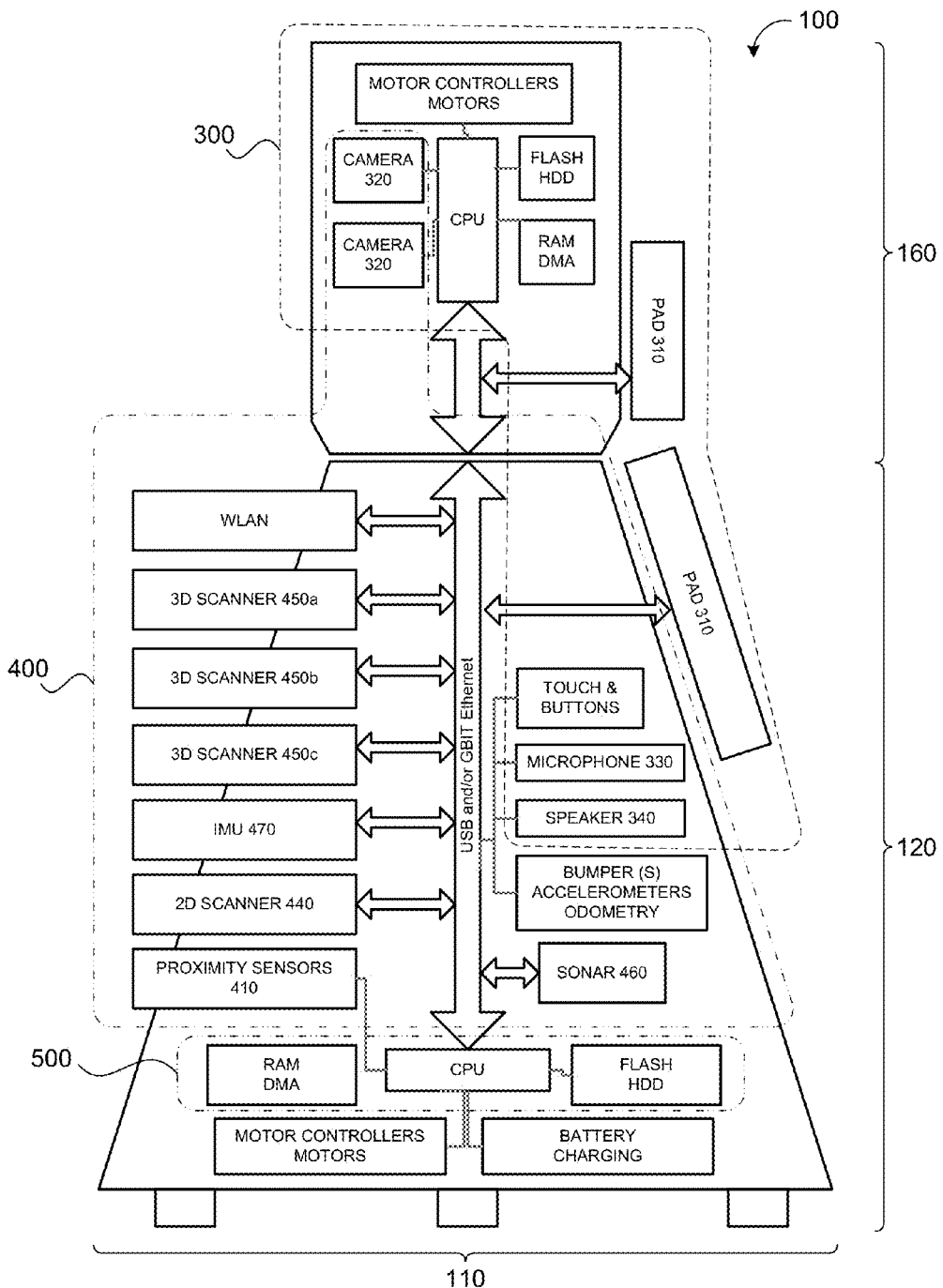
Figure 3C:
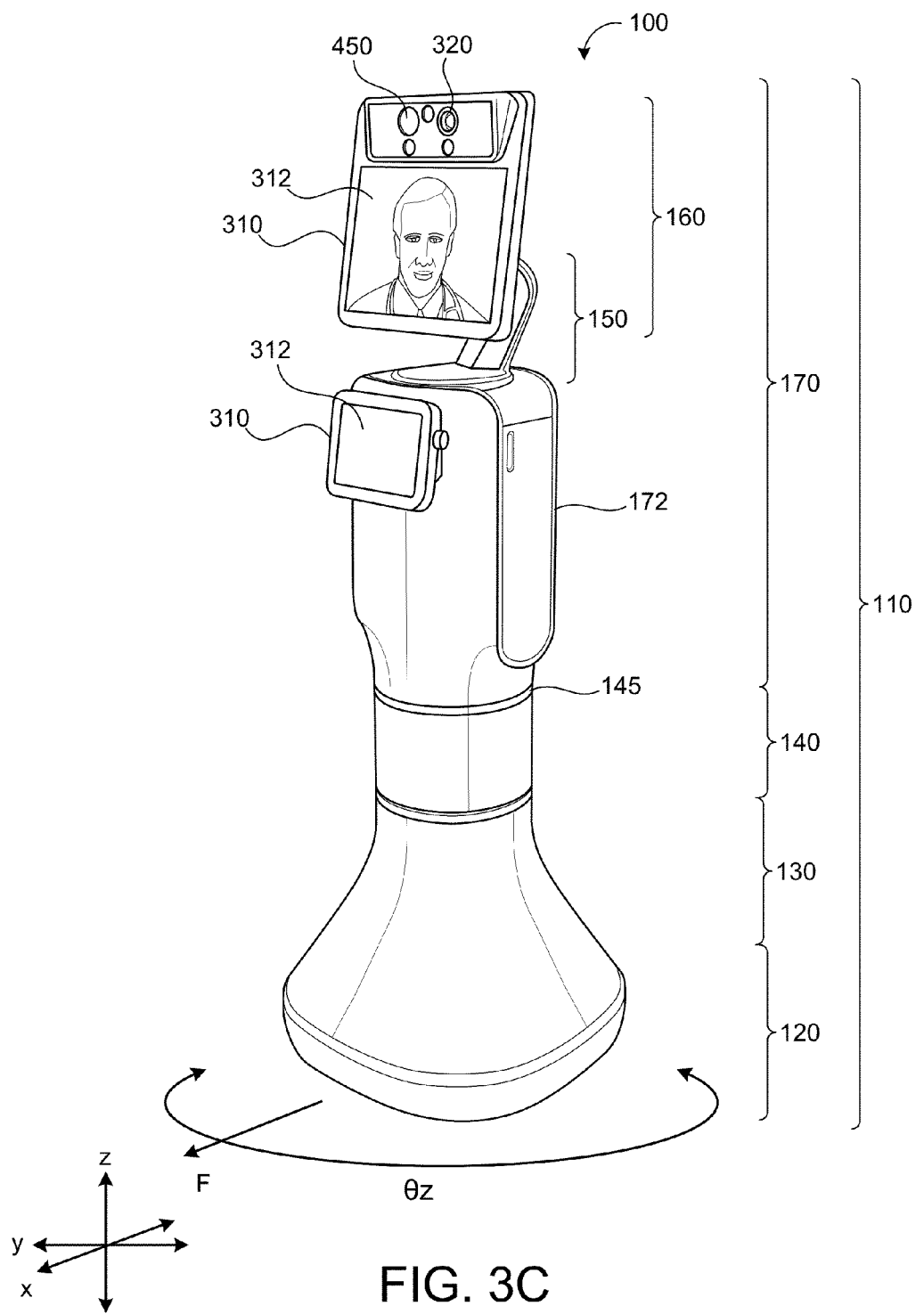
FIG. 3C is a perspective view of an exemplary mobile robot.
Figure 4A:
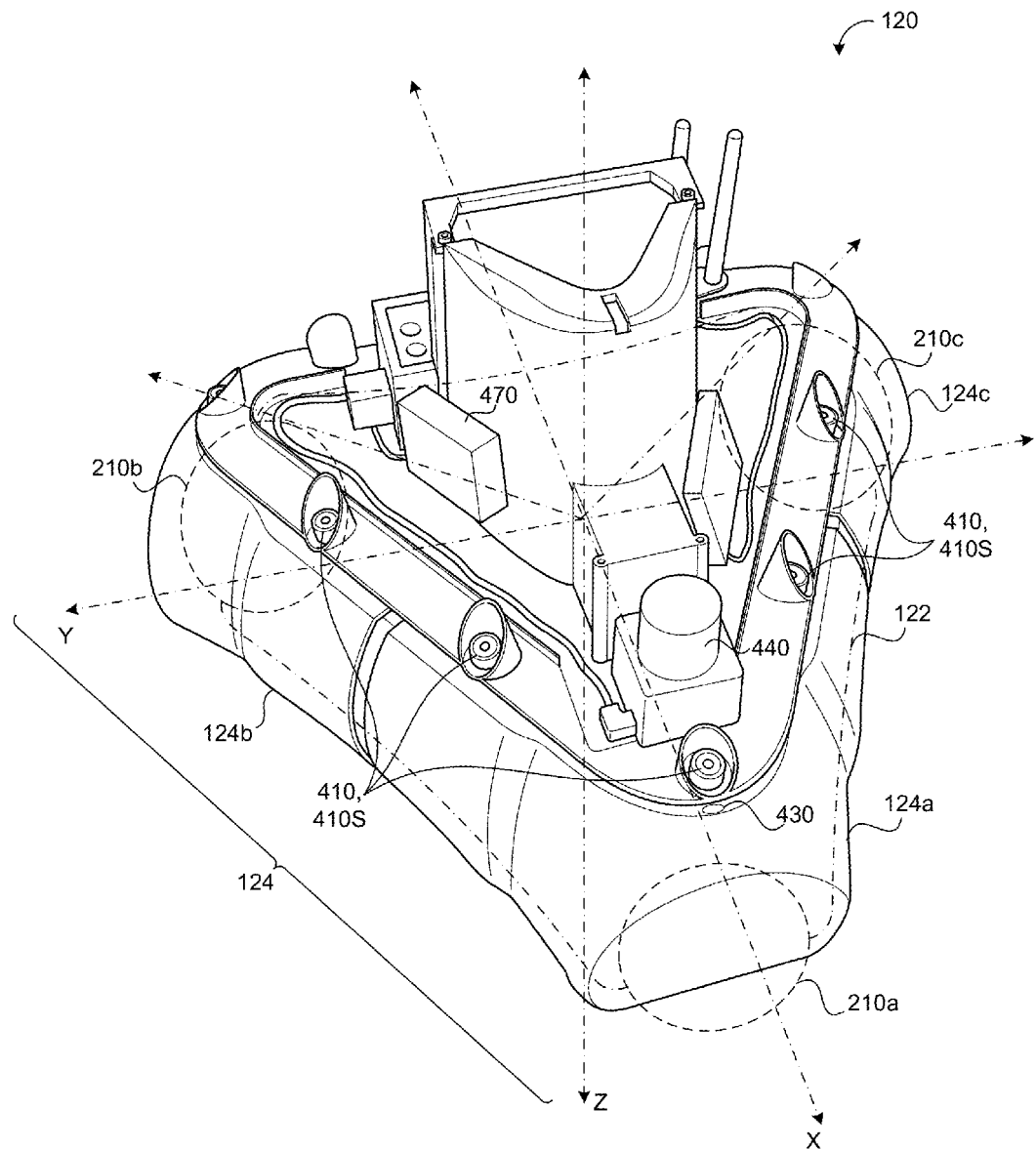
FIG. 4A is a front perspective view of an exemplary base for a mobile robot.
Figure 4B:
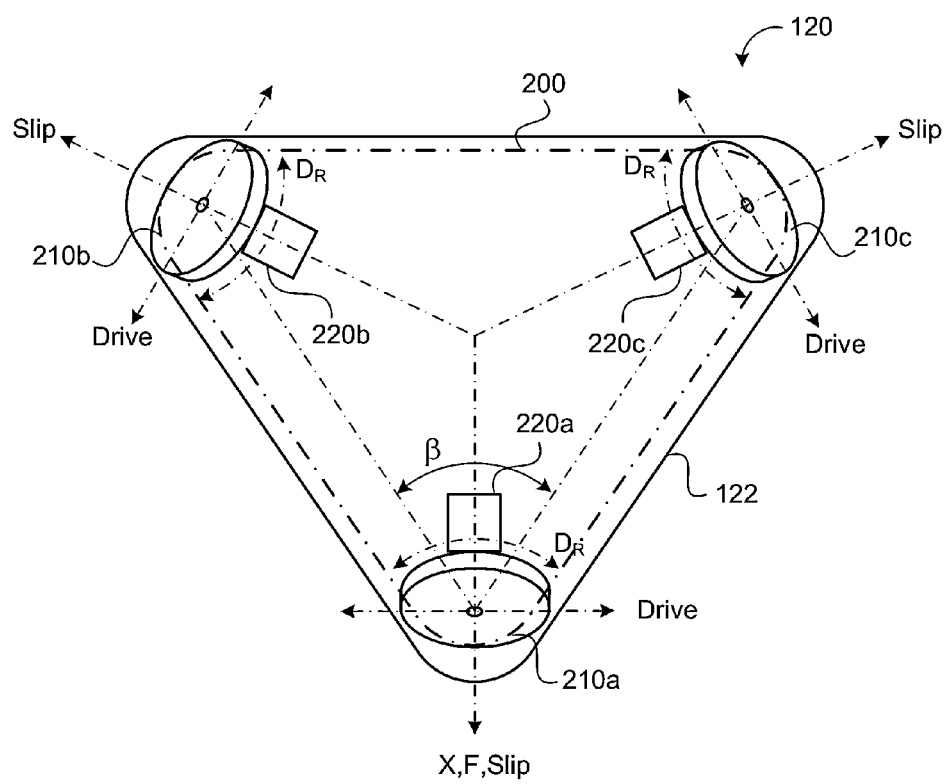
FIG. 4B is a top schematic view of an exemplary base for a mobile robot.

Referring to FIGS. 2 and 4A-4B, in some implementations, the base 120 defines a trilaterally symmetric shape (e.g., a triangular shape from the top view). For example, the base 120 may include a base chassis 122 that supports a base body 124 having first, second, and third base body portions 124a, 124b, 124c corresponding to each leg of the trilaterally shaped base 120 (see e.g., FIG. 4A). Each base body portion 124a, 124b, 124c can be movably supported by the base chassis 122 so as to move independently with respect to the base chassis 122 in response to contact with an object. The trilaterally symmetric shape of the base 120 allows bump detection 360° around the robot 100. Each base body portion 124a, 124b, 124c can have an associated contact sensor (e.g., capacitive sensor, read switch, etc.) that detects movement of the corresponding base body portion 124a, 124b, 124c with respect to the base chassis 122.

In some implementations, the drive system 200 provides omni-directional and/or holonomic motion control of the robot 100. As used herein the term "omni-directional" refers to the ability to move in substantially any planar direction, i.e., side-to-side (lateral), forward/back, and rotational. These directions are generally referred to herein as x, y, and θz, respectively. Furthermore, the term "holonomic" is used in a manner substantially consistent with the literature use of the term and refers to the ability to move in a planar direction with three planar degrees of freedom, i.e., two translations and one rotation. Hence, a holonomic robot has the ability to move in a planar direction at a velocity made up of substantially any proportion of the three planar velocities (forward/back, lateral, and rotational), as well as the ability to change these proportions in a substantially continuous manner.

The robot 100 can operate in human environments (e.g., environments typically designed for bipedal, walking occupants) using wheeled mobility. In some implementations, the drive system 200 includes first, second, and third drive wheels 210a, 210b, 210c equally spaced (i.e., trilaterally symmetric) about the vertical axis Z (e.g., 120 degrees apart); however, other arrangements are possible as well. Referring to FIG. 4B, the drive wheels 210a, 210b, 210c may define a transverse arcuate rolling surface (i.e., a curved profile in a direction transverse or perpendicular to the rolling direction $D_R$), which may aid maneuverability of the holonomic drive system 200. Each drive wheel 210a, 210b, 210c is coupled to a respective drive motor 220a, 220b, 220c that can drive the drive wheel 210a, 210b, 210c in forward and/or reverse directions independently of the other drive motors 220a, 220b, 220c. Each drive motor 220a-c can have a respective encoder 212, which provides wheel rotation feedback to the controller 500. In some examples, each drive wheels 210a, 210b, 210c is mounted on or near one of the three points of an equilateral triangle and having a drive direction (forward and reverse directions) that is perpendicular to an angle bisector of the respective triangle end. Driving the trilaterally symmetric holonomic base 120 with a forward driving direction F, allows the robot 100 to transition into non-forward drive directions for autonomous escape from confinement or clutter and then rotating and/or translating to drive along the forward drive direction F after the escape has been resolved.

Figure 4C:
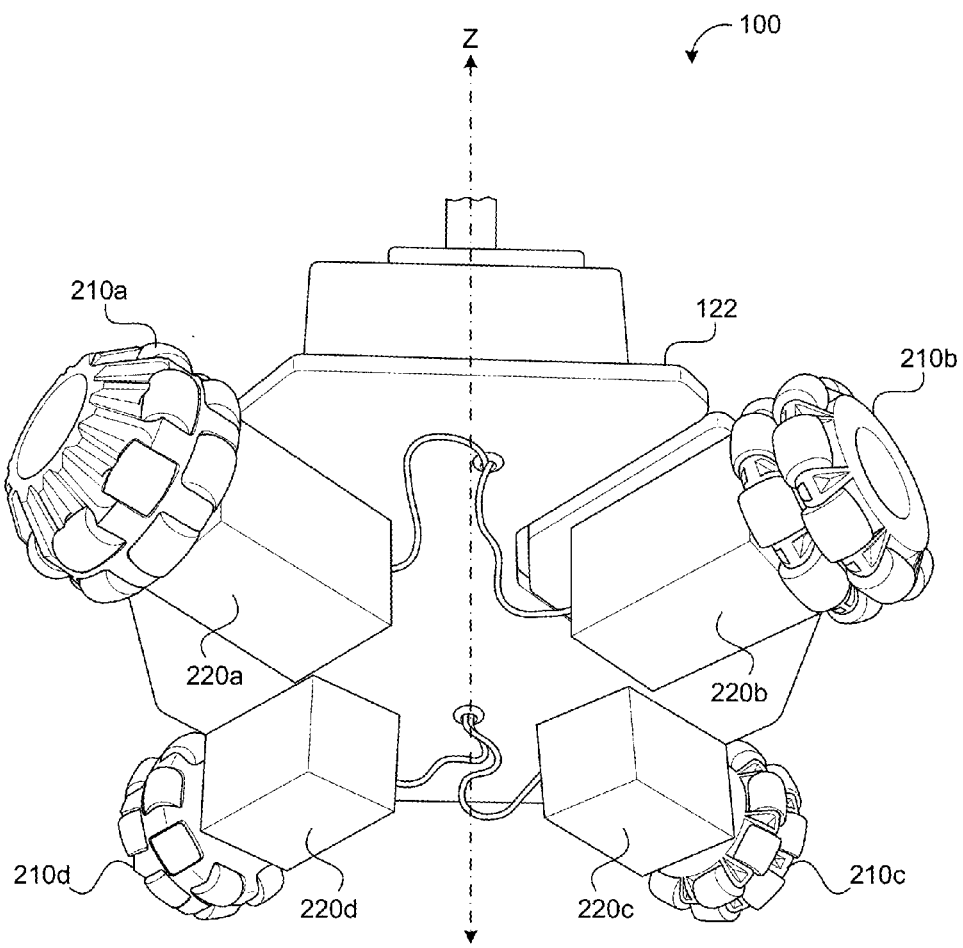
FIG. 4C is an elevated perspective view of an exemplary base for a mobile robot.

Referring to FIG. 4C, in some implementations, the drive system 200 includes first, second, third, and fourth drive wheels 210a-d arranged in a square or rectangular configuration (e.g., equidistantly from the Z-axis) from a top view. The drive system 200 may operate in a holonomic manner, allowing strafing. Each drive wheel 210a-d is coupled to a respective drive motor 220a-d that can drive the drive wheel 210a-d in forward and/or reverse directions independently of the other drive motors 220a-d. Each drive motor 220a-d can have a respective encoder, which provides wheel rotation feedback to the controller 500. A base chassis 122 supports the drive motors 220a-d and the correspondingly coupled drive wheels 210a-d.

Referring again to FIGS. 1-3C, the base 120 may support at least one leg 130 extending upward in the Z direction from the base 120. The leg(s) 130 may be configured to have a variable height for raising and lowering the torso 140 with respect to the base 120. In some implementations, each leg 130 includes first and second leg portions 132, 134 that move with respect to each other (e.g., telescopic, linear, and/or angular movement). Rather than having extrusions of successively smaller diameter telescopically moving in and out of each other and out of a relatively larger base extrusion, the second leg portion 134, in the examples shown, moves telescopically over the first leg portion 132, thus allowing other components to be placed along the second leg portion 134 and potentially move with the second leg portion 134 to a relatively close proximity of the base 120.

In some implementations, the torso 140 supports a payload 170, for example, on a payload support 145. The payload 170 may include a payload body 172 for housing or supporting communication systems, such as tablet computers, telephony, electronics, etc. In the examples shown, the payload 170 includes the neck 150 and the head 160. The neck 150 provides panning and tilting of the head 160 with respect to the torso 140. The neck 150 may include a rotator 152 and a tilter 154. The rotator 152 may provide a range of angular movement $\theta_R$ (e.g., about the Z axis) of between about 90° and about 360°. Other ranges are possible as well. Moreover, in some examples, the rotator 152 includes electrical connectors or contacts that allow continuous 360° rotation of the head 160 with respect to the torso 140 in an unlimited number of rotations while maintaining electrical communication between the head 160 and the remainder of the robot 100. The tilter 154 may include the same or similar electrical connectors or contacts allow rotation of the head 160 with respect to the torso 140 while maintaining electrical communication between the head 160 and the remainder of the robot 100. The tilter 154 may move the head 160 independently of the rotator 152 at an angle $\theta_T$ about the Y axis between an angle $\theta_T$ of ±90° with respect to Z-axis. Other ranges are possible as well, such as ±45°, etc. The robot 100 may be configured so that the leg(s) 130, the torso 140, the neck 150, and the head 160 stay within a perimeter of the base 120 for maintaining stable mobility of the robot 100.

In some implementations, the head 160 or payload 170 supports one or more portions of the interfacing module 300. The payload 170, such as the payload body 172 and/or the head 160, may include a dock 302 for fixedly or releasably receiving one or more displays, web pads, or computing tablets 310, also referred to as a web pad or a tablet PC, each of which may have a touch screen 312. The web pad 310 may be oriented forward, rearward or upward. In some implementations, web pad 310 includes a touch screen, optional I/O (e.g., buttons and/or connectors, such as micro-USB, etc.) a processor, and memory in communication with the processor. An exemplary web pad 310 includes the Apple iPad by Apple, Inc. In some examples, the web pad and 10 functions as the controller 500 or assists the controller 500 in controlling the robot 100.

The interfacing module 300 may include a camera 320 and/or other imaging device 450 disposed on the head 160 (see e.g., FIGS. 3A and 3C), which can be used to capture video or 3D volumetric point clouds from an elevated vantage point of the head 160 (e.g., for videoconferencing). The interfacing module 300 may include a microphone 330 (e.g., or micro-phone array) for receiving sound inputs and one or more speakers 340 disposed on the robot body 110 for delivering sound outputs.

The robot 100 may include one or more accessory ports 180 (e.g., mechanical and/or electrical interconnect points) for receiving payloads. The accessory ports 180 can be located so that received payloads 170 do not occlude or obstruct sensors of the sensor system 400 (e.g., on bottom and/or top surfaces of the torso body 142, etc.).

Figure 5A:
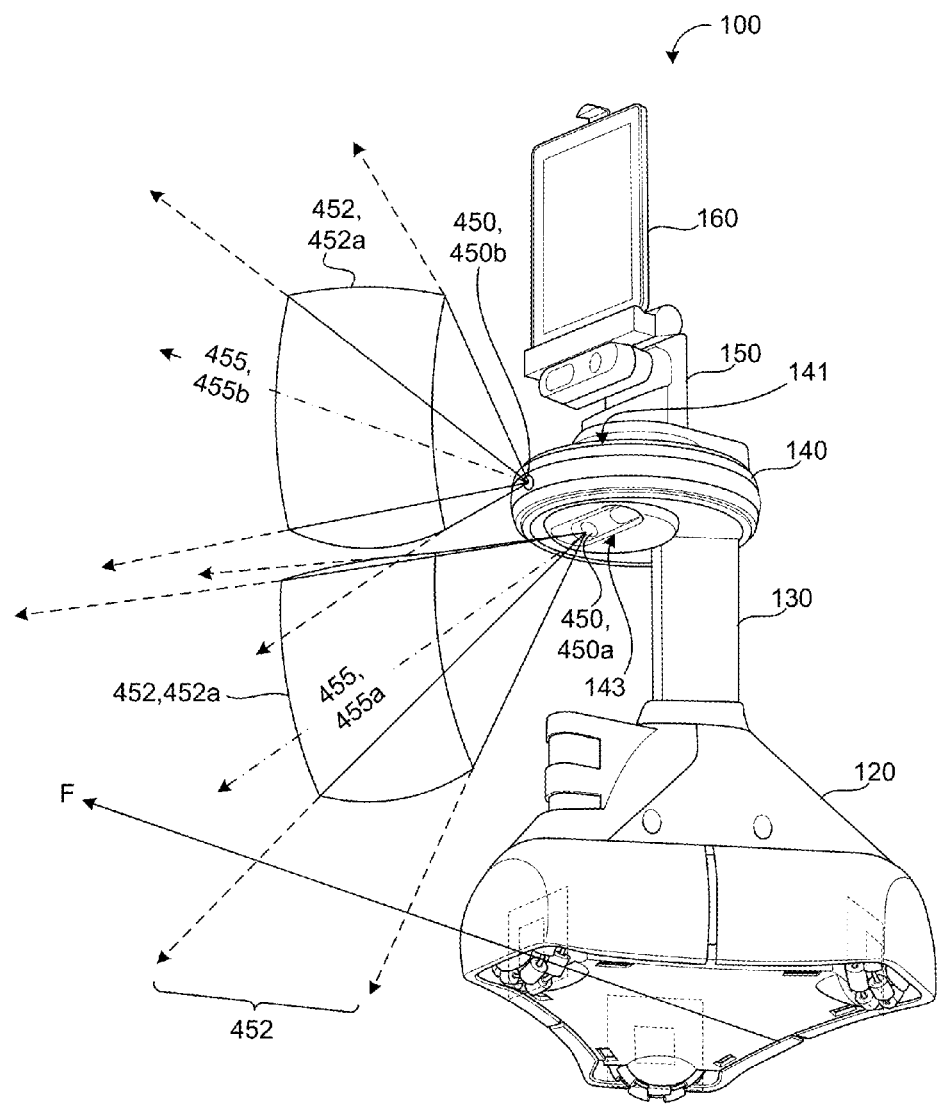
FIG. 5A is an elevated perspective view of an exemplary mobile robot having first and second imaging sensors with corresponding fields of view along a drive direction of the robot.
Figure 6A:
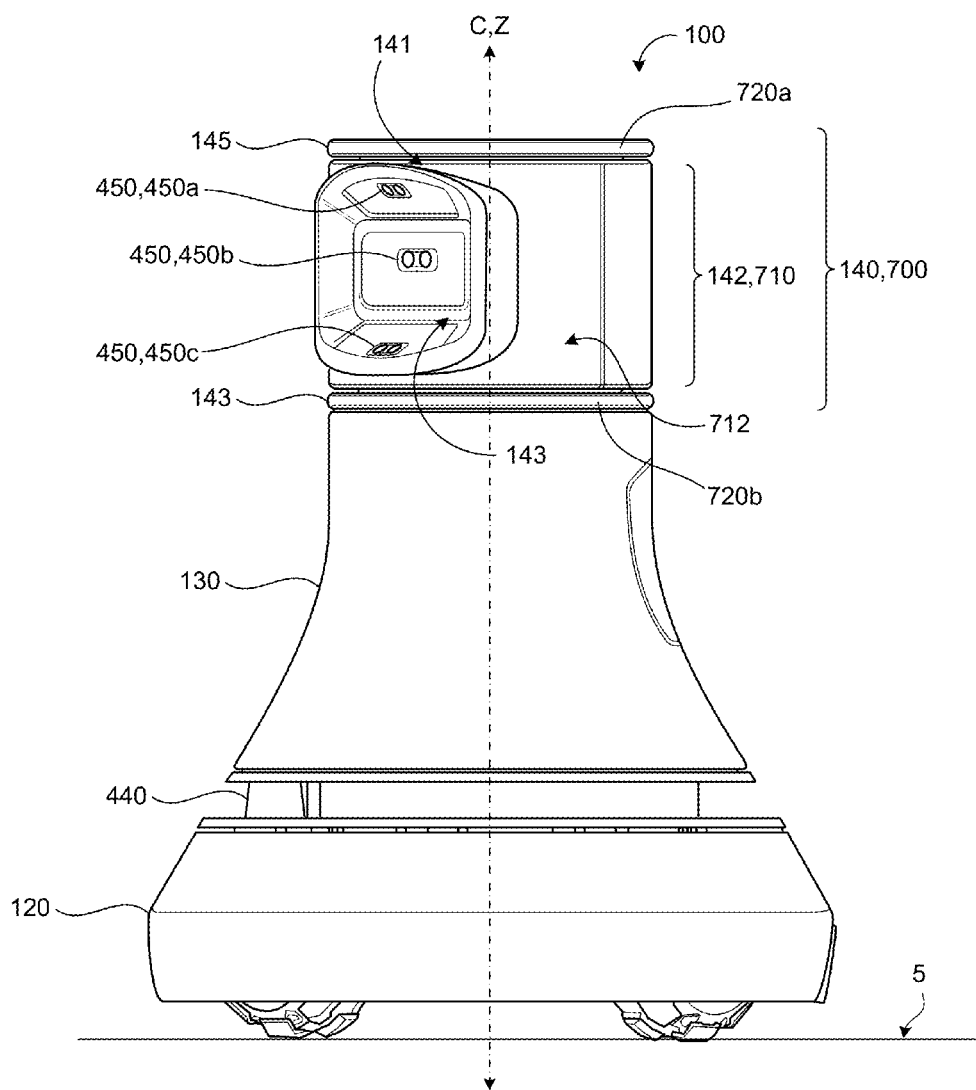
FIG. 6A is a front view of an exemplary mobile robot.
Figure 6B:
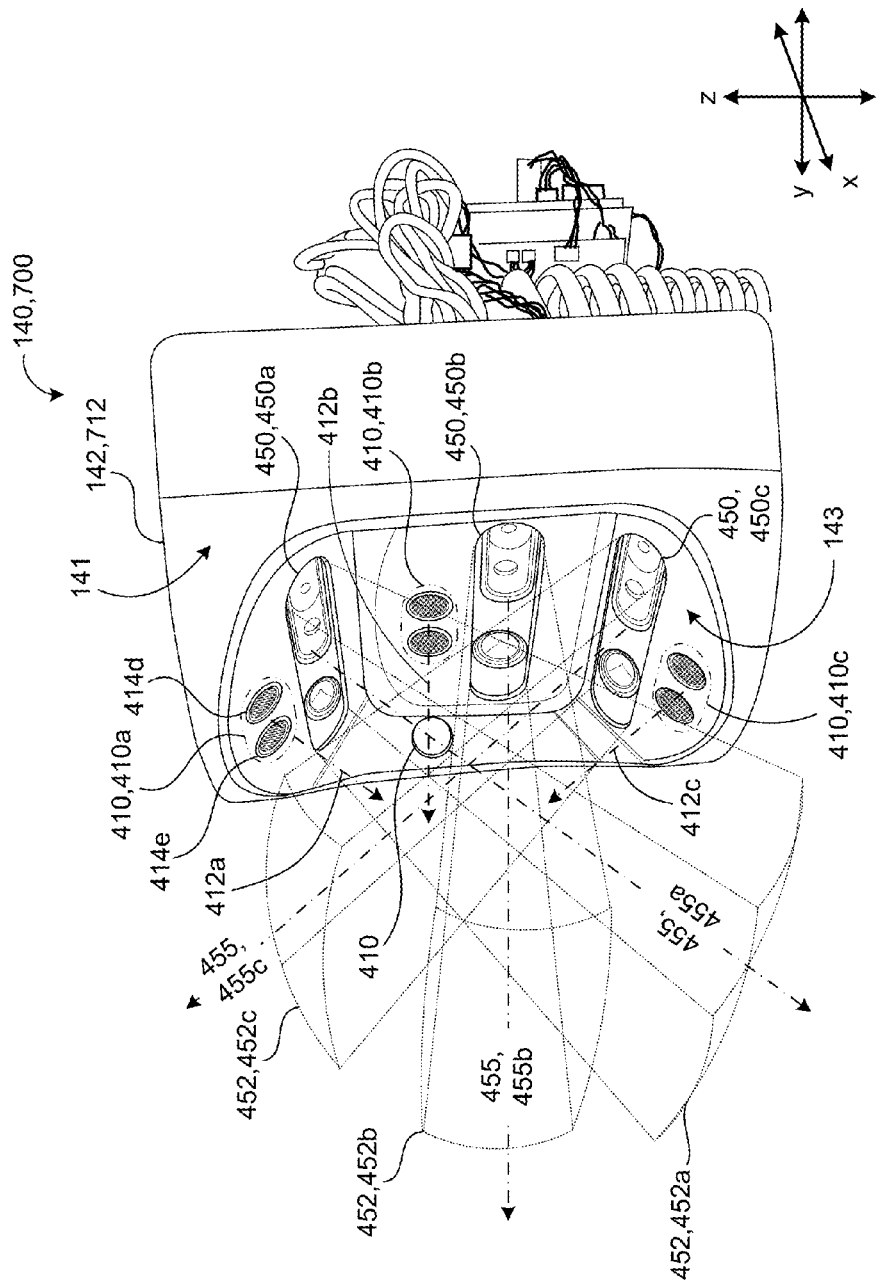
FIG. 6B is a perspective view of an exemplary body portion of a mobile robot having first, second, and third imaging sensors arranged with corresponding fields of view aimed in different directions along a drive direction of the robot.
Figure 6D:
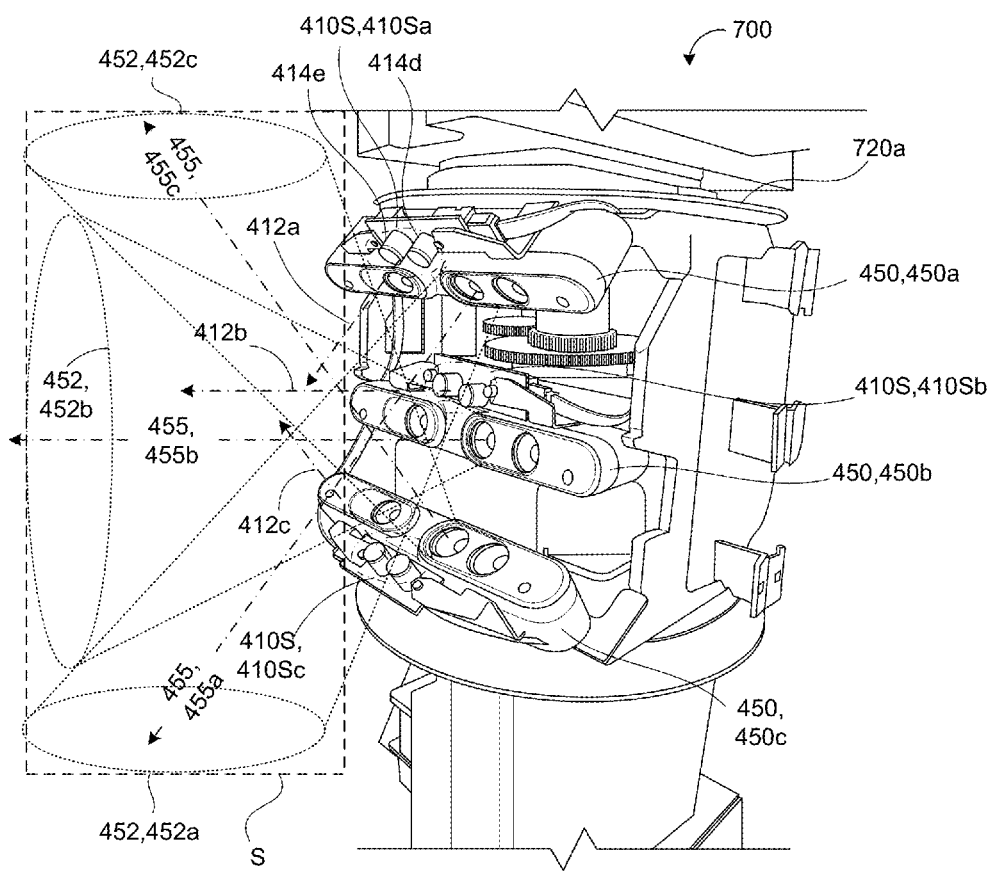
FIG. 6D is a perspective view of an exemplary mobile robot having first, second, and third imaging sensors.

Referring to FIGS. 5A, 6A and 6B, in some implementations, the torso 140 has a torso body 142 (also referred to as a cowling or collar) that has a surface of revolution. A surface of revolution is a surface in Euclidean space created by rotating a curve (the generatrix) around a straight line (e.g., the Z axis) in its plane. The torso 140 may define a curved forward face 141 (e.g., of a cylindrically shaped body axially aligned with the leg 130) defining a recess or cavity 143 housing the imaging sensor(s) 450 while maintaining corresponding field(s) of view 452 unobstructed by the torso body 142. Placement of an imaging sensor 450 on or near the forward face 141 of the torso body 142 allows the corresponding field of view 452 (e.g., ~285 degrees) to be less than an external surface angle of the torso body 142 (e.g., 300 degrees) with respect to the imaging sensor 450, thus preventing the torso body 142 from occluding or obstructing the detection field of view 452 of the imaging sensor 450. Placement of the imaging sensor(s) 450 inside the torso body cavity 143 conceals the imaging sensor(s) 450 (e.g., for aesthetics, versus having outwardly protruding sensors) and reduces a likelihood of environmental objects snagging on the imaging sensor(s) 450. Unlike a protruding sensor or feature, the recessed placement of the image sensor(s) 450 will not tend to have unintended interactions with the environment (snagging on people, obstacles, etc.), especially when moving or scanning, as virtually no moving part extends beyond the envelope of the torso body 142.

Referring to FIG. 5A, in some implementations, the torso body 142 supports or houses one or more imaging sensors 450. In the example shown, the robot 100 includes a first and second imaging sensors 450a, 450b (e.g., 3D depth imaging sensors) disposed on the torso 140. Both imaging sensors 450a, 450b are arranged to have a field of view 452 along the forward drive direction F. The first imaging sensor 450a is arranged to aim its imaging axis 455 substantially downward and away from the robot 100 (e.g., to view an area on the ground and/or about a lower portion of the robot) to detect objects before contact with the base 120 or leg 130. By angling the first imaging sensor 450a downward, the robot 100 receives dense sensor coverage in an area immediately forward or adjacent to the robot 100, which is relevant for short-term travel of the robot 100 in the forward direction. The second imaging sensor 450b is arranged with its imaging axis 455 pointing substantially parallel with the ground along the forward drive direction F (e.g., to detect objects approaching a mid and/or upper portion of the robot 100). In other examples, the second imaging sensor 450b is arranged with its imaging axis 455 pointing above the ground or even upward away from the ground.

The 3D depth imaging sensor(s) 450 can image point clouds directly (e.g., not by spinning like a scanning LIDAR) and can point or aim at an obstacle that needs more attention. The 3D depth imaging sensor(s) 450 may reciprocate or scan back and forth slowly as well. The 3D depth imaging sensor(s) 450 may capture point clouds 58 degrees wide, 45 degrees vertical, at up to 60 Hz.

Figure 5B:
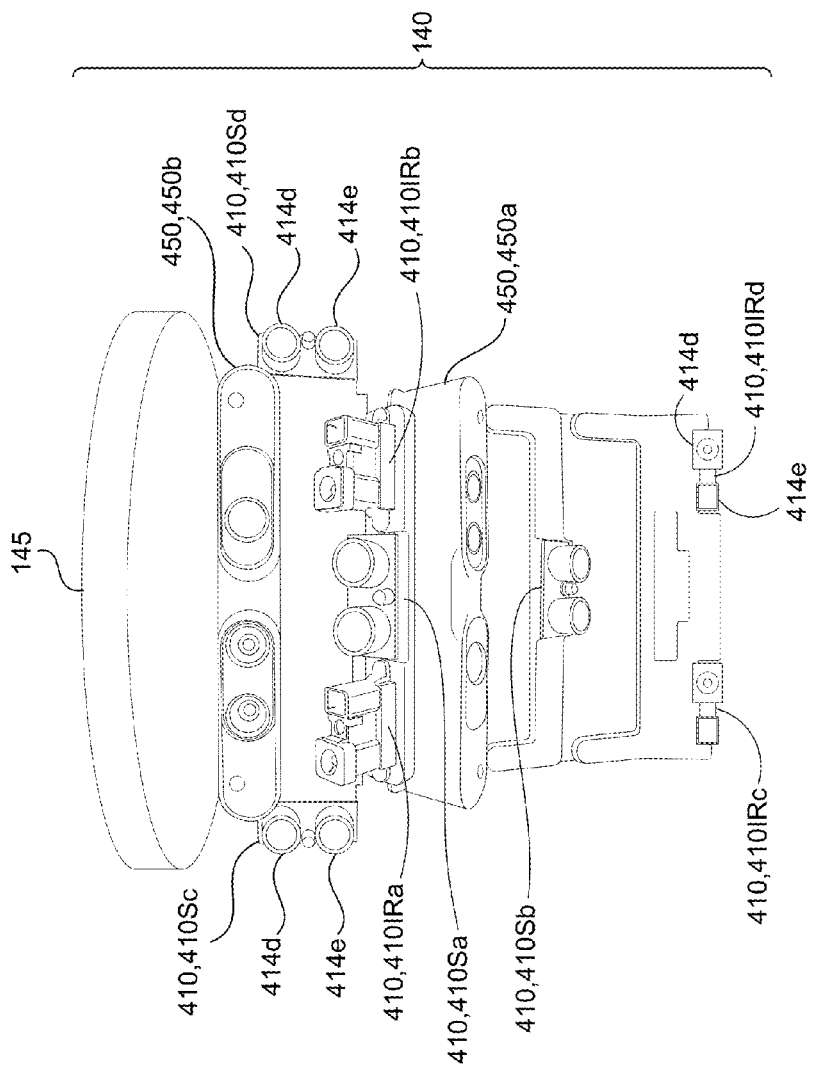
FIG. 5B is a front view of an exemplary sensor arrangement for a mobile robot.
Figure 5C:
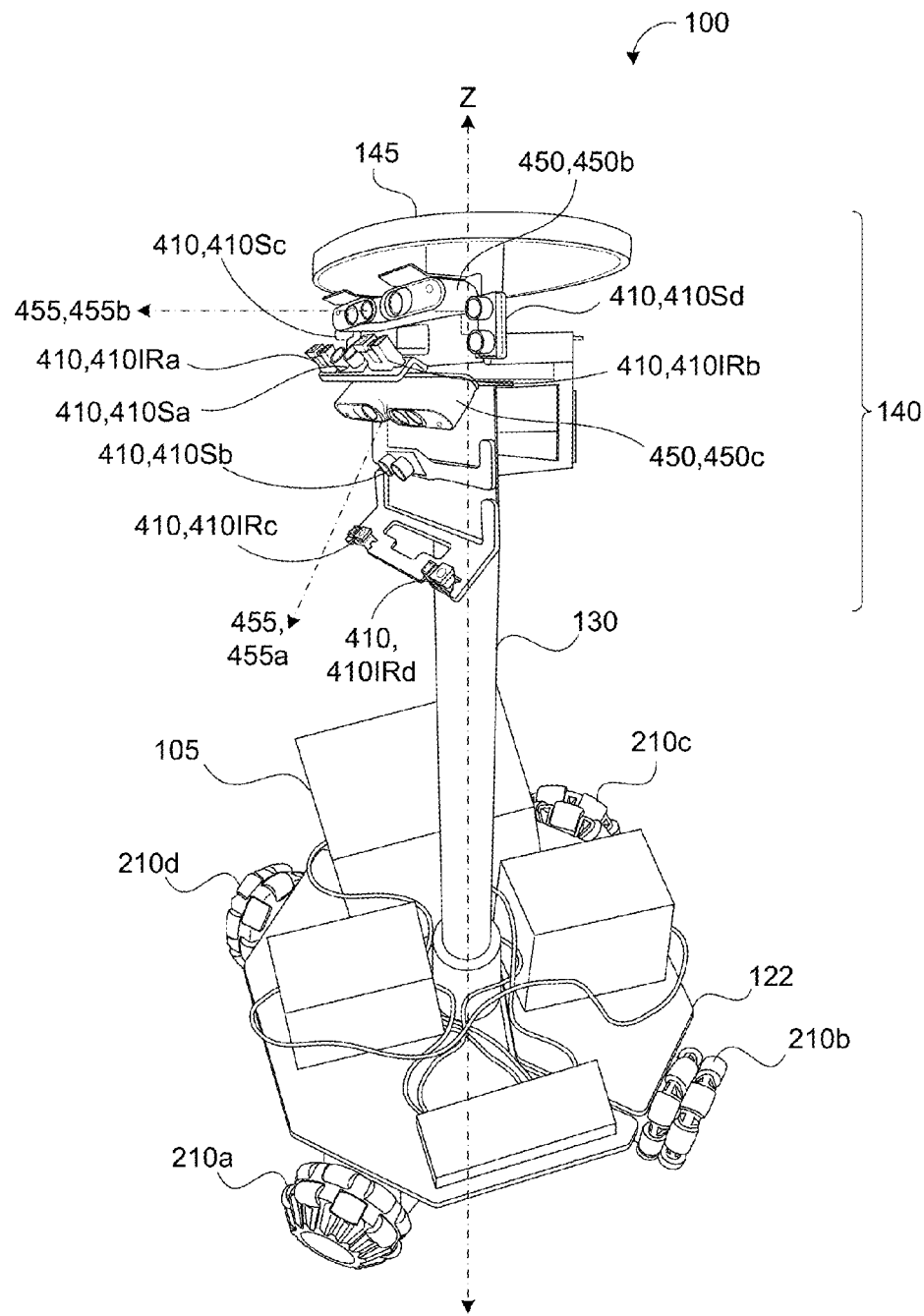
FIG. 5C is a perspective view of an exemplary mobile robot.

Referring to FIGS. 5B and 5C, in some implementations, the imaging sensor 450 has an imaging dead zone 453 (FIG. 18C), which is a volume of space about the imaging sensor 450 (e.g., immediately proximate the imaging sensor 450) in which objects are not detected. The dead zone 453 is positioned between the imaging sensor 450 and a detection field 452 of the imaging sensor 450. The torso 140 may support an array of proximity sensors 410 to detect objects in the dead zone 453 of the imaging sensor(s) 450 and/or to provide redundant sensing for the imaging sensor(s) 450, thus allowing the robot 100 to robustly determine a local perceptual space of its environment.

One or more of the proximity sensors 410 may have an emitter 414e and a detector 414d. For an infrared proximity sensor 4101R, for example, the emitter 414e is an infrared light emitter and the detector 414d is a photodetector arranged such that an emission field of the emitter 414e converges or intersects with a detection field of the detector 414d. For a sonar proximity sensor 410S, for example, the emitter 414e emits acoustics and the detector 414d detects acoustic reflections.

The torso 140 may support an array of sonar proximity sensors 410S arranged to detect objects or obstacles about the robot 100 and/or in the imaging dead zone 453. In the example shown, the torso 140 includes first and second sonar proximity sensors 410Sa, 410Sb arranged on opposite top and bottom sides of the first imaging sensor 450a. The first sonar proximity sensor 410Sa is arranged to aim upward and away from the robot 100 along a driving direction, while the second sonar proximity sensor 410Sb is arranged to aim downward and away from the robot 100 along a driving direction. The torso 140 may include third and fourth sonar proximity sensors 410Sc, 410Sd arranged on opposite right and left sides of the second imaging sensor 450b, both aiming away from the robot 100 substantially parallel to the floor surface 5.

In some implementations, the torso 140 supports an array of infrared (IR) proximity sensors 4101R arranged to detect objects or obstacles about the robot 100 and/or in the imaging dead zone 453. The torso 140 may include first and second IR proximity sensors 4101Ra, 4101Rb arranged to aim upward and away from the robot 100. In the example shown, the first and second IR proximity sensors 4101Ra, 4101Rb arranged on opposite sides of the first sonar proximity sensor 410Sa. The torso 140 may include third and fourth IR proximity sensors 4101Rc, 4101Rd also arranged to aim upward and away from the robot 100. The third and fourth IR proximity sensors 4101Rc, 4101Rd may be disposed below the first and second IR proximity sensors 4101Ra, 4101Rb, increasing effective in for a detection zone in front of the robot 100, for example, in front of a payload support/interface 145.

Referring to FIGS. 6A and 6B, in some implementations, the torso 140 includes first, second, and third imaging sensors 450, 450a, 450b, 450c. Each imaging sensor 450 is arranged to have a field of view 452 centered about an imaging axis 455 directed along the forward drive direction F. The first imaging sensor 450a is arranged to aim its imaging axis 455a downward and away from the torso 140. By angling the first imaging sensor 450a downward, the robot 100 receives dense sensor coverage in an area immediately forward or adjacent to the robot 100, which is relevant for short-term travel of the robot 100 in the forward direction. The second imaging sensor 450b is arranged with its imaging axis 455b pointing substantially parallel with the ground along the forward drive direction F (e.g., to detect objects approaching a mid and/or upper portion of the robot 100). The third imaging sensor 450c is arranged to have its imaging axis 455c arranged to aim upward and away from the torso 140.

The torso body 142 may define a three dimensional projective surface of any shape or geometry, such as a polyhedron, circular or an elliptical shape. In some implementations, the torso body 142 defines a circular envelope rotatable mounted on the leg 130 such that a longitudinal central axis Z of the torso body 142 is coaxial with the central longitudinal axis Z of the leg 130. For example, the torso body 142 may define a cylinder, which enables unobstructed rotation of the torso body 142 for complete and uninterrupted sensor scanning.

During fast travel, the robot 100 may use the first imaging sensor 450a, which is aimed downward slightly to increase a total or combined field of view of both the first and second imaging sensors 450a, 450b, and to give sufficient time for the robot 100 to avoid an obstacle (since higher speeds generally mean less time to react to obstacles). At slower speeds, the robot 100 may use the third imaging sensor 450c, which is aimed upward above the ground 5, to track a person that the robot 100 is meant to follow. The third imaging sensor 450c can be arranged to sense objects as they approach a payload 170 of the torso 140.

In some implementations, torso body 142 supports or houses one or more proximity sensors 410 (e.g., infrared sensors, sonar sensors and/or stereo sensors) for detecting objects and/or obstacles about the robot 100. In the example shown in FIG. 5B, the torso body 140 includes first, second, and third proximity sensors 410a, 410b, 410c disposed adjacent to the corresponding first, second, and third imaging sensor 450a, 450b, 450c and have corresponding sensing axes 412a, 412b, 412c arranged substantially parallel to the corresponding imaging axes 455a, 455b, 455c of the first, second, and third imaging sensors 450a, 450b, 450c. The sensing axes 412a, 412b, 412c may extend into the torso body 142 (e.g., for recessed or internal sensors). Having the first, second, and third proximity sensors 410a, 410b, 410c arranged to sense along substantially the same directions as the corresponding first, second, and third imaging sensors 450a, 450b, 450c provides redundant sensing and/or alternative sensing for recognizing portions or objects of the local environment and for developing a robust local perception of the robot's environment. Moreover, the proximity sensors 410 may detect objects within an imaging dead zone 453 of imaging sensors 450.

The torso 140 may support an array of proximity sensors 410 disposed within the torso body recess 143 and arranged about a perimeter of the torso body recess 143, for example in a circular, elliptical, or polygonal pattern. Arranging the proximity sensors 410 in a bounded (e.g., closed loop) arrangement, provides proximity sensing in substantially all directions along the drive direction of the robot 100. This allows the robot 100 to detect objects and/or obstacles approaching the robot 100 within at least a 180° sensory field of view along the drive direction of the robot 100.

In some examples, one or more torso sensors, i.e., one or more imaging sensors 450 and/or proximity sensors 410 have an associated actuator moving the sensor 410, 450 in a scanning motion (e.g., side-to side) to increase the sensor field of view 452. In additional examples, the imaging sensor 450 includes an associated rotating a mirror, prism, variable angle micro-mirror, or MEMS mirror array to increase the field of view 452 of the imaging sensor 450. Mounting the sensors 410, 450 on a round or cylindrically shaped torso body 142 allows the sensors 410, 450 to scan in a relatively wider range of movement, thus increasing the sensor field of view relatively greater than that of a flat faced torso body 142.

The imaging sensors 450 (e.g., infrared range sensors) may generate range value data representative of obstacles within an observed volume of space adjacent the robot 100. Moreover, the proximity sensors 410 (e.g., presence sensors) may generate presence value data representative of obstacles within the observed volume of space. In some implementations, the imaging sensor 450 is a structured-light 3D scanner that measures the three-dimensional shape of an object using projected light patterns. Projecting a narrow band of light onto a three-dimensionally shaped surface produces a line of illumination that appears distorted from other perspectives than that of the projector, and can be used for an exact geometric reconstruction of the surface shape (light section). The imaging sensor 450 may use laser interference or projection as a method of stripe pattern generation. The laser interference method works with two wide planar laser beam fronts. Their interference results in regular, equidistant line patterns. Different pattern sizes can be obtained by changing the angle between these beams. The method allows for the exact and easy generation of very fine patterns with unlimited depth of field. The projection method uses non coherent light and basically works like a video projector. Patterns are generated by a display within the projector, typically an LCD (liquid crystal) or LCOS (liquid crystal on silicon) display.

In some implementations, the imaging sensor 450 is a time-of-flight camera (TOF camera), which is a range imaging camera system that resolves distance based on the known speed of light, measuring the time-of-flight of a light signal between the camera and the subject for each point of the image. The time-of-flight camera is a class of scannerless LIDAR, in which the entire scene is captured with each laser or light pulse, as opposed to point-by-point with a laser beam such as in scanning LIDAR systems.

In some implementations, the imaging sensor 450 is a three-dimensional light detection and ranging sensor (e.g., Flash LIDAR). LIDAR uses ultraviolet, visible, or near infrared light to image objects and can be used with a wide range of targets, including non-metallic objects, rocks, rain, chemical compounds, aerosols, clouds and even single molecules. A narrow laser beam can be used to map physical features with very high resolution. Wavelengths in a range from about 10 micrometers to the UV (ca. 250 nm) can be used to suit the target. Typically light is reflected via backscattering. Different types of scattering are used for different LIDAR applications; most common are Rayleigh scattering, Mie scattering and Raman scattering, as well as fluorescence.

In some implementations, the imaging sensor 450 includes one or more triangulation ranging sensors, such as a position sensitive device. A position sensitive device and/or position sensitive detector (PSD) is an optical position sensor (OPS), that can measure a position of a light spot in one or two-dimensions on a sensor surface. PSDs can be divided into two classes which work according to different principles. In the first class, the sensors have an isotropic sensor surface that has a raster-like structure that supplies continuous position data. The second class has discrete sensors on the sensor surface that supply local discrete data.

The imaging sensor 450 may employ range imaging for producing a 2D image showing the distance to points in a scene from a specific point, normally associated with some type of sensor device. A stereo camera system can be used for determining the depth to points in the scene, for example, from the center point of the line between their focal points.

The imaging sensor 450 may employ sheet of light triangulation. Illuminating the scene with a sheet of light creates a reflected line as seen from the light source. From any point out of the plane of the sheet, the line will typically appear as a curve, the exact shape of which depends both on the distance between the observer and the light source and the distance between the light source and the reflected points. By observing the reflected sheet of light using the imaging sensor 450 (e.g., as a high resolution camera) and knowing the positions and orientations of both camera and light source, the robot 100 can determine the distances between the reflected points and the light source or camera.

In some implementations, the proximity or presence sensor 410 includes at least one of a sonar sensor, ultrasonic ranging sensor, a radar sensor (e.g., including Doppler radar and/or millimeter-wave radar), or pyrometer. A pyrometer is a non-contacting device that intercepts and measures thermal radiation. Moreover, the presence sensor 410 may sense at least one of acoustics, radiofrequency, visible wavelength light, or invisible wavelength light. The presence sensor 410 may include a non-infrared sensor, for example, to detect obstacles having poor infrared response (e.g., angled, curved and/or specularly reflective surfaces). In some examples, the presence sensor 410 detects a presence of an obstacle within a deadband of the imaging or infrared range sensor 450 substantially immediately adjacent that sensor (e.g., within a range at which the imaging sensor 450 is insensitive (e.g., 1 cm-40 cm; or 5 m-infinity)).

Referring to FIGS. 6A-6D, in some implementations, the torso 140 is a sensor pod 700 that includes a collar 710 rotatably supported by the robot body 110, such as the leg 130, and has a curved wall 712 formed at least partially as a surface of revolution about a vertical axis of rotation C with respect to the floor surface 5. In some examples, the sensor pod 700 includes a first interface 720a and a second interface 720b spaced from the first interface 720a. The first and second interfaces 720a, 720b rotatably support the collar 710 therebetween.

The sensor pod 700 may include at least one imaging sensor 450 (e.g., a volumetric point cloud sensor) housed by the collar 710 and arranged for observing a volume of space S adjacent the robot 100 from within the collar 710 along an imaging axis 455 (also referred to as observation axis) extending through the curved wall 712. In some implementations, the sensor pod 700 includes first, second and third imaging sensors 450a-c housed by the collar 710 and arranged for observing a volume of space S adjacent the sensor pod 700 from within the collar 710 along corresponding first, second, and third imaging axes 455a-c extending through the curved wall 712. Each imaging axis 455a-c is different from the other. Moreover, each imaging sensor 450a-c captures three dimensional volumetric point clouds representative of obstacles within the observed volume of space S.

A collar actuator 730, also referred to as a panning system (e.g., having a panning motor and encoder), may rotate the collar 710 and the volumetric point cloud sensor(s) 450 together about the collar axis C. All rotating portions of the volumetric point cloud sensor(s) 450 extend a lesser distance from the collar axis C than an outermost point of the collar 710.

In some implementations, the surface of revolution of the curved wall 712 sweeps about 360 degrees about the collar axis C to form a substantially complete perimeter of the collar 712. In other implementations, the surface of revolution of the curved wall 712 sweeps about 300 degrees about the collar axis C, leaving a recess 143 for the one or more housed sensors. The collar actuator 730 may move the collar 710 both clockwise and counter clockwise about the collar axis of rotation C. In some examples, the sensor pod 700 includes a shroud 702 (e.g., infrared translucent cover) covering the rotating collar 710.

The captured separate three dimensional volumetric point clouds may be of overlapping or non-overlapping sub-volumes or fields of view 452a-c within the observed volume of space S. Moreover, the imaging axes 455a-c of the imaging sensors 450a-c may be angled with respect to a plane P normal to the collar axis C to observe separate sub-volumes 452 of the observed volume of space S. The separate sub-volumes 452 (i.e., fields of view) are displaced from one another along the collar axis C by a distance greater than twice a diameter D of the collar 710.

The imaging axis 455 of one of the imaging sensors 450a-c (e.g., the first or third imaging axis 455a, 455c) may be angled with respect to the plane P normal to the collar axis C to observe the volume of space S adjacent the robot at a height H along the collar axis C that is greater than or equal to the diameter D of the collar 710.

Figure 6E:
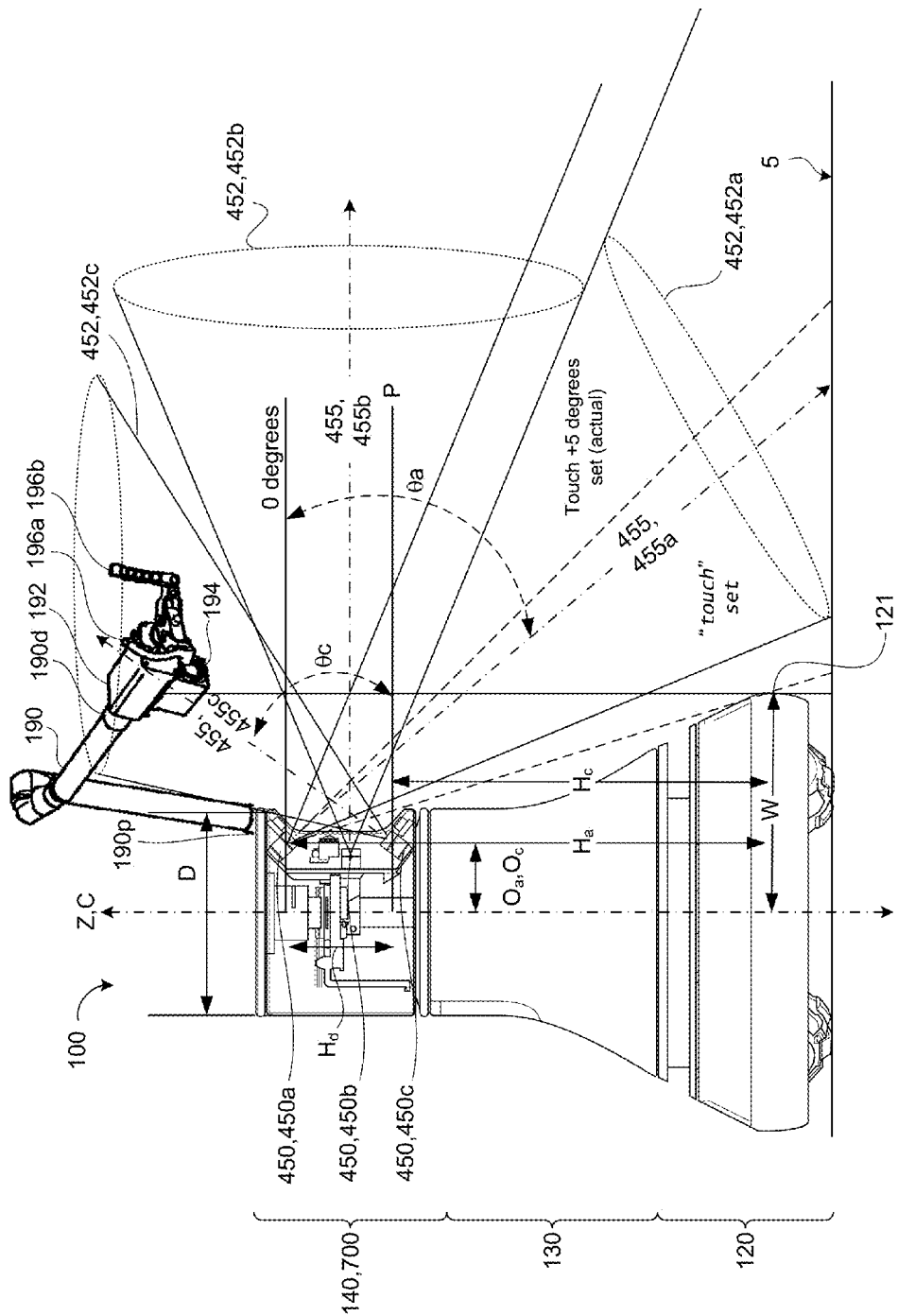
FIG. 6E is a side view of an exemplary mobile robot having first, second, and third imaging sensors.

Referring to FIG. 6E, in some implementations, the first and third imaging sensors 450a, 450c may have their corresponding imaging axes 455a, 455c arranged at corresponding angles θa, θc with respect to a plane P normal to the collar axis C of between about 45 degrees and about 65 degrees. The second imaging sensor 450b may have its imaging axis 455b arranged at angle θb=0+/−10 degrees with respect to the plane P normal to the collar axis C.

In some implementations, the first imaging sensor 450a may have its imaging axis 455a arranged at an angle θa with respect to the plane P normal to the collar axis C, where θa is calculated as:

$$\theta a = 90° - (\tfrac{1}{2} VFOV_a + \tan^{-1}((W-O_a)/H_a)) \quad (1)$$

$VFOV_a$ is the vertical field of view of the first imaging sensor 450a. W is the width from the vertical axis Z to a forward most edge 121 of the base 120. $O_a$ is an offset distance of the first imaging sensor 450a from the collar axis C. $H_a$ is a height of the first imaging sensor 450a with respect to the forward most edge 121 of the base 120. The first imaging sensor 450a may have an imaging axis angle of θa+/−10 degrees.

The third imaging sensor 450c may have its imaging axis 455c arranged at an angle θc with respect to the plane P normal to the collar axis C. θc may be calculated as:

$$\theta c = 90° - (\tfrac{1}{2} VFOV_c + \tan^{-1}((W-O_c)/H_c)) \quad (2)$$

where $VFOV_C$ is the vertical field of view of the third imaging sensor 450c, W is the width from the vertical axis Z to a forward most edge 121 of the base 120, $O_c$ is an offset distance of the third imaging sensor 450c from the collar axis C, and $H_c$ is a height of the third imaging sensor 450c with respect to the forward most edge 121 of the base 120.

In some examples, the third imaging sensor 450c may have its imaging axis 455c arranged at an angle θc, where θc is calculated as:

$$\theta c = 90° - \left(\tfrac{1}{2} VFOV_c + \tan^{-1}\left(\left(\tfrac{D}{2} - O_c\right)/H_d\right)\right) \quad (3)$$

where $H_d$ is the vertical distance (along the Z axis) between the first and third imaging sensors 450a, 450c.

The third imaging sensor 450b may be offset from a center axis Z, C of the robot 100 by an offset distance $O_c$ equal to between about 0.8 and about 1.2 times an offset distance $O_a$ between the first imaging sensor 450a and the center axis Z, C of the robot 100. In some examples, the third imaging sensor 450c may be offset from the center axis Z, C of the robot 100 by an offset distance $O_c$ substantially equal to the offset distance $O_a$ between the first imaging sensor 450a and the center axis Z, C of the robot 100.

Figure 6F:
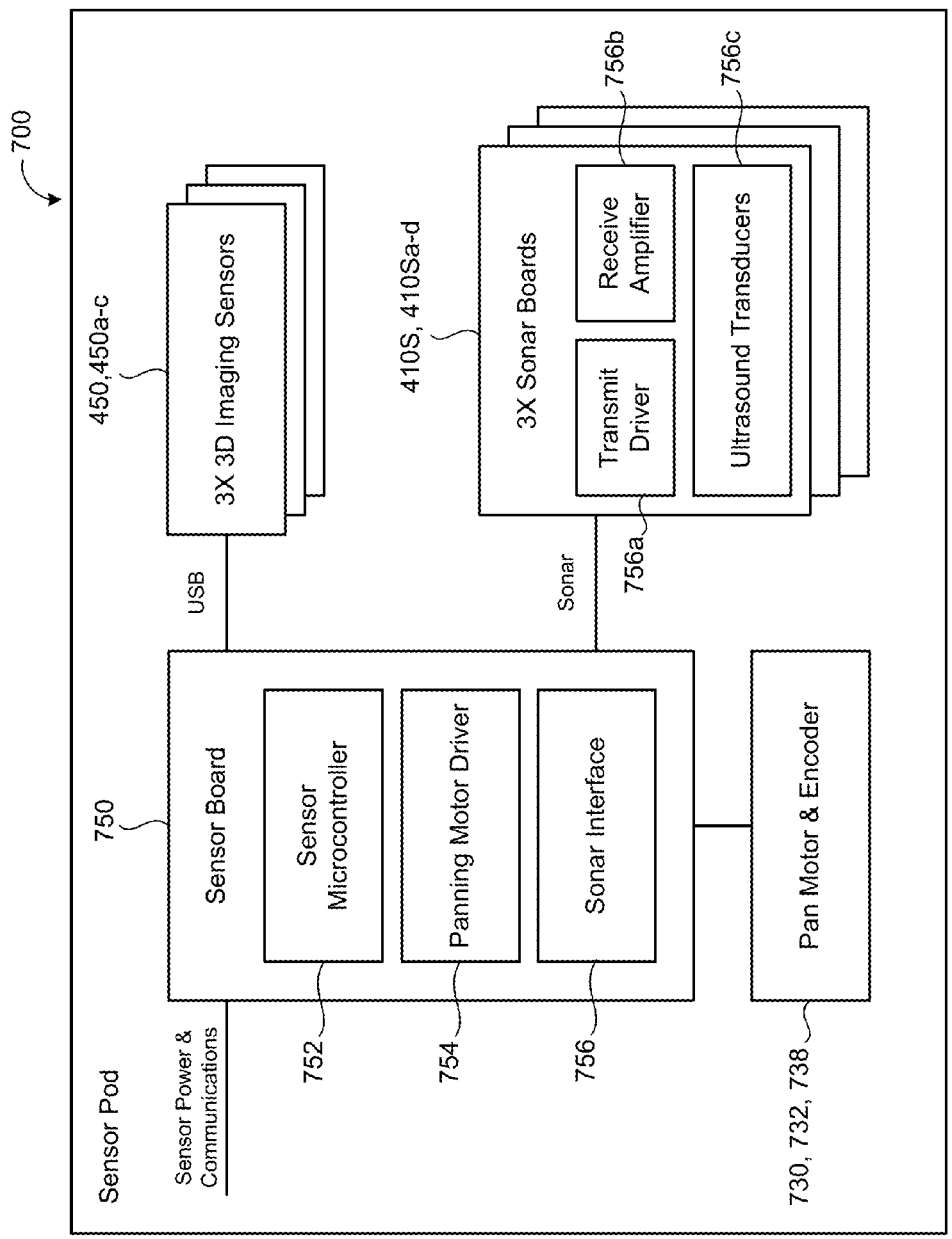
FIG. 6F is a perspective view of an exemplary sensor pod for a mobile robot.

Referring to FIG. 6F, in some examples, the sensor pod 700 includes a sensor board 750 (e.g., printed circuit board) having a microcontroller 752 (e.g., processor) in communication with a panning motor driver 754 and a sonar interface 756 for the sonar proximity sensors 410Sa-c. The sensor communicates with the collar actuator 730 (e.g., panning motor and encoder), the imaging sensor(s) 450, and the sonar proximity sensor(s) 410S, 410Sa-d. Each sonar proximity sensor 410S may include a transmit driver 756a, a receive amplifier 756b, and an ultrasound transducer 756c.

Figure 6G:
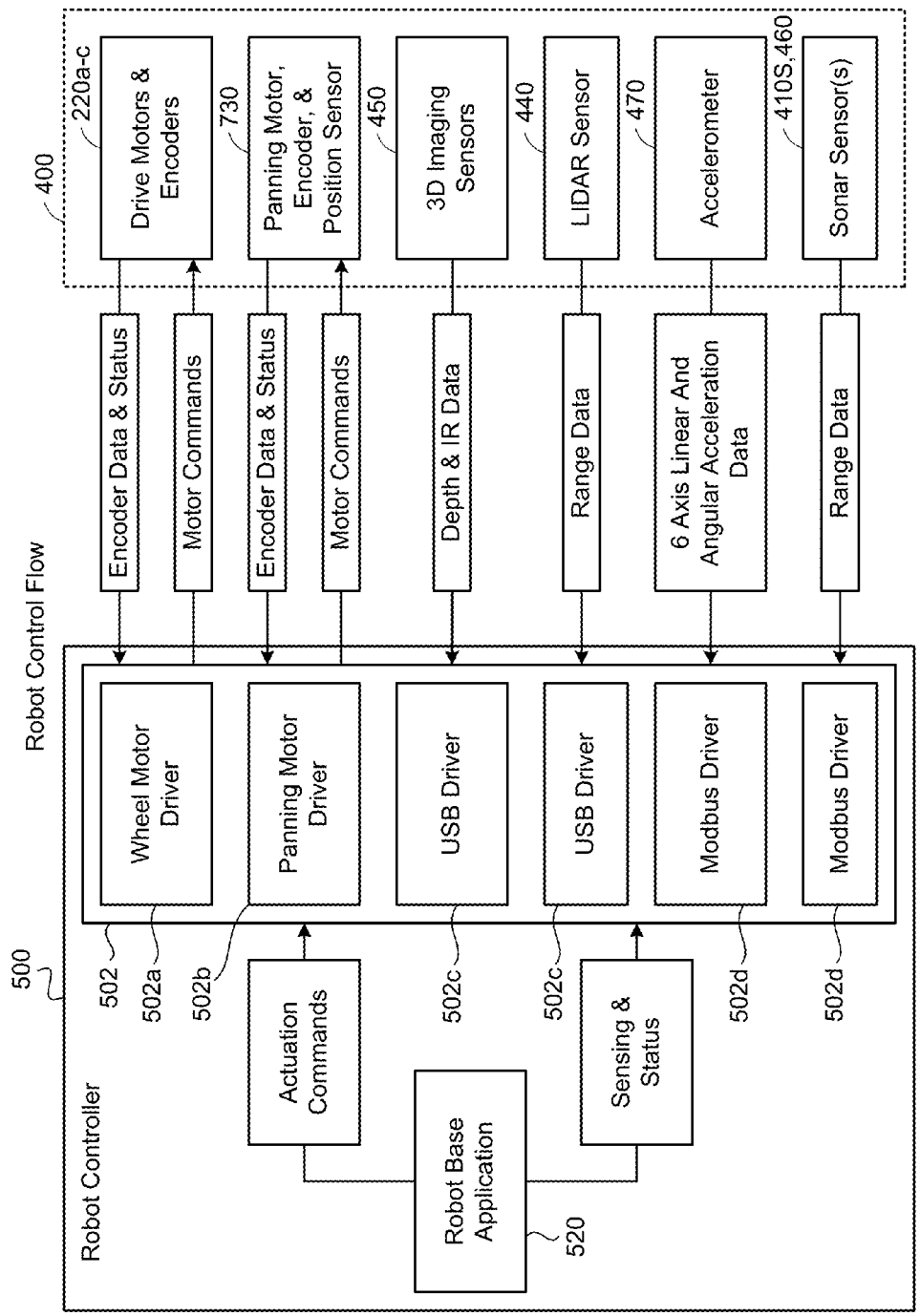
FIG. 6G provides a schematic view of exemplary robot control flow to and from a controller.
Figure 6H:
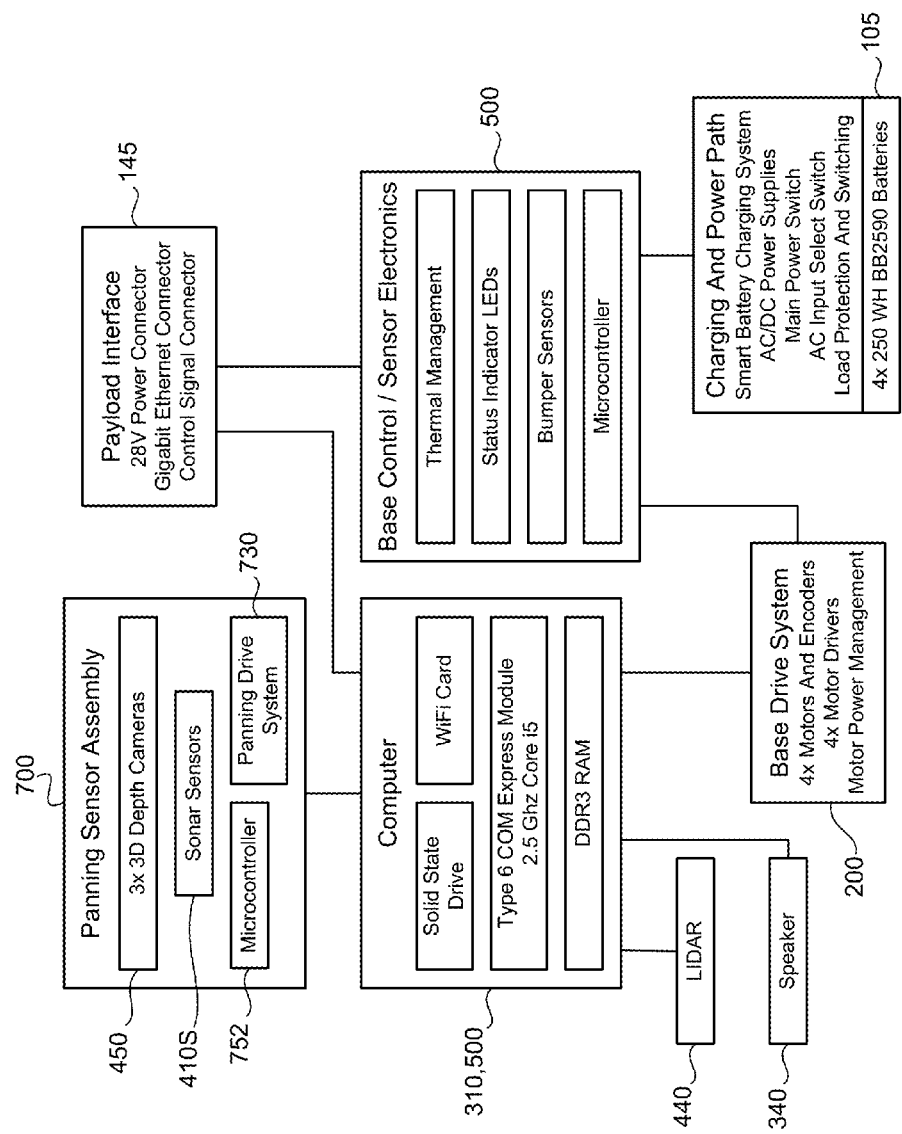
FIG. 6H provides a schematic view of an exemplary mobile robot.

FIG. 6G provides a schematic view of the robot control flow to and from the controller 500. A robot base application 520 executing on the controller 500 (e.g., executing on a control arbitration system 510b (FIG. 25A)) communicates with drivers 502 for communicating with the sensor system 400. In some examples, the robot base application 520 communicates with a wheel motor driver 502a for sending motor commands and receiving encoder data and status from the drive motors 220. The robot base application 520 may communicate with a panning motor driver 502b for sending motor commands and receiving encoder data and status from the panning system 730. The robot base application 520 may communicate with one or more USB drivers 502c for receiving sensor data from the LIDAR sensor 440 and/or the 3D imaging sensor(s) 450. Moreover, the robot base application 520 may communicate with one or more Modbus drivers 502d for receiving 6 axis linear and angular acceleration data from the IMU 470 and/or range data from the sonar sensors 410S, 460. FIG. 6H provides a schematic view of the robot 100.

An actuator, such as the neck 150, may move, with at least one degree of freedom, a portion of the robot body 110, such as the head 160, a manipulator or an end effector extending from the robot body 110 into the observed volume of space S. The end effector may be a display device, such as a tablet computer 310.

Referring again to FIG. 6E, in some examples, the robot 100 includes one or more arms 190 (e.g., articulated arms) each having a pivot end 190p pivotally coupled to the main body 110 and a distal end 190d that may be configured to receive a head or a gripper 192. The gripper 192 is mounted on the distal end 190d of the arm 190. In the example shown, the gripper 192 includes a gripper camera 194 and first and second opposing fingers or tongs 196a, 196b for grasping objects.

Figure 7:
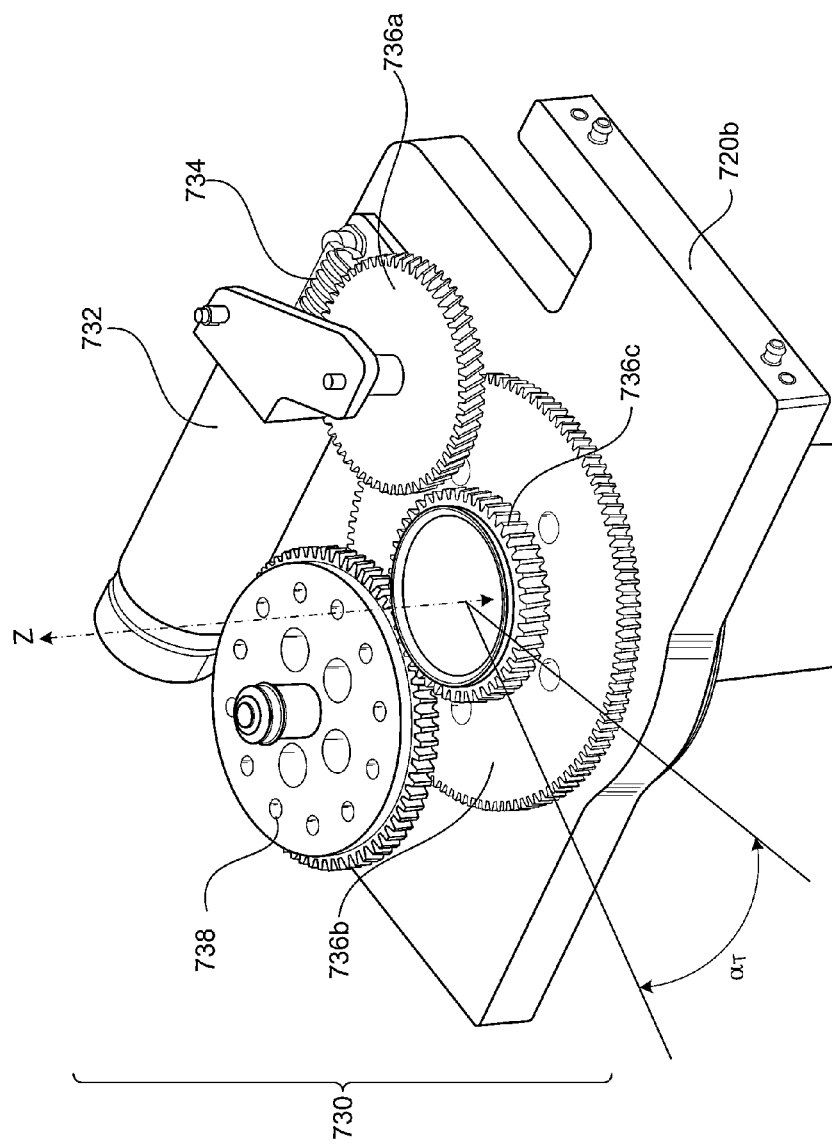
FIG. 7 is a perspective view of an exemplary gear assembly for rotation one body portion of a mobile robot with respect to another.

Referring to FIG. 7, in some implementations, a panning system 730 rotates the sensor pod 700 (or the torso 140) relative to the base body 120 and/or the head 160, providing a range of angular movement $\alpha_T$ (e.g., about the Z axis). The sensor pod 700 may rotate about the Z axis to increase a field of view 452 of the imaging sensor 450 and/or a field of view of other sensors of the system 400. The sensor pod 700 may house the panning system 730, which may include a motor 732 and a coupled gear 734 (e.g., spiral gear) that engages at least one additional gear 736a, 736b. The panning system 730 may include a rotary encoder 738 for converting the angular position of the sensor pod 700 (torso 140) to an analogue or digital code. The rotary encoder 738 provides information regarding the position of the sensor pod 700 with respect to its angular movement $\alpha_T$.

In some implementations, a spiral gear 734 of the motor 732 engages a first gear 736a having a pinion (not shown), which in turn engages a second gear 736b, which has a pinion 736c that engages the rotary encoder 738. The motor 732 rotates the spiral gear 734 which causes the gears 736a, 736b to rotate. The second gear 736a is fixed to the second interface 720b, translating the rotation of the second gear 736a to the sensor pod 700. The panning system 730 controls the speed and the range of angular movement $\alpha_T$ of the sensor pod 700 (torso 140).

Referring to FIGS. 6C and 8A-10E, the rotating sensor pod 700 (torso 140) creates a challenge for routing the electrical cables 20 from the base body 120 to the sensor pod 700 (torso 140) and/or through the sensor pod 700 (torso 140) to the head 160. In some implementations, slip rings (not shown) connect the electrical connections from the base body 120 to the head 160. A slip ring is a rotary coupling used to connect and transfer electrical current from a rotating part of a device to a stationary part of the device. Slip rings allow the sensor pod 700 (torso 140) to continuously rotate in one direction without restrictions regarding the angular movement $\alpha_T$ (e.g., about the Z axis) of the sensor pod 700 (torso 140). A cable carrier 770, 800, 900, 1000 disposed adjacent the collar 710 and connected to one of the interfaces 720a, 720b routes at least one cable 20 to the rotatable collar 710.

In some implementations, the sensor pod 700 includes a cable carrier 770 for routing cables 20 (e.g., instead of using slip rings) to route electrical connections from the base body 120 and/or the head 160 to the sensor pod 700. The cable carrier 770 houses and guides electrical cables 20 to prevent entanglement and twisting of the cables 20. In addition, the cable carrier 770 reduces wear and stress on the electrical cables 20 and prevents the cable 20 from bending below a minimum bending radius. Cables 20 usually have a minimum bend radius R, which is the minimum radius that the cable 20 can be bent without incurring damage. Therefore, the flexibility and bend radius R of the cable 20 are important factors for designing a device using cable carriers 770. Cable carriers 770 have a limited rotational movement $\alpha_C$ (e.g., about the Z axis), since they are controlled by the length of the cables 20 they are routing. Therefore, the use of cable carriers 770 may limit the rotation of the sensor pod 700, since the angular movement $\alpha_T$ of the sensor pod 700 may not exceed the rotational movement $\alpha_C$ of the cable carrier 770.

Figure 8A:
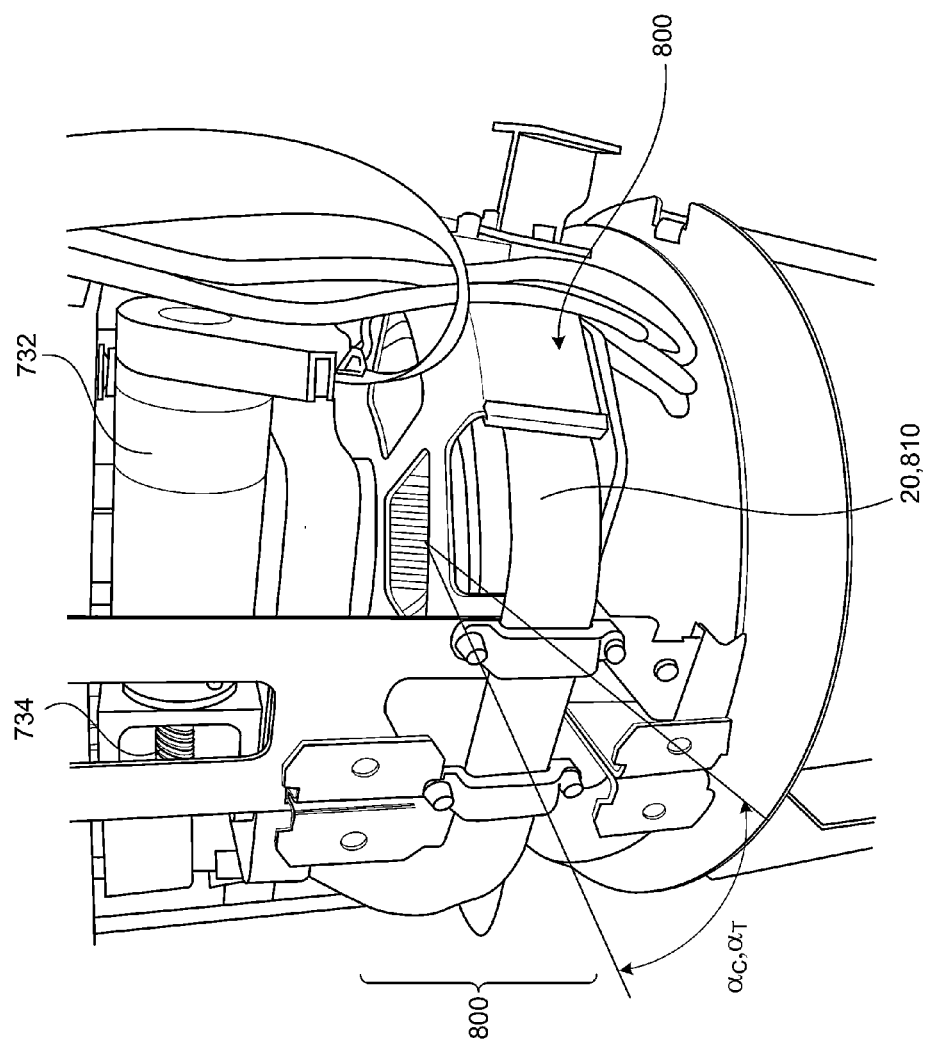
FIG. 8A is a partial perspective view of an exemplary cable routing system for a mobile robot.
Figure 8B:
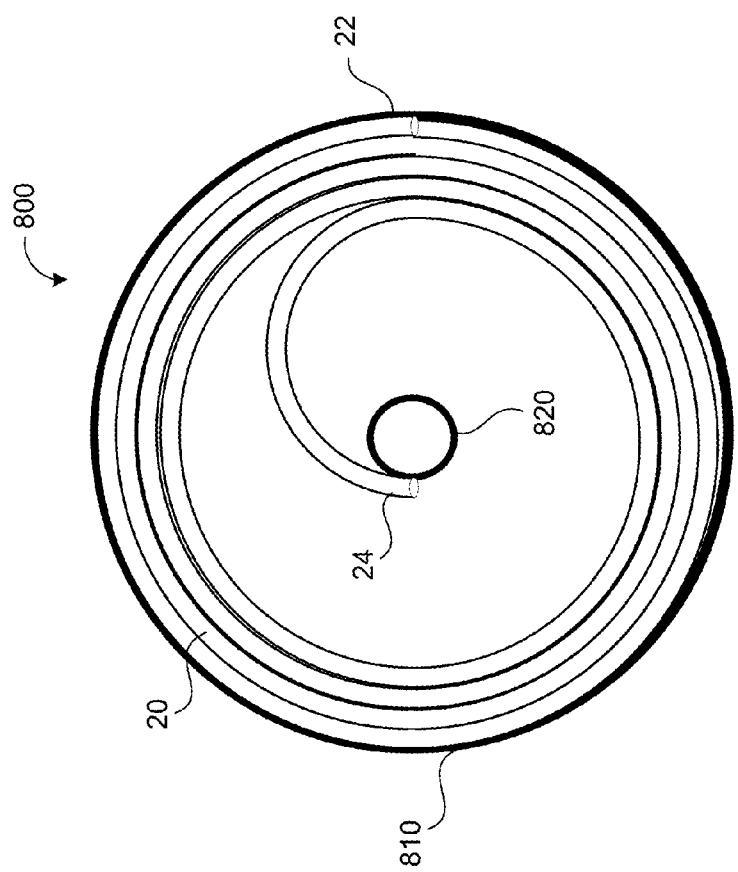
FIG. 8B is a schematic view of an exemplary spiral wrapped cable routing system.
Figure 10C:
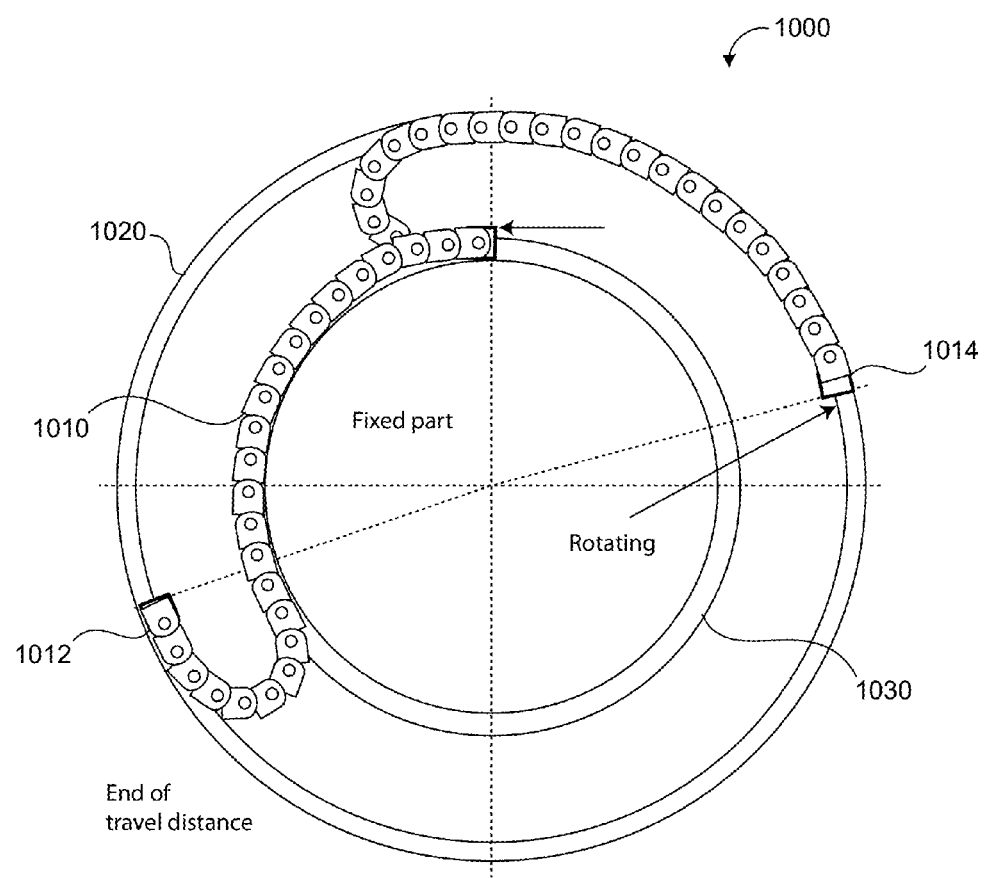
FIGS. 10C-10E are schematic views of an exemplary reverse bending radius cable routing system.
Figure 10D:
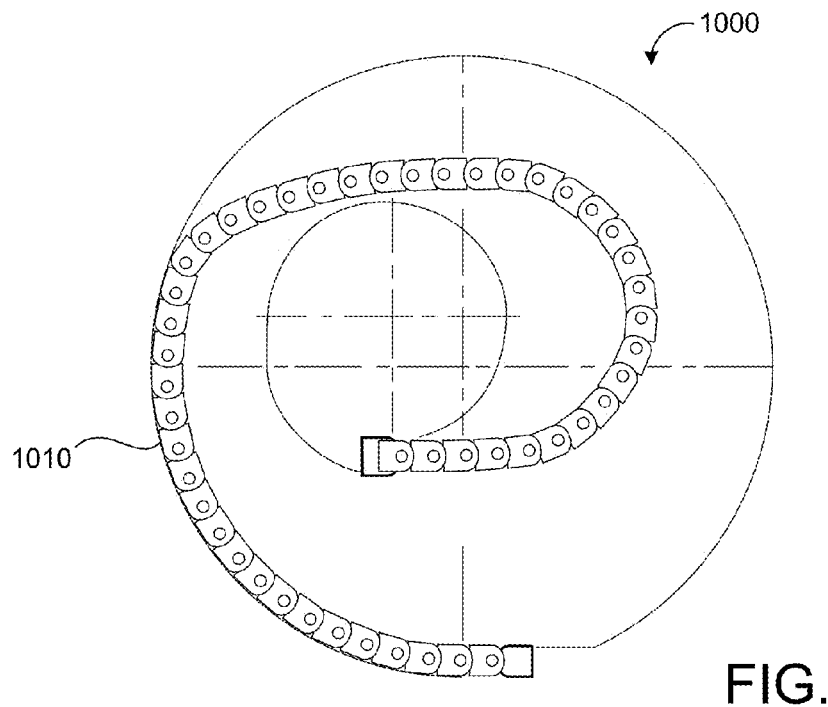
Figure 10E:
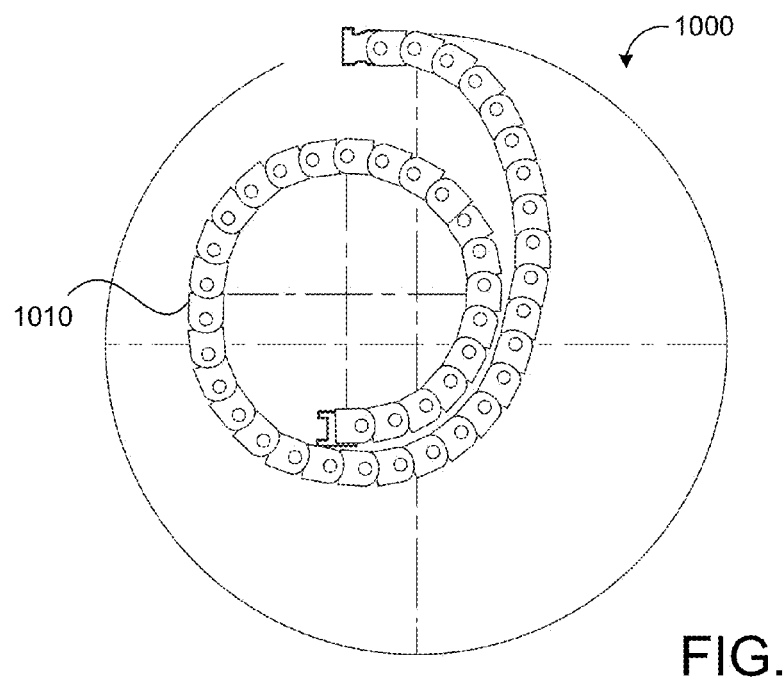

Referring to FIGS. 8A-8B, in some implementations, the cable carrier 800 includes an outer ring 810 (e.g., continuous or non-continuous structure) housing an inner ring 820 disposed concentrically with the outer ring 810 along the collar axis C, with a spirally arranged cable 20 housed therebetween. The cable 20 has a first end 22 attached to the outer ring 810 and a second end 24 attached to the inner ring 820, with cable wrapped in a spiral pattern about the inner ring 820. In some examples, the outer ring 810 rotates with respect to a stationary inner ring 820, or the outer ring 810 may be stationary with respect to a rotating inner ring 820. In other examples, both the outer ring 810 and the inner ring 820 rotate in opposite directions. As the rings 810, 820 rotate relative to each other, the wound cable 20 loosens or tightens around the inner ring 820. Therefore, the length of the cable 20 controls the range of rotation $\alpha_T$ of the sensor pod 700.

Referring to FIGS. 9A-9C, in some examples, a folded twisting cable carrier 900 routes the cables 20 to/from the sensor pod 700. A first end 902 of the folded twisting cable carrier 900 connects to an upper plate 910 and wraps around vertical axis Zc in clockwise direction. The folded twisting cable carrier 900 folds upon itself, at a fold region 906, and then wraps around the axis Z in a counterclockwise direction. A second end 904 of the folded twisting cable carrier 900 connects to a lower plate 920. The folded twisting cable carrier 900 may be formed of a plurality of interconnected links 908.

The folded twisting cable carrier 900 allows for a horizontal rotary movement of 7000° or more, and a vertical rotary movement (along the Zc axis) of up to 3000°. The folded twisting cable carrier 900 may be easily adjusted to control the angle of rotation $\alpha_C$. Reducing the number of links 908 reduces the rotary angle $\alpha_C$. If the number of links 908 increases the rotary angle $\alpha_C$ increases as well. In some implementations, the sensor pod 700 has a limited space for the cable carrier 900, therefore the number of links 908 may also be limited. The folded twisting cable carrier 900 may have a speed of up to 360°/second allowing the sensor pod 700 to rotate and scan its entire surroundings within 1 second.

Referring to FIG. 10A-10E, in some examples, a reverse bending radius cable carrier 1000 routes the cables 20 to/from the sensor pod 700. The reverse bending radius cable carrier 1000 is limited to a maximum of 450°, and therefore the sensor pod 700 is limited to a maximum of 450°. The reverse bending radius cable carrier 1000 allows the cables 20 to move two directions.

The reverse bending radius cable carrier 1000 includes a cable carrier 1010 having a first end 1012 attached to an outer ring 1020 and a second end 1014 attached to an inner ring 1030 disposed within the outer ring 1020. The cable carrier 1010 has a reverse bend, such that it folds upon itself as the rings 1020, 1030 rotate relative to each other. The outer ring 1020 and the inner ring 1030 may rotate in opposite directions. For example, the outer ring 1020 may rotate in a clockwise direction, while the inner ring 1030 rotates in a counterclockwise direction or vice-versa. In some examples, the outer ring 1020 is stationary with respect to the rotating inner ring 1030 or vice-versa. As one ring 1020, 1030 rotates with respect to the other, the cable carrier 1010 wraps or unwraps from around the inner ring 1030. The outer and inner rings 1020, 1030 are sized and arranged such that the cable carrier 1010 maintains the minimum bending radius of the routed cables 20. In some examples, the outer ring 1020 rotates with respect to a stationary inner ring 1030; however, both rings 1020, 1030 may move independently with respect to each other. The continuous wrapping of the cable carrier 1010 in the clockwise and counter clockwise directions gives the sensor pod 700 its horizontal rotational range of motion.

A channel 704 (e.g., a pipe) may extends through the collar 710 from the first interface 720a to the second interface 720b for routing cables 20 though the sensor pod 700. For example, the channel 704 may route cables extending from the base 120 to the head 160.

Referring to FIGS. 1-3C, to achieve reliable and robust autonomous movement, the sensor system 400 may include several different types of sensors which can be used in conjunction with one another to create a perception of the robot's environment sufficient to allow the robot 100 to make intelligent decisions about actions to take in that environment. The sensor system 400 may include one or more types of sensors supported by the robot body 110, which may include obstacle detection obstacle avoidance (ODOA) sensors, communication sensors, navigation sensors, etc. For example, these sensors may include, but not limited to, proximity sensors, contact sensors, three-dimensional (3D) imaging/depth map sensors, a camera (e.g., visible light and/or infrared camera), sonar, radar, LIDAR (Light Detection And Ranging, which can entail optical remote sensing that measures properties of scattered light to find range and/or other information of a distant target), LADAR (Laser Detection and Ranging), etc.

In some implementations, the sensor system 400 includes a set or an array of proximity sensors 410 in communication with the controller 500 and arranged in one or more zones or portions of the robot 100 for detecting any nearby or intruding obstacles. In the example shown in FIG. 3A, the sensor system 400 includes the first, second, and third proximity sensors 410a, 410b, 410c disposed on the torso 140. The proximity sensors 410 may be converging infrared (IR) emitter-sensor elements, sonar sensors, ultrasonic sensors, and/or imaging sensors (e.g., 3D depth map image sensors) that provide a signal to the controller 500 when an object is within a given range of the robot 100.

Referring to FIGS. 1-6H, in some implementations, the sensor system 400 includes a laser scanner 440 mounted on a forward portion of the robot body 110 and in communication with the controller 500. In the examples shown, the laser scanner 440 is mounted on the base body 120 facing forward (e.g., having a field of view along the forward drive direction F) on or above the first base body 124a (e.g., to have maximum imaging coverage along the drive direction F of the robot). Moreover, the placement of the laser scanner 440 on or near the front tip of the triangular base 120 means that the external angle of the robotic base (e.g., 300 degrees) is greater than a field of view 442 of the laser scanner 440 (e.g., ~285 degrees), thus preventing the base 120 from occluding or obstructing the detection field of view 442 of the laser scanner 440. The laser scanner 440 can be mounted recessed within the base body 124 as much as possible without occluding its fields of view, to minimize any portion of the laser scanner sticking out past the base body 124 (e.g., for aesthetics and to minimize snagging on obstacles).

The laser scanner 440 scans an area about the robot 100 and the controller 500, using signals received from the laser scanner 440, creates an environment map or object map of the scanned area. The controller 500 may use the object map for navigation, obstacle detection, and obstacle avoidance. Moreover, the controller 500 may use sensory inputs from other sensors of the sensor system 400 for creating object map and/or for navigation.

In some examples, the laser scanner 440 is a scanning LIDAR, which may use a laser that quickly scans an area in one dimension, as a "main" scan line, and a time-of-flight imaging element that uses a phase difference or similar technique to assign a depth to each pixel generated in the line (returning a two dimensional depth line in the plane of scanning) In order to generate a three dimensional map, the LIDAR can perform an "auxiliary" scan in a second direction (for example, by "nodding" the scanner). This mechanical scanning technique can be complemented, if not supplemented, by technologies such as the "Flash" LIDAR/LADAR and "Swiss Ranger" type focal plane imaging element sensors, techniques which use semiconductor stacks to permit time of flight calculations for a full 2-D matrix of pixels to provide a depth at each pixel, or even a series of depths at each pixel (with an encoded illuminator or illuminating laser).

The sensor system 400 includes the one or more imaging sensors 450, which may be configured as three-dimensional (3-D) image sensors (i.e., three dimensional volumetric point cloud imaging devices) in communication with the controller 500. If the 3-D image sensor 450 has a limited field of view, the controller 500 or the sensor system 400 can actuate the 3-D image sensor 450a in a side-to-side scanning manner to create a relatively wider field of view to perform robust ODOA.

The 3-D image sensors 450 may be capable of producing the following types of data: (i) a depth map, (ii) a reflectivity based intensity image, and/or (iii) a regular intensity image. The 3-D image sensors 450 may obtain such data by image pattern matching, measuring the flight time and/or phase delay shift for light emitted from a source and reflected off of a target. Additional features combinable herewith can b In some implementations, reasoning or control software, executable on a processor (e.g., of the robot controller 500), uses a combination of algorithms executed using various data types generated by the sensor system 400. The reasoning software processes the data collected from the sensor system 400 and outputs data for making navigational decisions on where the robot 100 can move without colliding with an obstacle, for example. By accumulating imaging data over time of the robot's surroundings, the reasoning software can in turn apply effective methods to selected segments of the sensed image(s) to improve depth measurements of the 3-D image sensors 450. This may include using appropriate temporal and spatial averaging techniques.

The reliability of executing robot collision free moves may be based on: (i) a confidence level built by high level reasoning over time and (ii) a depth-perceptive sensor that accumulates three major types of data for analysis— (a) a depth image, (b) an active illumination image and (c) an ambient illumination image. Algorithms cognizant of the different types of data can be executed on each of the images obtained by the depth-perceptive imaging sensor 450. The aggregate data may improve the confidence level a compared to a system using only one of the kinds of data.

The 3-D image sensors 450 may obtain images containing depth and brightness data from a scene about the robot 100 (e.g., a sensor view portion of a room or work area) that contains one or more objects. The controller 500 may be configured to determine occupancy data for the object based on the captured reflected light from the scene. Moreover, the controller 500, in some examples, issues a drive command to the drive system 200 based at least in part on the occupancy data to circumnavigate obstacles (i.e., the object in the scene). The 3-D image sensors 450 may repeatedly capture scene depth images for real-time decision making by the controller 500 to navigate the robot 100 about the scene without colliding into any objects in the scene. For example, the speed or frequency in which the depth image data is obtained by the 3-D image sensors 450 may be controlled by a shutter speed of the 3-D image sensors 450. In addition, the controller 500 may receive an event trigger (e.g., from another sensor component of the sensor system 400, such as proximity sensor 410, notifying the controller 500 of a nearby object or hazard. The controller 500, in response to the event trigger, can cause the 3-D image sensors 450 to increase a frequency at which depth images are captured and occupancy information is obtained.

In some implementations, the robot includes a sonar scanner 460 for acoustic imaging of an area surrounding the robot 100. In the examples shown in FIGS. 1 and 2, the sonar scanner 460 is disposed on a forward portion of the base body 120.

Referring to FIGS. 1-3B, in some implementations, the robot 100 uses the laser scanner or laser range finder 440 for redundant sensing, an optionally a rear-facing sonar proximity sensor for safety, both of which are oriented parallel to the ground 5.

Referring again to FIGS. 3A and 4A, the sensor system 400 may include an inertial measurement unit (IMU) 470 in communication with the controller 500 to measure and monitor a moment of inertia of the robot 100 with respect to the overall center of gravity $CG_R$ of the robot 100.

The controller 500 may monitor any deviation in feedback from the IMU 470 from a threshold signal corresponding to normal unencumbered operation. For example, if the robot begins to pitch away from an upright position, it may be "clothes lined" or otherwise impeded, or someone may have suddenly added a heavy payload. In these instances, it may be necessary to take urgent action (including, but not limited to, evasive maneuvers, recalibration, and/or issuing an audio/visual warning) in order to assure safe operation of the robot 100.

Since robot 100 may operate in a human environment, it may interact with humans and operate in spaces designed for humans (and without regard for robot constraints). The robot 100 can limit its drive speeds and accelerations when in a congested, constrained, or highly dynamic environment, such as at a cocktail party or busy hospital. However, the robot 100 may encounter situations where it is safe to drive relatively fast, as in a long empty corridor, but yet be able to decelerate suddenly, as when something crosses the robots' motion path.

When accelerating from a stop, the controller 500 may take into account a moment of inertia of the robot 100 from its overall center of gravity $CG_R$ to prevent robot tipping. The controller 500 may use a model of its pose, including its current moment of inertia. When payloads are supported, the controller 500 may measure a load impact on the overall center of gravity $CG_R$ and monitor movement of the robot moment of inertia. For example, the torso 140 and/or neck 150 may include strain gauges to measure strain. If this is not possible, the controller 500 may apply a test torque command to the drive wheels 210 and measure actual linear and angular acceleration of the robot using the IMU 470, in order to experimentally determine safe limits.

During a sudden deceleration, a commanded load on the second and third drive wheels 210b, 210c (the rear wheels) is reduced, while the first drive wheel 210a (the front wheel) slips in the forward drive direction and supports the robot 100. If the loading of the second and third drive wheels 210b, 210c (the rear wheels) is asymmetrical, the robot 100 may "yaw" which will reduce dynamic stability. The IMU 470 (e.g., a gyro) can be used to detect this yaw and command the second and third drive wheels 210b, 210c to reorient the robot 100.

Referring to FIG. 11, in some implementations, the 3-D imaging sensor 450 includes a light source 1172 that emits light onto a scene 10, such as the area around the robot 100 (e.g., a room). The imaging sensor 450 may also include an imager 1174 (e.g., an array of light-sensitive pixels 1174p) which captures reflected light from the scene 10, including reflected light that originated from the light source 1172 (e.g., as a scene depth image). In some examples, the imaging sensor 450 includes a light source lens 1176 and/or a detector lens 1178 for manipulating (e.g., speckling or focusing) the emitted and received reflected light, respectively. The robot controller 500 or a sensor controller (not shown) in communication with the robot controller 500 receives light signals from the imager 1174 (e.g., the pixels 1174p) to determine depth information for an object 12 in the scene 10 based on image pattern matching and/or a time-of-flight characteristic of the reflected light captured by the imager 1174.

Figure 12:
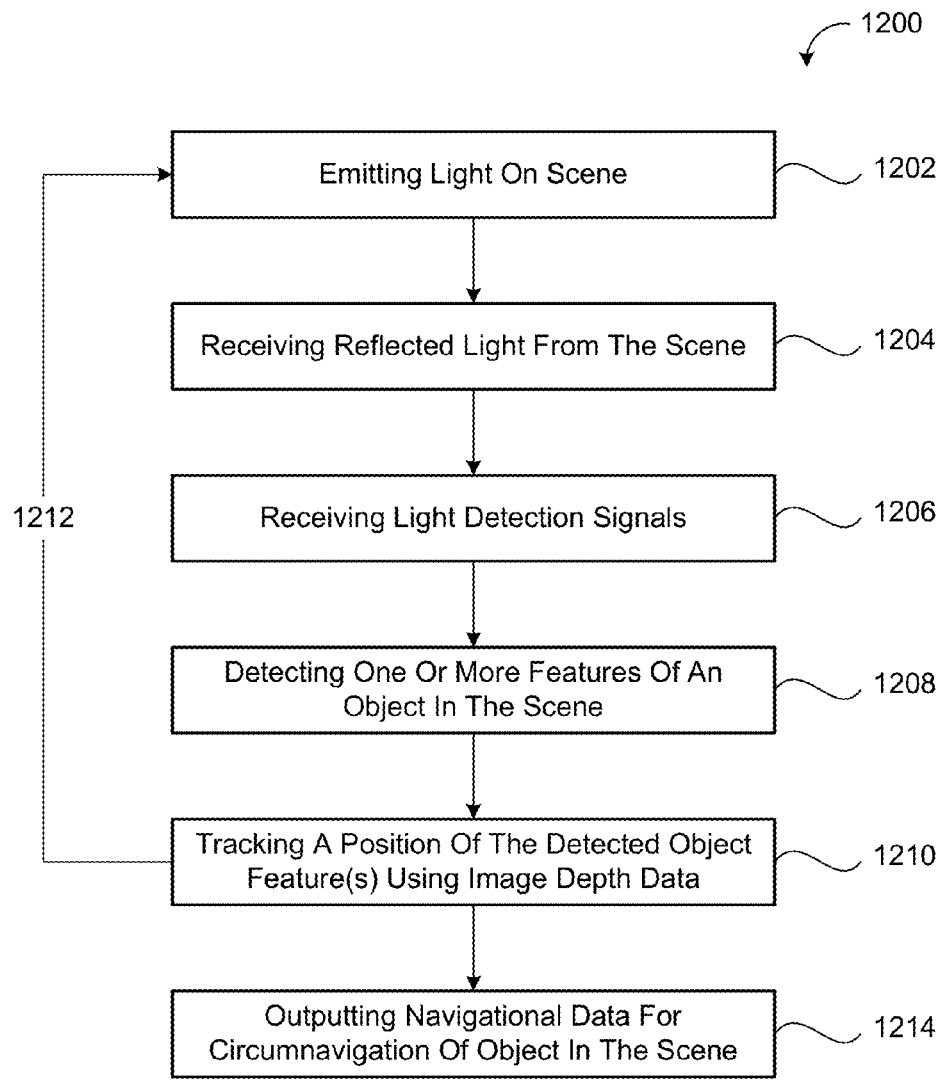
FIG. 12 is a schematic view of an exemplary arrangement of operations for operating an imaging sensor.

FIG. 12 provides an exemplary arrangement 1200 of operations for operating the imaging sensor 450. With additional reference to FIG. 10A, the operations include emitting 1202 light onto a scene 10 about the robot 100 and receiving 1204 reflections of the emitted light from the scene 10 on an imager (e.g., array of light-sensitive pixels). The operations further include the controller 500 receiving 1206 light detection signals from the imager, detecting 1208 one or more features of an object 12 in the scene 10 using image data derived from the light detection signals, and tracking 1210 a position of the detected feature(s) of the object 12 in the scene 10 using image depth data derived from the light detection signals. The operations may include repeating 1212 the operations of emitting 1202 light, receiving 1204 light reflections, receiving 1206 light detection signals, detecting 1208 object feature(s), and tracking 12010 a position of the object feature(s) to increase a resolution of the image data or image depth data, and/or to provide a confidence level.

The repeating 1212 operation can be performed at a relatively slow rate (e.g., slow frame rate) for relatively high resolution, an intermediate rate, or a high rate with a relatively low resolution. The frequency of the repeating 1212 operation may be adjustable by the robot controller 500. In some implementations, the controller 500 may raise or lower the frequency of the repeating 1212 operation upon receiving an event trigger. For example, a sensed item in the scene may trigger an event that causes an increased frequency of the repeating 1212 operation to sense a possibly eminent object 12 (e.g., doorway, threshold, or cliff) in the scene 10. In additional examples, a lapsed time event between detected objects 12 may cause the frequency of the repeating 1212 operation to slow down or stop for a period of time (e.g., go to sleep until awakened by another event). In some examples, the operation of detecting 1208 one or more features of an object 12 in the scene 10 triggers a feature detection event causing a relatively greater frequency of the repeating operation 1212 for increasing the rate at which image depth data is obtained. A relatively greater acquisition rate of image depth data can allow for relatively more reliable feature tracking within the scene.

The operations also include outputting 1214 navigation data for circumnavigating the object 12 in the scene 10. In some implementations, the controller 500 uses the outputted navigation data to issue drive commands to the drive system 200 to move the robot 100 in a manner that avoids a collision with the object 12.

In some implementations, the sensor system 400 detects multiple objects 12 within the scene 10 about the robot 100 and the controller 500 tracks the positions of each of the detected objects 12. The controller 500 may create an occupancy map of objects 12 in an area about the robot 100, such as the bounded area of a room. The controller 500 may use the image depth data of the sensor system 400 to match a scene 10 with a portion of the occupancy map and update the occupancy map with the location of tracked objects 12.

Figure 13:
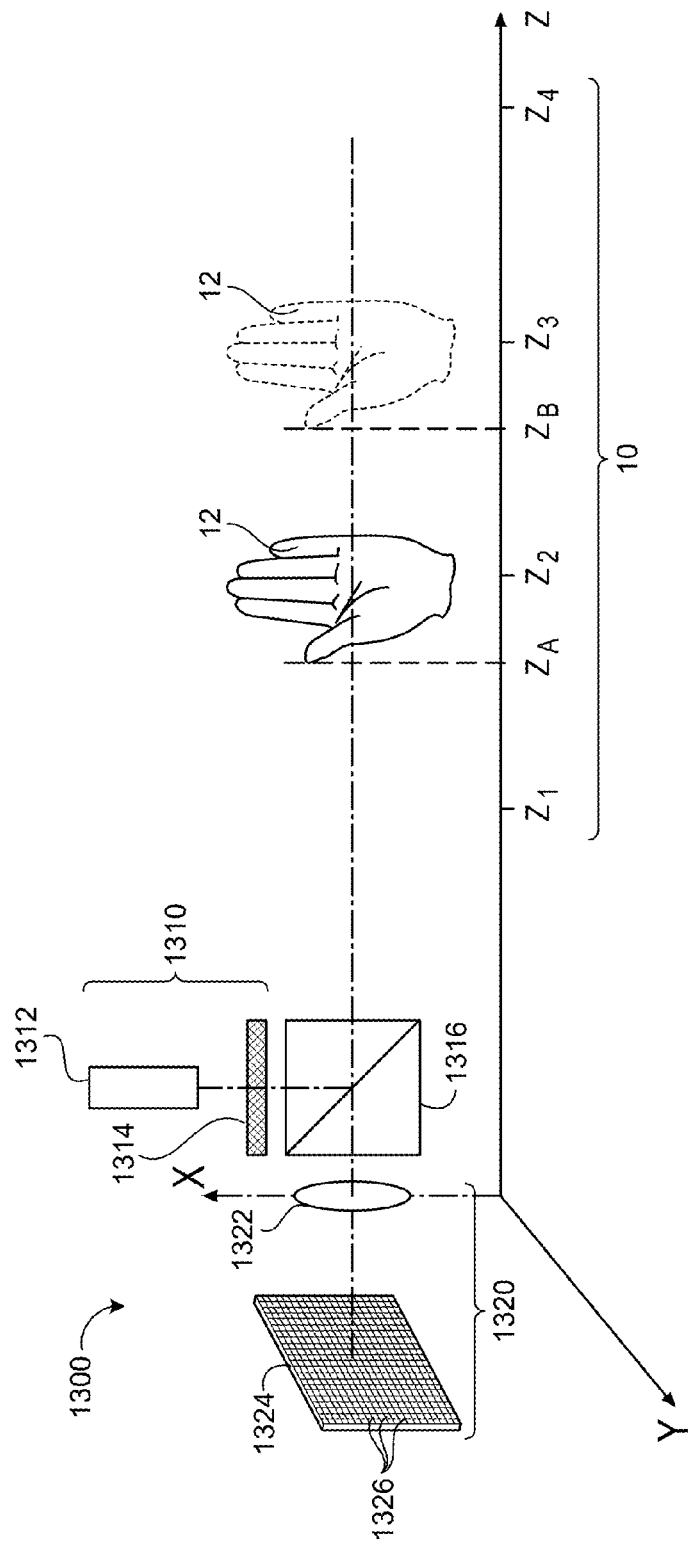
FIG. 13 is a schematic view of an exemplary three-dimensional (3D) speckle camera sensing an object in a scene.

Referring to FIG. 13, in some implementations, the 3-D image sensor 450 includes a three-dimensional (3D) speckle camera 1300, which allows image mapping through speckle decorrelation. The speckle camera 1300 includes a speckle emitter 1310 (e.g., of infrared, ultraviolet, and/or visible light) that emits a speckle pattern into the scene 10 (as a target region) and an imager 1320 that captures images of the speckle pattern on surfaces of an object 12 in the scene 10.

The speckle emitter 1310 may include a light source 1312, such as a laser, emitting a beam of light into a diffuser 1314 and onto a reflector 1316 for reflection, and hence projection, as a speckle pattern into the scene 10. The imager 1320 may include objective optics 1322, which focus the image onto an image sensor 1324 having an array of light detectors 1326, such as a CCD or CMOS-based image sensor. Although the optical axes of the speckle emitter 1310 and the imager 1320 are shown as being collinear, in a decorrelation mode for example, the optical axes of the speckle emitter 1310 and the imager 1320 may also be non-collinear, while in a cross-correlation mode for example, such that an imaging axis is displaced from an emission axis.

The speckle emitter 1310 emits a speckle pattern into the scene 10 and the imager 1320 captures reference images of the speckle pattern in the scene 10 at a range of different object distances $Z_n$ from the speckle emitter 1310 (e.g., where the Z-axis can be defined by the optical axis of imager 1320). In the example shown, reference images of the projected speckle pattern are captured at a succession of planes at different, respective distances from the origin, such as at the fiducial locations marked $Z_1$, $Z_2$, $Z_3$, and so on. The distance between reference images, $\Delta Z$, can be set at a threshold distance (e.g., 5 mm) or adjustable by the controller 500 (e.g., in response to triggered events). The speckle camera 1300 archives and indexes the captured reference images to the respective emission distances to allow decorrelation of the speckle pattern with distance from the speckle emitter 1310 to perform distance ranging of objects 12 captured in subsequent images. Assuming $\Delta Z$ to be roughly equal to the distance between adjacent fiducial distances $Z_1$, $Z_2$, $Z_3$, ..., the speckle pattern on the object 12 at location $Z_A$ can be correlated with the reference image of the speckle pattern captured at $Z_2$, for example. On the other hand, the speckle pattern on the object 12 at $Z_B$ can be correlated with the reference image at $Z_3$, for example. These correlation measurements give the approximate distance of the object 12 from the origin. To map the object 12 in three dimensions, the speckle camera 1300 or the controller 500 receiving information from the speckle camera 1300 can use local cross-correlation with the reference image that gave the closest match.

Other details and features on 3D image mapping using speckle ranging, via speckle cross-correlation using triangulation or decorrelation, for example, which may combinable with those described herein, can be found in PCT Patent Application PCT/IL2006/000335; the contents of which is hereby incorporated by reference in its entirety.

Figure 14:
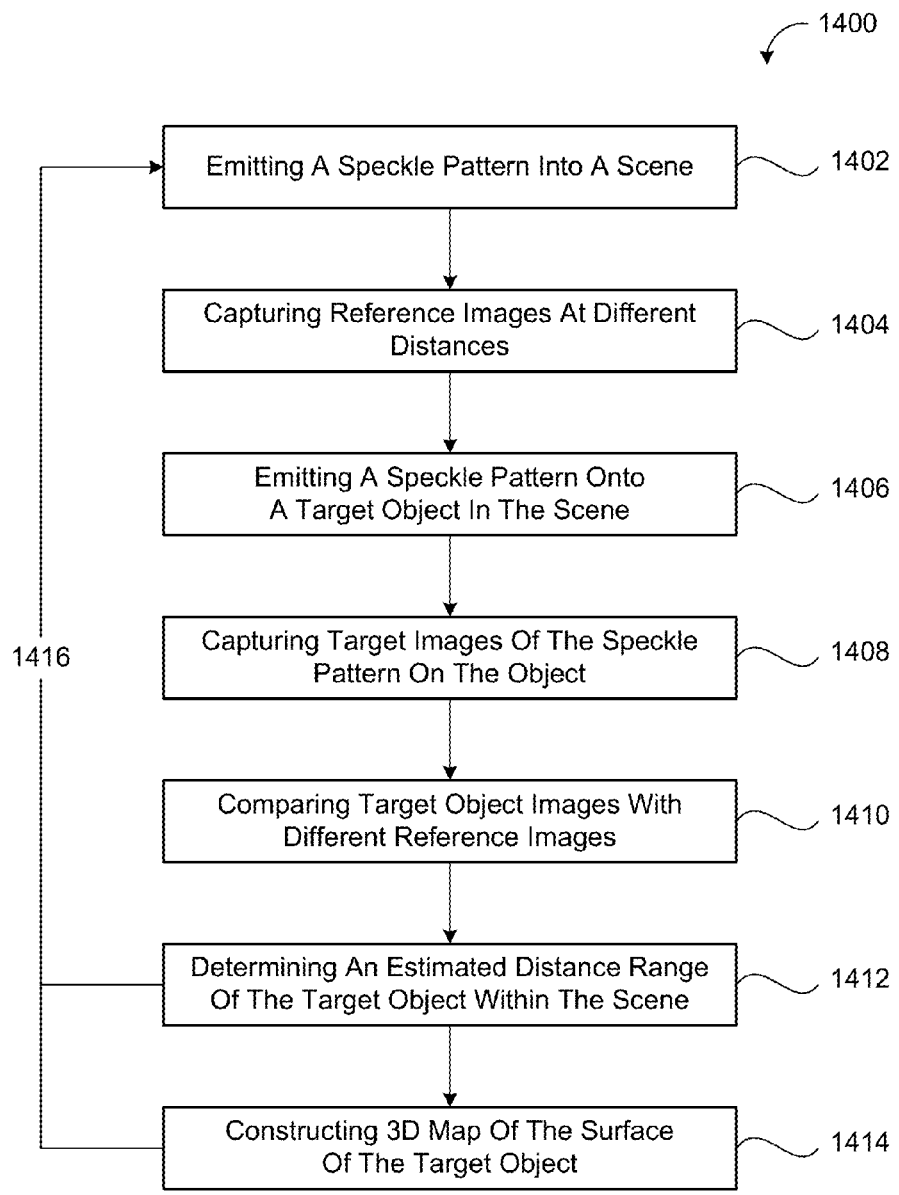
FIG. 14 is a schematic view of an exemplary arrangement of operations for operating a 3D speckle camera.

FIG. 14 provides an exemplary arrangement 1400 of operations for operating the speckle camera 1300. The operations include emitting 1402 a speckle pattern into the scene 10 and capturing 1404 reference images (e.g., of a reference object 12) at different distances from the speckle emitter 1310. The operations further include emitting 1406 a speckle pattern onto a target object 12 in the scene 10 and capturing 1408 target images of the speckle pattern on the object 12. The operations further include comparing 1410 the target images (of the speckled object) with different reference images to identify a reference pattern that correlates most strongly with the speckle pattern on the target object 12 and determining 1412 an estimated distance range of the target object 12 within the scene 10. This may include determining a primary speckle pattern on the object 12 and finding a reference image having speckle pattern that correlates most strongly with the primary speckle pattern on the object 12. The distance range can be determined from the corresponding distance of the reference image.

The operations optionally include constructing 1414 a 3D map of the surface of the object 12 by local cross-correlation between the speckle pattern on the object 12 and the identified reference pattern, for example, to determine a location of the object 12 in the scene. This may include determining a primary speckle pattern on the object 12 and finding respective offsets between the primary speckle pattern on multiple areas of the object 12 in the target image and the primary speckle pattern in the identified reference image so as to derive a three-dimensional (3D) map of the object. The use of solid state components for 3D mapping of a scene provides a relatively inexpensive solution for robot navigational systems.

Typically, at least some of the different, respective distances are separated axially by more than an axial length of the primary speckle pattern at the respective distances. Comparing the target image to the reference images may include computing a respective cross-correlation between the target image and each of at least some of the reference images, and selecting the reference image having the greatest respective cross-correlation with the target image.

The operations may include repeating 1416 operations 1402-1412 or operations 1406-1412, and optionally operation 1414, (e.g., continuously) to track motion of the object 12 within the scene 10. For example, the speckle camera 1300 may capture a succession of target images while the object 12 is moving for comparison with the reference images.

Other details and features on 3D image mapping using speckle ranging, which may combinable with those described herein, can be found in U.S. Pat. No. 7,433,024; U.S. Patent Application Publication No. 2008/0106746, entitled "Depth-varying light fields for three dimensional sensing"; U.S. Patent Application Publication No. 2010/0118123, entitled "Depth Mapping Using Projected Patterns"; U.S. Patent Application Publication No. 2010/0034457, Entitled "Modeling Of Humanoid Forms From Depth Maps"; U.S. Patent Application Publication No. 2010/0020078, Entitled "Depth Mapping Using Multi-Beam Illumination"; U.S. Patent Application Publication No. 2009/0185274, Entitled "Optical Designs For Zero Order Reduction"; U.S. Patent Application Publication No. 2009/0096783, Entitled "Three-Dimensional Sensing Using Speckle Patterns"; U.S. Patent Application Publication No. 2008/0240502, Entitled "Depth Mapping Using Projected Patterns"; and U.S. Patent Application Publication No. 2008/0106746, Entitled "Depth-Varying Light Fields For Three Dimensional Sensing"; the contents of which are hereby incorporated by reference in their entireties.

Figure 15:
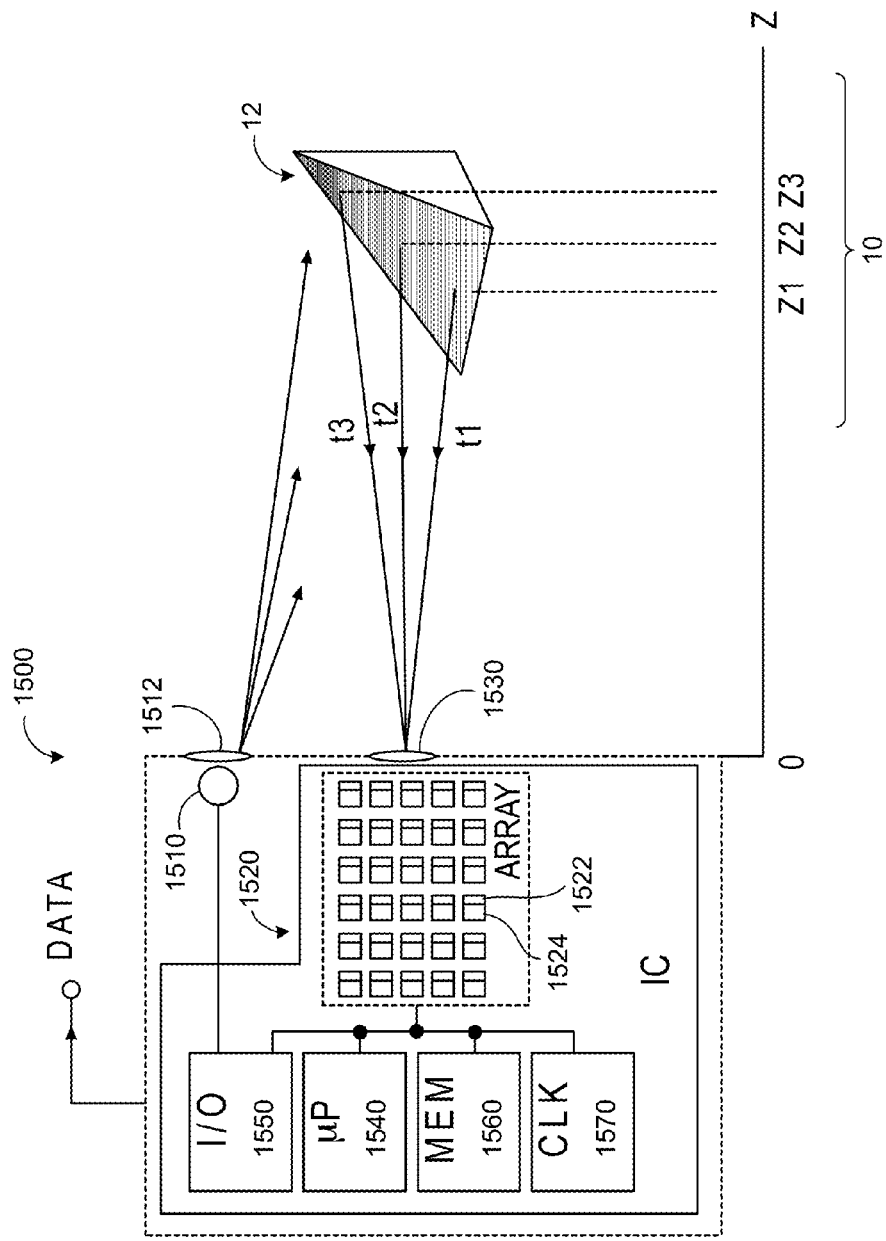
FIG. 15 is a schematic view of an exemplary 3D time-of-flight (TOF) camera sensing an object in a scene.

Referring to FIG. 15, in some implementations, the 3-D imaging sensor 450 includes a 3D time-of-flight (TOF) camera 1500 for obtaining depth image data. The 3D TOF camera 1500 includes a light source 1510, a complementary metal oxide semiconductor (CMOS) sensor 1520 (or charge-coupled device (CCD)), a lens 1530, and control logic or a camera controller 1540 having processing resources (and/or the robot controller 500) in communication with the light source 1510 and the CMOS sensor 1520. The light source 1510 may be a laser or light-emitting diode (LED) with an intensity that is modulated by a periodic signal of high frequency. In some examples, the light source 1510 includes a focusing lens 1512. The CMOS sensor 1520 may include an array of pixel detectors 1522, or other arrangement of pixel detectors 1522, where each pixel detector 1522 is capable of detecting the intensity and phase of photonic energy impinging upon it. In some examples, each pixel detector 1522 has dedicated detector circuitry 1524 for processing detection charge output of the associated pixel detector 1522. The lens 1530 focuses light reflected from a scene 10, containing one or more objects 12 of interest, onto the CMOS sensor 1520. The camera controller 1540 provides a sequence of operations that formats pixel data obtained by the CMOS sensor 1520 into a depth map and a brightness image. In some examples, the 3D TOF camera 1500 also includes inputs/outputs (10) 1550 (e.g., in communication with the robot controller 500), memory 1560, and/or a clock 1570 in communication with the camera controller 1540 and/or the pixel detectors 1522 (e.g., the detector circuitry 1524).

Figure 16:
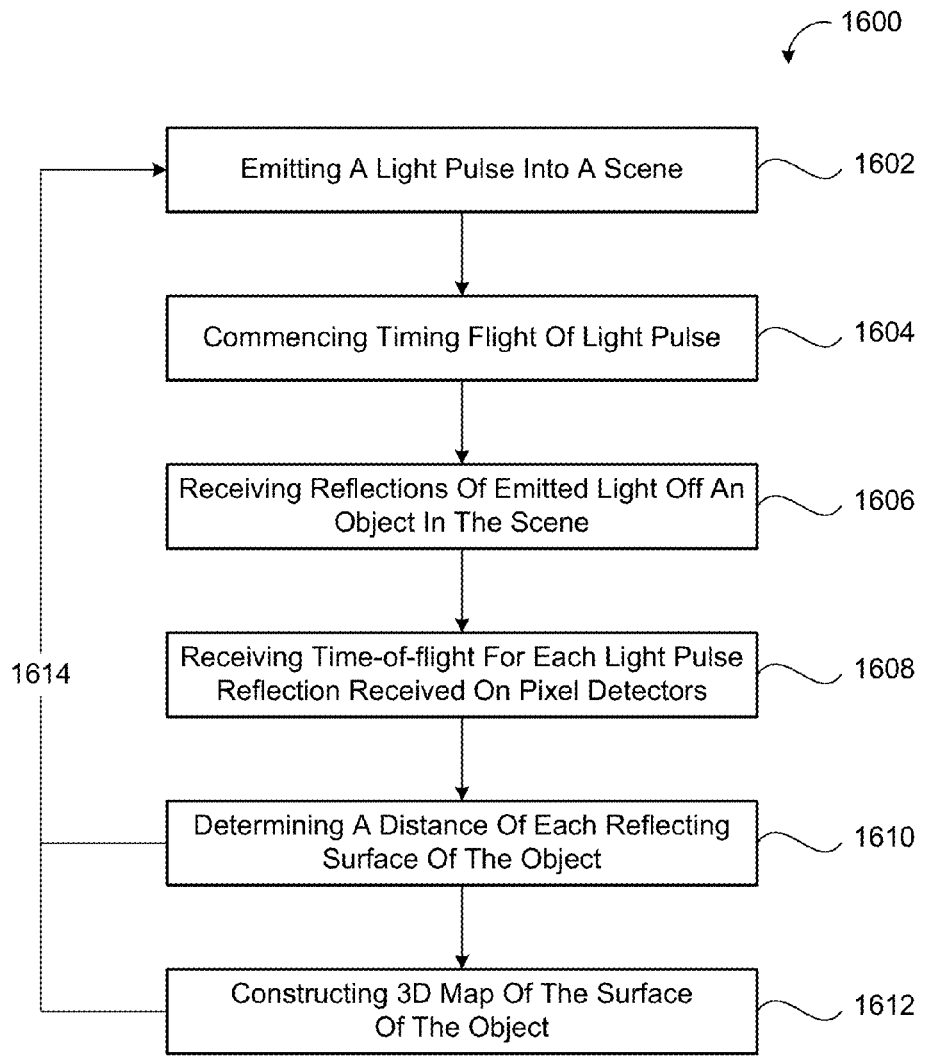
FIG. 16 is a schematic view of an exemplary arrangement of operations for operating a 3D TOF camera.

FIG. 16 provides an exemplary arrangement 1600 of operations for operating the 3D TOF camera 1500. The operations include emitting 1602 a light pulse (e.g., infrared, ultraviolet, and/or visible light) into the scene 10 and commencing 1604 timing of the flight time of the light pulse (e.g., by counting clock pulses of the clock 1570). The operations include receiving 1606 reflections of the emitted light off one or more surfaces of an object 12 in the scene 10. The reflections may be off surfaces of the object 12 that are at different distances $Z_n$ from the light source 1510. The reflections are received through the lens 1530 and onto pixel detectors 1522 of the CMOS sensor 1520. The operations include receiving 1608 time-of-flight for each light pulse reflection received on each corresponding pixel detector 1522 of the CMOS sensor 1520. During the roundtrip time of flight (TOF) of a light pulse, a counter of the detector circuitry 1523 of each respective pixel detector 1522 accumulates clock pulses. A larger number of accumulated clock pulses represents a longer TOF, and hence a greater distance between a light reflecting point on the imaged object 12 and the light source 1510. The operations further include determining 1610 a distance between the reflecting surface of the object 12 for each received light pulse reflection and optionally constructing 1612 a three-dimensional object surface. In some implementations, the operations include repeating 1614 operations 1602-1610 and optionally 1612 for tracking movement of the object 12 in the scene 10.

Other details and features on 3D time-of-flight imaging, which may combinable with those described herein, can be found in U.S. Pat. No. 6,323,942, entitled "CMOS Compatible 3-D Image Sensor"; U.S. Pat. No. 6,515,740, entitled "Methods for CMOS-Compatible Three-Dimensional Image Sensing Using Quantum Efficiency Modulation"; and PCT Patent Application PCT/US02/16621, entitled "Method and System to Enhance Dynamic Range Conversion Usable with CMOS Three-Dimensional Imaging", the contents of which are hereby incorporated by reference in their entireties.

In some implementations, the 3-D imaging sensor 450 provides three types of information: (1) depth information (e.g., from each pixel detector 1522 of the CMOS sensor 1520 to a corresponding location on the scene 12); (2) ambient light intensity at each pixel detector location; and (3) the active illumination intensity at each pixel detector location. The depth information enables the position of the detected object 12 to be tracked over time, particularly in relation to the object's proximity to the site of robot deployment. The active illumination intensity and ambient light intensity are different types of brightness images. The active illumination intensity is captured from reflections of an active light (such as provided by the light source 1510) reflected off of the target object 12. The ambient light image is of ambient light reflected off of the target object 12. The two images together provide additional robustness, particularly when lighting conditions are poor (e.g., too dark or excessive ambient lighting).

Image segmentation and classification algorithms may be used to classify and detect the position of objects 12 in the scene 10. Information provided by these algorithms, as well as the distance measurement information obtained from the imaging sensor 450, can be used by the robot controller 500 or other processing resources. The imaging sensor 450 can operate on the principle of time-of-flight, and more specifically, on detectable phase delays in a modulated light pattern reflected from the scene 10, including techniques for modulating the sensitivity of photodiodes for filtering ambient light.

The robot 100 may use the imaging sensor 450 for 1) mapping, localization & navigation; 2) object detection & object avoidance (ODOA); 3) object hunting (e.g., to find a person); 4) gesture recognition (e.g., for companion robots); 5) people & face detection; 6) people tracking; 7) monitoring manipulation of objects by the robot 100; and other suitable applications for autonomous operation of the robot 100.

In some implementations, at least one of 3-D image sensors 450 can be a volumetric point cloud imaging device (such as a speckle or time-of-flight camera) positioned on the robot 100 at a height of greater than 1 or 2 feet above the ground and directed to be capable of obtaining a point cloud from a volume of space including a floor plane in a direction of movement of the robot (via the omni-directional drive system 200). In the examples shown in FIGS. 1 and 3, the first 3-D image sensor 450*a* can be positioned on the base 120 at height of greater than 1 or 2 feet above the ground (or at a height of about 1 or 2 feet above the ground) and aimed along the forward drive direction F to capture images (e.g., volumetric point cloud) of a volume including the floor while driving (e.g., for obstacle detection and obstacle avoidance). The second 3-D image sensor 450*b* is shown mounted on the head 160 (e.g., at a height greater than about 3 or 4 feet above the ground), so as to be capable of obtaining skeletal recognition and definition point clouds from a volume of space adjacent the robot 100. The controller 500 may execute skeletal/digital recognition software to analyze data of the captured volumetric point clouds.

Properly sensing objects 12 using the imaging sensor 450, despite ambient light conditions can be important. In many environments the lighting conditions cover a broad range from direct sunlight to bright fluorescent lighting to dim shadows, and can result in large variations in surface texture and basic reflectance of objects 12. Lighting can vary within a given location and from scene 10 to scene 10 as well. In some implementations, the imaging sensor 450 can be used for identifying and resolving people and objects 12 in all situations with relatively little impact from ambient light conditions (e.g., ambient light rejection).

In some implementations, VGA resolution of the imaging sensor 450 is 640 horizontal by 480 vertical pixels; however, other resolutions are possible as well, such. 320×240 (e.g., for short range sensors).

The imaging sensor 450 may include a pulse laser and camera iris to act as a bandpass filter in the time domain to look at objects 12 only within a specific range. A varying iris of the imaging sensor 450 can be used to detect objects 12 a different distances. Moreover, a pulsing higher power laser can be used for outdoor applications.

Table 1 and Table 2 (below) provide exemplary features, parameters, and/or specifications of imaging sensors 450 for various applications. Sensor 1 can be used as a general purpose imaging sensor 450. Sensors 2 and 3 could be used on a human interaction robot, and sensors 4 and 5 could be used on a coverage or cleaning robot.

TABLE 1

|  | Unit | Sensor 1 | Sensor 2 Long Range | Sensor 3 Short Range | Sensor 4 Long Range | Sensor 5 Short Range |
|---|---|---|---|---|---|---|
| Dimensions | | | | | | |
| Width | cm | 18 | <=18 | <14 <=6 | <=6 | <=6 |
| Height | cm | 2.5 | <=2.5 | <4 <=1.2 | <=1.2 | <=1.2 |
| Depth | cm | 3.5 | <=3.5 | <5 <=.6 | <=.6 | <=.6 |
| Operating Temp | | | | | | |
| Minimum | °C. | 5 | 5 | 5 | 5 | 5 |
| Maximum | °C. | 40 | 40 | 40 | 40 | 40 |
| Comm Port | | | | | | |
| Data interface | | USB 2.0 | USB 2.0 | USB 2.0 | SPI | SPI |
| Field-of-View | | | | | | |
| Horizontal | deg | 57.5 | >=57.5 | >70 | >70 | >70 |
| Vertical | deg | 45 | >=45 | >=45 | >=45 | >40 |
| Diagonal | deg | 69 | | | | |
| Spatial Resolution | | | | | | |
| Depth image size | | 640 × 480 | 640 × 480 | | | |
| @15 cm | mm | | | | | |
| @20 cm | mm | | | | | |
| @40 cm | mm | | | | | |
| @80 cm | mm | | | | | |
| @1 m | mm | 1.7 | 1.7 | | | |
| @2 m | mm | 3.4 | 3.4 | | | |
| @3 m | mm | 5.1 | 5.1 | | | |
| @3.5 m | mm | 6 | 6 | | | |
| Downsampling | | | | | | |
| QVGA | pixels | 320 × 240 | 320 × 240 | 320 × 240 | 320 × 240 | 320 × 240 |
| QQVGA | pixels | 160 × 120 | 160 × 120 | 160 × 120 | 160 × 120 | 160 × 120 |

TABLE 2

|  | Unit | Sensor 1 | Sensor 2 Long Range | Sensor 3 Short Range | Sensor 4 Long Range | Sensor 5 Short Range |
|---|---|---|---|---|---|---|
| Depth Resolution | | | | | | |
| @1 m | cm | 0.57 | | | | |
| @2 m | cm | 2.31 | | | | |
| @3 m | cm | 5.23 | | | | |
| @3.5 m | cm | 7.14 | | | | |
| Minimum Object Size | | | | | | |
| @1 m | cm | 2.4 | <=2.4 | | | 0.2 |
| @2 m | cm | 4.8 | <=4.8 | | | |
| @3 m | cm | 7.2 | <=7.2 | | | |
| @3.5 m | cm | 8.4 | <=8.4 | | | |
| Throughput | | | | | | |
| Frame rate | fps | 30 | 30 | 30 | 30 | 30 |
| VGA depth image | ms | 44 | <=44 | <=44 | <=44 | <=44 |
| QVGA depth image | ms | 41 | <=41 | <=41 | <=41 | <=41 |
| Range | | | | | | |
| In Spec. range | m | 0.8-3.5 | 0.8-3.5 | 0.25-1.50 | 0.25-1.50 | 0.15-1.0 |
| Observed range | m | 0.3-5 | 0.3-5 | 0.15-2.00 | 0.15-2.00 | 0.10-1.5 |
| Color Image | | | | | | |
| Color camera | | CMOS 1280 × 1024 | N/R | N/R | N/R | N/R |

TABLE 2-continued

|  | Unit | Sensor 1 | Sensor 2 Long Range | Sensor 3 Short Range | Sensor 4 Long Range | Sensor 5 Short Range |
|---|---|---|---|---|---|---|
| Audio | | | | | | |
| Built-in microphones | | 2 | N/R | N/R | N/R | N/R |
| Data format | | 16 | | | | |
| Sample rate | | 17746 | | | | |
| External digital audio inputs | | 4 | | | | |
| Power | | | | | | |
| Power supply | | USB 2.0 | USB 2.0 | USB 2.0 | | |
| Current consumption | | 0.45 | | | | |
| Max power consumption | | 2.25 | | | | 0.5 |

Minimal sensor latency assures that objects 12 can be seen quickly enough to be avoided when the robot 100 is moving. Latency of the imaging sensor 450 can be a factor in reacting in real time to detected and recognized user gestures. In some examples, the imaging sensor 450 has a latency of about 44 ms. Images captured by the imaging sensor 450 can have an attributed time stamp, which can be used for determining at what robot pose an image was taken while translating or rotating in space.

A Serial Peripheral Interface Bus (SPI) in communication with the controller 500 may be used for communicating with the imaging sensor 450. Using an SPI interface for the imaging sensor 450 does not limit its use for multi-node distributed sensor/actuator systems, and allows connection with an Ethernet enabled device such as a microprocessor or a field-programmable gate array (FPGA), which can then make data available over Ethernet and an EtherIO system, as described in U.S. Patent Application Ser. No. 61/305,069, filed on Feb. 16, 2010 and titled "Mobile Robot Communication System," which is hereby incorporate by reference in its entirety.

Since SPI is a limited protocol, an interrupt pin may be available on the interface to the imaging sensor 450 that would strobe or transition when an image capture is executed. The interrupt pin allows communication to the controller 500 of when a frame is captured. This allows the controller 500 to know that data is ready to be read. Additionally, the interrupt pin can be used by the controller 500 to capture a timestamp which indicates when the image was taken. Imaging output of the imaging sensor 450 can be time stamped (e.g., by a global clock of the controller 500), which can be referenced to compensate for latency. Moreover, the time stamped imaging output from multiple imaging sensors 450 (e.g., of different portions of the scene 10) can be synchronized and combined (e.g., stitched together). Over an EtherIO system, an interrupt time (on the interrupt pin) can be captured and made available to higher level devices and software on the EtherIO system. The robot 100 may include a multi-node distributed sensor/actuator systems that implements a clock synchronization strategy, such as IEEE1588, which we can be applied to data captured from the imaging sensor 450.

Both the SPI interface and EtherIO can be memory-address driven interfaces.

Data in the form of bytes/words/double-words, for example, can be read from the imaging sensor 450 over the SPI interface, and made available in a memory space of the EtherIO system. For example, local registers and memory, such as direct memory access (DMA) memory, in an FPGA, can be used to control an EtherIO node of the EtherIO system.

In some cases, the robot 100 may need to scan the imaging sensor 450 from side to side and/or up and down (e.g., to view an object 12 or around an occlusion 16 (FIG. 17A)). For a differentially steered robot 100, this may involve rotating the robot 100 in place with the drive system 200; or rotating a mirror, prism, variable angle micro-mirror, or MEMS mirror array associated with the imaging sensor 450.

The field of view 452 of the imaging sensor 450 having a view angle θv less than 360 can be enlarged to 360 degrees by optics, such as omni-directional, fisheye, catadioptric (e.g., parabolic mirror, telecentric lens), panamorph mirrors and lenses. Since the controller 500 may use the imaging sensor 450 for distance ranging, inter alia, but not necessarily for human-viewable images or video (e.g., for human communications), distortion (e.g., warping) of the illumination of the light source 1172 and/or the image capturing by the imager 1174 (FIG. 11) through optics is acceptable for distance ranging (e.g., as with the 3D speckle camera 1300 and/or the 3D TOF camera 1500).

In some instances, the imaging sensor 450 may have difficulties recognizing and ranging black objects 12, surfaces of varied albedo, highly reflective objects 12, strong 3D structures, self-similar or periodic structures, or objects at or just beyond the field of view 452 (e.g., at or outside horizontal and vertical viewing field angles). In such instances, other sensors of the sensor system 400 can be used to supplement or act as redundancies to the imaging sensor 450.

In some implementations, the light source 1172 (e.g., of the 3D speckle camera 1300 and/or the 3D TOF camera 1500) includes an infrared (IR) laser, IR pattern illuminator, or other IR illuminator. A black object, especially black fabric or carpet, may absorb IR and fail to return a strong enough reflection for recognition by the imager 1174. In this case, either a secondary mode of sensing (such as sonar) or a technique for self-calibrating for surface albedo differences may be necessary to improve recognition of black objects.

A highly reflective object 12 or an object 12 with significant specular highlights (e.g., cylindrical or spherical) may make distance ranging difficult for the imaging sensor 450. Similarly, objects 12 that are extremely absorptive in the wavelength of light for which the imaging sensor 450 is sensing, can pose problems as well. Objects 12, such as doors and window, which are made of glass can be highly reflective and, when ranged, either appear as if they are free space (infinite range) or else range as the reflection to the first non-specularly-reflective surface. This may cause the robot 100 to not see the object 12 as an obstacle, and, as a result, may collide with the window or door, possibly causing damage to the robot or to the object 12. In order to avoid this, the controller 500 may execute one or more algorithms that look for discontinuities in surfaces matching the size and shape (rectilinear) of a typical window pane or doorway. These surfaces can then be inferred as being obstacles and not free space. Another implementation for detecting reflective objects in the path of the robot includes using a reflection sensor that detects its own reflection. Upon careful approach of the obstacle or object 12, the reflection sensor can be used determine whether there is a specularly reflective object ahead, or if the robot can safely occupy the space.

In the case of the 3D speckle camera 1300, the light source 1310 may fail to form a pattern recognizable on the surface of a highly reflective object 12 or the imager 1320 may fail to recognize a speckle reflection from the highly reflective object 12. In the case of the 3D TOF camera 1500, the highly reflective object 12 may create a multi-path situation where the 3D TOF camera 1500 obtains a range to another object 12 reflected in the object 12 (rather than to the object itself). To remedy IR failure modes, the sensor system 400 may employ acoustic time of flight, millimeter wave radar, stereo or other vision techniques able to use even small reflections in the scene 10.

Mesh objects 12 may make distance ranging difficult for the imaging sensor 450. If there are no objects 12 immediately behind mesh of a particular porosity, the mesh will appear as a solid obstacle 12. If an object 12 transits behind the mesh, however, and, in the case of the 3D speckle camera 1300, the speckles are able to reflect off the object 12 behind the mesh, the object will appear in the depth map instead of the mesh, even though it is behind it. If information is available about the points that had previously contributed to the identification of the mesh (before an object 12 transited behind it), such information could be used to register the position of the mesh in future occupancy maps. By receiving information about the probabilistic correlation of the received speckle map at various distances, the controller 500 may determine the locations of multiple porous or mesh-like objects 12 in line with the imaging sensor 450.

The controller 500 may use imaging data from the imaging sensor 450 for color/size/dimension blob matching. Identification of discrete objects 12 in the scene 10 allows the robot 100 to not only avoid collisions, but also to search for objects 12. The human interface robot 100 may need to identify humans and target objects 12 against the background of a home or office environment. The controller 500 may execute one or more color map blob-finding algorithms on the depth map(s) derived from the imaging data of the imaging sensor 450 as if the maps were simple grayscale maps and search for the same "color" (that is, continuity in depth) to yield continuous objects 12 in the scene 10. Using color maps to augment the decision of how to segment objects 12 would further amplify object matching, by allowing segmentation in the color space as well as in the depth space. The controller 500 may first detect objects 12 by depth, and then further segment the objects 12 by color. This allows the robot 100 to distinguish between two objects 12 close to or resting against one another with differing optical qualities.

In implementations where the sensor system 400 includes only one imaging sensor 450 (e.g., camera) for object detection, the imaging sensor 450 may have problems imaging surfaces in the absence of scene texture and may not be able to resolve the scale of the scene. Moreover, mirror and/or specular highlights of an object 12 can cause saturation in a group of pixels 1174*p* of the imager 1174 (e.g., saturating a corresponding portion of a captured image); and in color images, the specular highlights can appear differently from different viewpoints, thereby hampering image matching, as for the speckle camera 1300.

Using or aggregating two or more sensors for object detection can provide a relatively more robust and redundant sensor system 400. For example, although flash LADARs generally have low dynamic range and rotating scanners generally have long inspection times, these types of sensor can be useful for object detection. In some implementations, the sensor system 400 include a flash LADAR and/or a rotating scanner in addition to the imaging sensor 450 (e.g., the 3D speckle camera 1300 and/or the 3D TOF camera 1500) in communication with the controller 500. The controller 500 may use detection signals from the imaging sensor 450 and the flash ladar and/or a rotating scanner to identify objects 12, determine a distance of objects 12 from the robot 100, construct a 3D map of surfaces of objects 12, and/or construct or update an occupancy map 1700. The 3D speckle camera 1300 and/or the 3D TOF camera 1500 can be used to address any color or stereo camera weaknesses by initializing a distance range, filling in areas of low texture, detecting depth discontinuities, and/or anchoring scale.

In examples using the 3D speckle camera 1300, the speckle pattern emitted by the speckle emitter 1310 may be rotation-invariant with respect to the imager 1320. Moreover, an additional camera 1300 (e.g., color or stereo camera) co-registered with the 3D speckle camera 1300 and/or the 3D TOF camera 1500 may employ a feature detector that is some or fully scale-rotation-affine invariant to handle ego rotation, tilt, perspective, and/or scale (distance). Scale-invariant feature transform (or SIFT) is an algorithm for detecting and/or describing local features in images. SIFT can be used by the controller 500 (with data from the sensor system 400) for object recognition, robotic mapping and navigation, 3D modeling, gesture recognition, video tracking, and match moving. SIFT, as a scale-invariant, rotation-invariant transform, allows placement of a signature on features in the scene 10 and can help reacquire identified features in the scene 10 even if they are farther away or rotated. For example, the application of SIFT on ordinary images allows recognition of a moved object 12 (e.g., a face or a button or some text) be identifying that the object 12 has the same luminance or color pattern, just bigger or smaller or rotated. Other of transforms may be employed that are affine-invariant and can account for skew or distortion for identifying objects 12 from an angle. The sensor system 400 and/or the controller 500 may provide scale-invariant feature recognition (e.g., with a color or stereo camera) by employing SIFT, RIFT, Affine SIFT, RIFT, G-RIF, SURF, PCA-SIFT, GLOH. PCA-SIFT, SIFT w/FAST corner detector and/or Scalable Vocabulary Tree, and/or SIFT w/Irregular Orientation Histogram Binning.

In some implementations, the controller 500 executes a program or routine that employs SIFT and/or other transforms for object detection and/or identification. The controller 500 may receive image data from an image sensor 450, such as a color, black and white, or IR camera. In some examples, the image sensor 450 is a 3D speckle IR camera that can provide image data without the speckle illumination to identify features without the benefit of speckle ranging. The controller 500 can identify or tag features or objects 12 previously mapped in the 3D scene from the speckle ranging. The depth map can be used to filter and improve the recognition rate of SIFT applied to features imaged with a camera, and/or simplify scale invariance (because both motion and change in range are known and can be related to scale).

SIFT-like transforms may be useful with depth map data normalized and/or shifted for position variation from frame to frame, which robots with inertial tracking, odometry, proprioception, and/or beacon reference may be able to track. For example, a transform applied for scale and rotation invariance may still be effective to recognize a localized feature in the depth map if the depth map is indexed by the amount of movement in the direction of the feature.

Other details and features on SIFT-like or other feature descriptors to 3D data, which may combinable with those described herein, can be found in Se, S.; Lowe, David G.; Little, J. (2001). *"Vision-based mobile robot localization and mapping using scale-invariant features"*. Proceedings of the IEEE International Conference on Robotics and Automation *(ICRA)*. 2. pp. 2051; or Rothganger, F; S. Lazebnik, C. Schmid, and J. Ponce: 2004. 3D *Object Modeling and Recognition Using Local Affine-Invariant Image Descriptors and Multi-View Spatial Constraints*, ICCV; or Iryna Gordon and David G. Lowe, *"What and where: 3D object recognition with accurate pose,"* Toward Category-Level Object Recognition, (Springer-Verlag, 2006), pp. 67-82; the contents of which are hereby incorporated by reference in their entireties.

Other details and features on techniques suitable for 3D SIFT in human action recognition, including falling, can be found in Laptev, Ivan and Lindeberg, Tony (2004). *"Local descriptors for spatio-temporal recognition"*. ECCV'04 Workshop on Spatial Coherence for Visual Motion Analysis, Springer Lecture Notes in Computer Science, Volume 3667. pp. 91-103; Ivan Laptev, Barbara Caputo, Christian Schuldt and Tony Lindeberg (2007). *"Local velocity-adapted motion events for spatio-temporal recognition"*. Computer Vision and Image Understanding 108: 207-229; Scovanner, Paul; Ali, S; Shah, M (2007). *"A 3-dimensional sift descriptor and its application to action recognition"*. Proceedings of the 15th International Conference on Multimedia. pp. 357-360; Niebles, J. C. Wang, H. and Li, Fei-Fei (2006). *"Unsupervised Learning of Human Action Categories Using Spatial-Temporal Words"*. Proceedings of the British Machine Vision Conference *(BMVC)*. Edinburgh; the contents of which are hereby incorporated by reference in their entireties.

The controller 500 may use the imaging sensor 450 (e.g., a depth map sensor) when constructing a 3D map of the surface of and object 12 to fill in holes from depth discontinuities and to anchor a metric scale of a 3D model. Structure-from-motion, augmented with depth map sensor range data, may be used to estimate sensor poses. A typical structure-from-motion pipeline may include viewpoint-invariant feature estimation, inter-camera feature matching, and a bundle adjustment.

A software solution combining features of color/stereo cameras with the imaging sensor 450 (e.g., the 3D speckle camera 1300, and/or the TOF camera 1500) may include (1) sensor pose estimation, (2) depth map estimation, and (3) 3D mesh estimation. In sensor pose estimation, the position and attitude of the sensor package of each image capture is determined. In depth map estimation, a high-resolution depth map is obtained for each image. In 3D mesh estimation, sensor pose estimates and depth maps can be used to identify objects of interest.

In some implementations, a color or stereo camera 320 (FIG. 9) and the 3D speckle 1300 or the 3D TOF camera 1500 may be co-registered. A stand-off distance of 1 meter and 45-degree field of view 452 may give a reasonable circuit time and overlap between views. If at least two pixels are needed for 50-percent detection, at least a 1 mega pixel resolution color camera may be used with a lens with a 45-degree field of view 452, with proportionately larger resolution for a 60 degree or wider field of view 452.

Although a depth map sensor may have relatively low resolution and range accuracy, it can reliably assign collections of pixels from the color/stereo image to a correct surface. This allows reduction of stereo vision errors due to lack of texture, and also, by bounding range to, e.g., a 5 cm interval, can reduce the disparity search range, and computational cost.

Referring again to FIG. 10A, the first and second 3-D image sensors 450a, 450b can be used to improve mapping of the robot's environment to create a robot map, as the first 3-D image sensor 450a can be used to map out nearby objects and the second 3-D image sensor 450b can be used to map out distant objects.

Figure 17A:
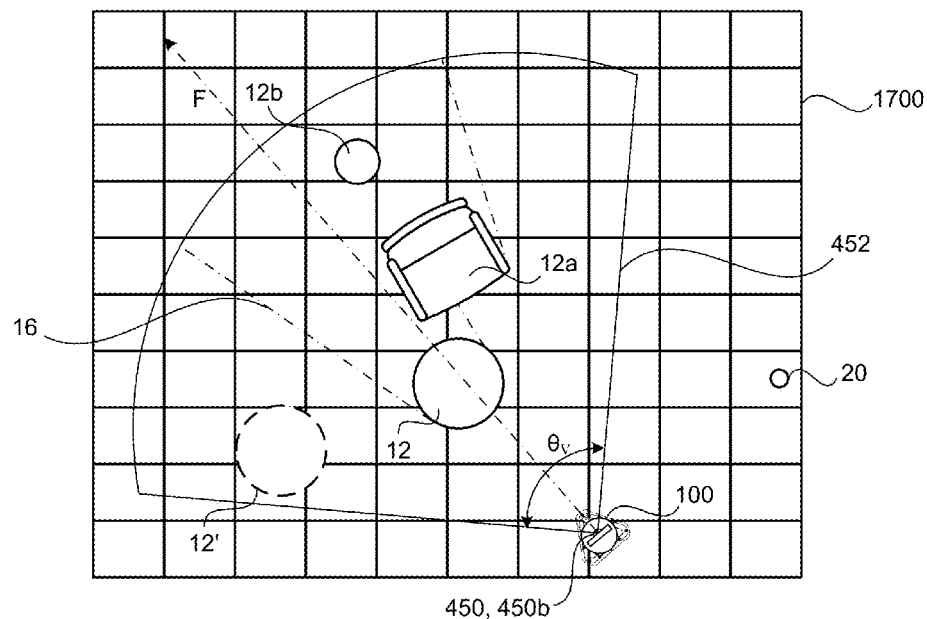
FIG. 17A is a schematic view of an exemplary occupancy map.
Figure 17B:
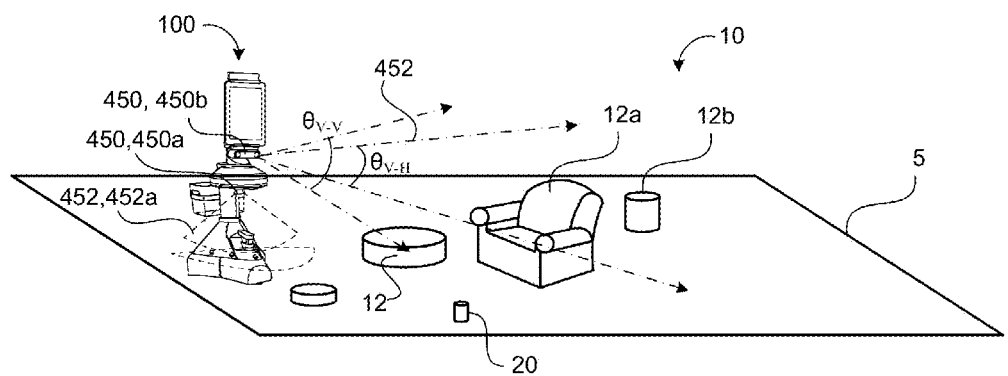
FIG. 17B is a schematic view of a mobile robot having a field of view of a scene in a working area.

Referring to FIGS. 17A and 17B, in some circumstances, the robot 100 receives an occupancy map 1700 of objects 12 in a scene 10 and/or work area 5, or the robot controller 500 produces (and may update) the occupancy map 1700 based on image data and/or image depth data received from an imaging sensor 450 (e.g., the second 3-D image sensor 450b) over time. In addition to localization of the robot 100 in the scene 10 (e.g., the environment about the robot 100), the robot 100 may travel to other points in a connected space (e.g., the work area 5) using the sensor system 400. The robot 100 may include a short range type of imaging sensor 450a (e.g., mounted on the underside of the torso 140, as shown in FIGS. 1 and 3) for mapping a nearby area about the robot 110 and discerning relatively close objects 12, and a long range type of imaging sensor 450b (e.g., mounted on the head 160, as shown in FIGS. 1 and 3) for mapping a relatively larger area about the robot 100 and discerning relatively far away objects 12. The robot 100 can use the occupancy map 1700 to identify known objects 12 in the scene 10 as well as occlusions 16 (e.g., where an object 12 should or should not be, but cannot be confirmed from the current vantage point). The robot 100 can register an occlusion 16 or new object 12 in the scene 10 and attempt to circumnavigate the occlusion 16 or new object 12 to verify the location of new object 12 or any objects 12 in the occlusion 16. Moreover, using the occupancy map 1700, the robot 100 can determine and track movement of an object 12 in the scene 10. For example, the imaging sensor 450, 450a, 450b may detect a new position 12' of the object 12 in the scene 10 while not detecting a mapped position of the object 12 in the scene 10. The robot 100 can register the position of the old object 12 as an occlusion 16 and try to circumnavigate the occlusion 16 to verify the location of the object 12. The robot 100 may compare new image depth data with previous image depth data (e.g., the map 1700) and assign a confidence level of the location of the object 12 in the scene 10. The location confidence level of objects 12 within the scene 10 can time out or degrade after a threshold period of time. The sensor system 400 can update location confidence levels of each object 12 after each imaging cycle of the sensor system 400. In some examples, a detected new occlusion 16 (e.g., a missing object 12 from the occupancy map 1700) within an occlusion detection period (e.g., less than ten seconds), may signify a "live" object 12 (e.g., a moving object 12) in the scene 10.

In some implementations, a second object 12b of interest, located behind a detected first object 12a in the scene 10, may be initially undetected as an occlusion 16 in the scene 10. An occlusion 16 can be area in the scene 10 that is not readily detectable or viewable by the imaging sensor 450, 450a, 450b. In the example shown, the sensor system 400 (e.g., or a portion thereof, such as imaging sensor 450, 450a, 450b) of the robot 100 has a field of view 452 with a viewing angle $\theta_V$ (which can be any angle between 0 degrees and 360 degrees) to view the scene 10. In some examples, the imaging sensor 450 includes omni-directional optics for a 360 degree viewing angle $\theta_V$; while in other examples, the imaging sensor 450, 450a, 450b has a viewing angle $\theta_V$ of less than 360 degrees (e.g., between about 45 degrees and 180 degrees). In examples, where the viewing angle $\theta_V$ is less than 360 degrees, the imaging sensor 450, 450a, 450b (or components thereof) may rotate with respect to the robot body 110 to achieve a viewing angle $\theta_V$ of 360 degrees. The imaging sensor 450, 450a, 450b may have a vertical viewing angle $\theta_{V-V}$ the same as or different from a horizontal viewing angle $\theta_{V-H}$. For example, the imaging sensor 450, 450a, 450b may have a a horizontal field of view $\theta_V$-H of at least 45 degrees and a vertical field of view $\theta_{V-V}$ of at least 40 degrees. In some implementations, the imaging sensor 450, 450a, 450b or portions thereof, can move with respect to the robot body 110 and/or drive system 200. Moreover, in order to detect the second object 12b, the robot 100 may move the imaging sensor 450, 450a, 450b by driving about the scene 10 in one or more directions (e.g., by translating and/or rotating on the work surface 5) to obtain a vantage point that allows detection of the second object 12b. Robot movement or independent movement of the imaging sensor 450, 450a, 450b, or portions thereof, may resolve monocular difficulties as well.

A confidence level may be assigned to detected locations or tracked movements of objects 12 in the working area 5. For example, upon producing or updating the occupancy map 1700, the controller 500 may assign a confidence level for each object 12 on the map 1700. The confidence level can be directly proportional to a probability that the object 12 actually located in the working area 5 as indicated on the map 1700. The confidence level may be determined by a number of factors, such as the number and type of sensors used to detect the object 12. For example, a contact sensor 430 (FIG. 4A) disposed on the base 110 may provide the highest level of confidence, as the contact sensor 430 senses actual contact with the object 12 by the robot 100. The imaging sensor 450 may provide a different level of confidence, which may be higher than the proximity sensor 410. Data received from more than one sensor of the sensor system 400 can be aggregated or accumulated for providing a relatively higher level of confidence over any single sensor.

Odometry is the use of data from the movement of actuators to estimate change in position over time (distance traveled). In some examples, an encoder is disposed on the drive system 200 for measuring wheel revolutions, therefore a distance traveled by the robot 100. The controller 500 may use odometry in assessing a confidence level for an object location. In some implementations, the sensor system 400 includes an odometer and/or an angular rate sensor (e.g., gyroscope or the IMU 470) for sensing a distance traveled by the robot 100. A gyroscope is a device for measuring or maintaining orientation, based on the principles of conservation of angular momentum. The controller 500 may use odometry and/or gyro signals received from the odometer and/or angular rate sensor, respectively, to determine a location of the robot 100 in a working area 5 and/or on an occupancy map 1700. In some examples, the controller 500 uses dead reckoning. Dead reckoning is the process of estimating a current position based upon a previously determined position, and advancing that position based upon known or estimated speeds over elapsed time, and course. By knowing a robot location in the working area 5 (e.g., via odometry, gyroscope, etc.) as well as a sensed location of one or more objects 12 in the working area 5 (via the sensor system 400), the controller 500 can assess a relatively higher confidence level of a location or movement of an object 12 on the occupancy map 1700 and in the working area 5 (versus without the use of odometry or a gyroscope).

Odometry based on wheel motion can be electrically noisy. The controller 500 may receive image data from the imaging sensor 450 of the environment or scene 10 about the robot 100 for computing robot motion, independently of wheel based odometry of the drive system 200, through visual odometry. Visual odometry may entail using optical flow to determine the motion of the imaging sensor 450. The controller 500 can use the calculated motion based on imaging data of the imaging sensor 450 for correcting any errors in the wheel based odometry, thus allowing for improved mapping and motion control. Visual odometry may have limitations with low-texture or low-light scenes 10, if the imaging sensor 450 cannot track features within the captured image(s).

Other details and features on odometry and imaging systems, which may combinable with those described herein, can be found in U.S. Pat. No. 7,158,317 (describing a "depth-of field" imaging system), and U.S. Pat. No. 7,115,849 (describing wavefront coding interference contrast imaging systems), the contents of which are hereby incorporated by reference in their entireties.

Figure 18B:
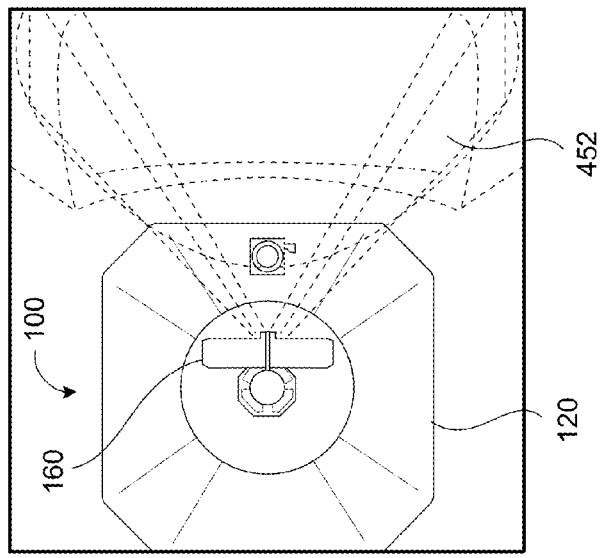
FIG. 18B provides a top view of the mobile robot shown in FIG. 18A.
Figure 18A:
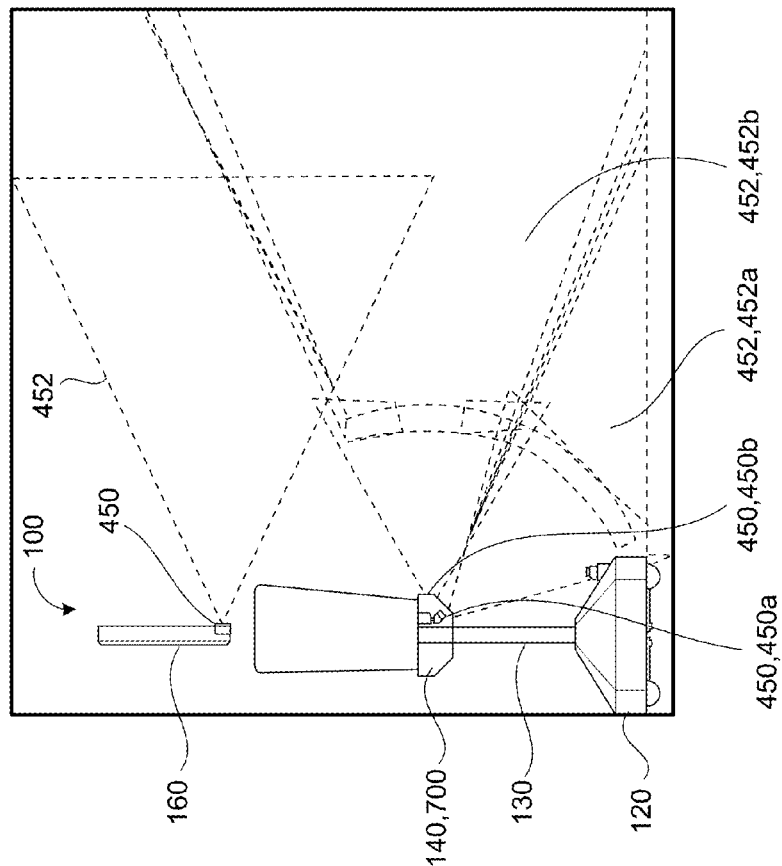
FIG. 18A provides a side view of an exemplary mobile robot with sensor fields of view.
Figure 18C:
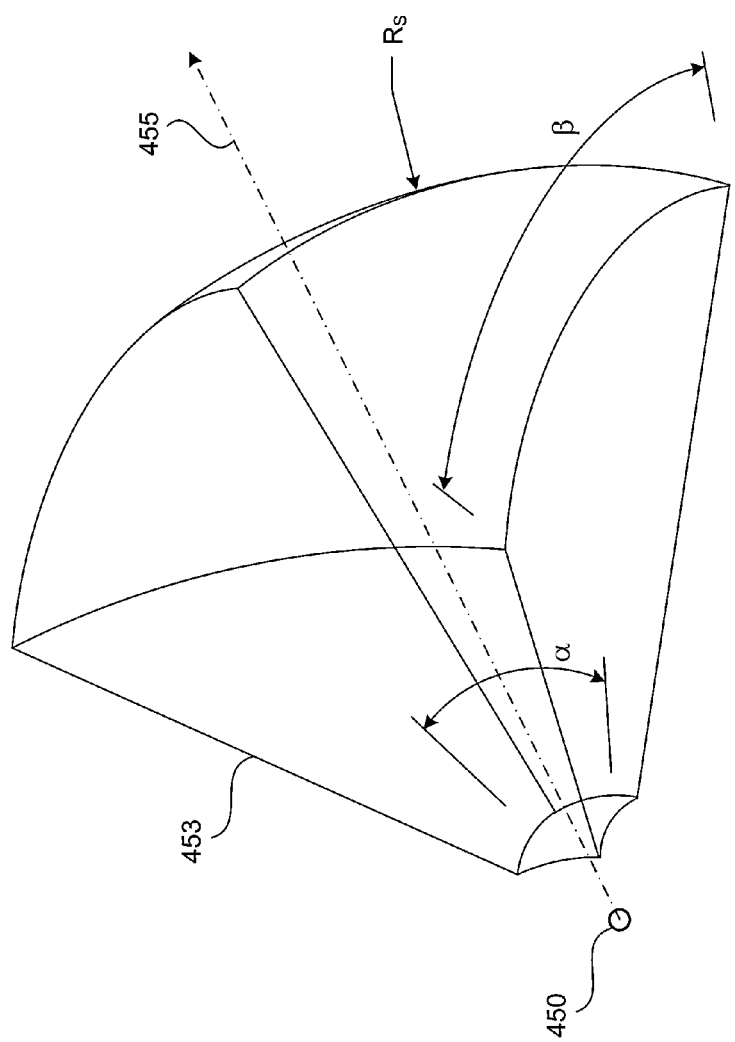
FIG. 18C is a schematic view of a dead zone of an imaging sensor.

Referring to FIGS. 18A-18C, the sensor pod 700 provides a panning sensor suite having a comprehensive sensor "wedge" (e.g., 57°) that is wide enough to clear a path for the robot to drive through. The wedge coverage may be from floor to ceiling to protect the entire system. The sensor pod 700 may include a combination of sensors, such as 3D volumetric point cloud sensors 450, infrared sensors 4101Ra-b, sonar sensors 410Sa-d, etc. A combination of sensors can be arranged so that one sensor can detect objects in a deadband of another sensor and/or objects difficult to detect by another sensor (e.g., glass, highly reflective (polished metal), dark absorbent (black couch), etc.). For example, the 3D volumetric point cloud sensor 450 may have a deadband volume defined as a 60 degree cone from zero out to 50 cm out along its imaging axis 455. The rotation sensor pod 700 allows panning to point a sensing volume in any direction 360° (+/−)180°.

In some implementations, the imaging sensor 450 has an imaging dead zone 453, which is a volume of space about the imaging sensor 450 in which objects are not detected. In some examples, the imaging dead zone 453 includes volume of space defined by a first angle $\alpha$ by a second angle $\beta$ and by a radius $R_S$ of about 57°×45°×50 cm, respectively, immediately proximate the imaging sensor 450 and centered about an imaging axis 455. The dead zone 453 is positioned between the imaging sensor 450 and a detection field 457 of the imaging sensor 450 within the field of view 452.

Figure 19:
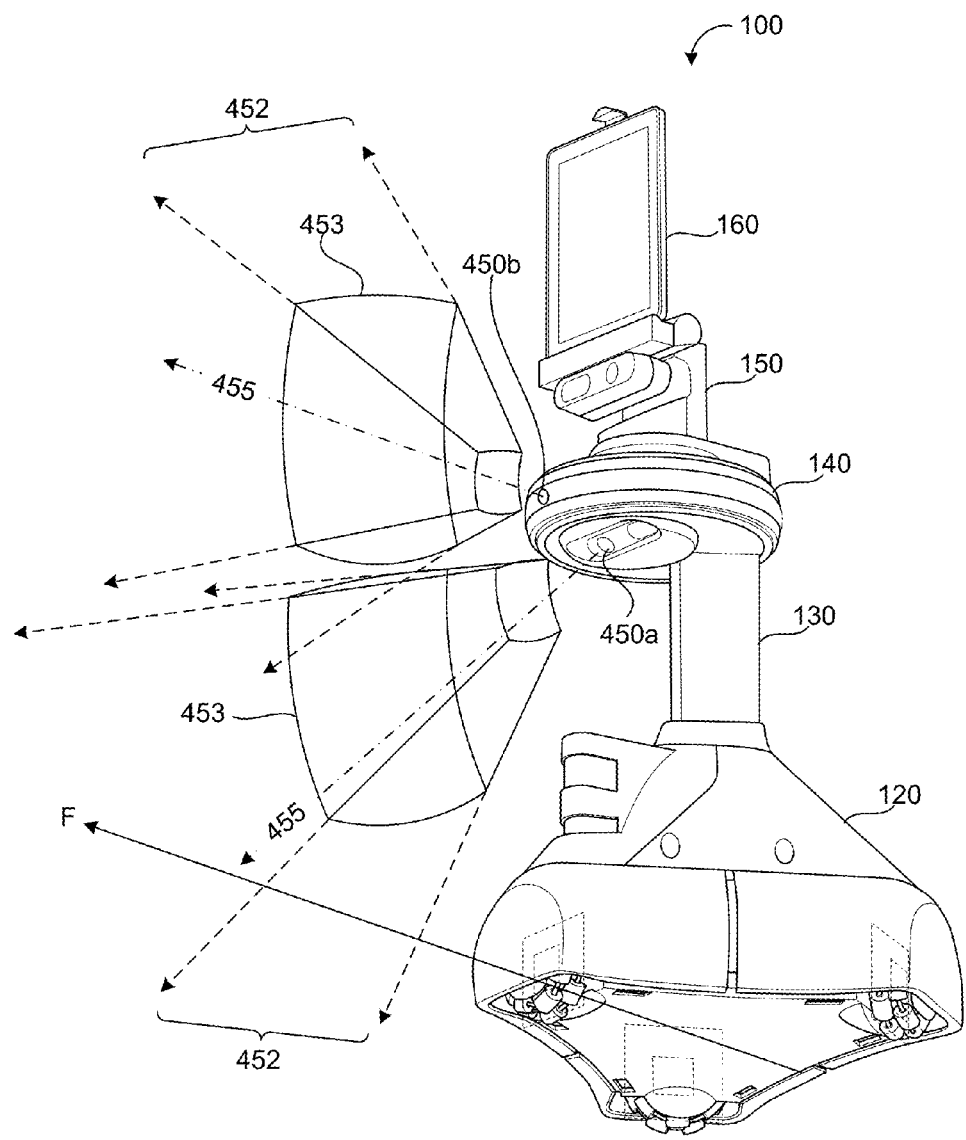
FIG. 19 is a perspective view of an exemplary mobile robot having a first imaging sensor arranged to point downward along a forward drive direction and a second imaging sensor arranged to point outward above the ground.

In the example shown in FIG. 19, the robot 100 includes a first and second imaging sensors 450a, 450b (e.g., 3D depth imaging sensors) disposed on the torso 140. Both imaging sensors 450a, 450b are arranged to have field of view 452 along the forward drive direction F. The first imaging sensor 450a is arranged to aim its imaging axis 455 substantially downward and away from the robot 100 (e.g., to view an area on the ground and/or about a lower portion of the robot) to detect objects before contact with the base 120 or leg 130. By angling the first imaging sensor 450a downward, the robot 100 receives dense sensor coverage in an area immediately forward or adjacent to the robot 100, which is relevant for short-term travel of the robot 100 in the forward direction. The second imaging sensor 450b is arranged with its imaging axis 455 pointing substantially parallel with the ground along the forward drive direction F (e.g., to detect objects approaching a mid and/or upper portion of the robot 100). In other examples, the second imaging sensor 450b is arranged with its imaging axis 455 pointing above the ground or even upward away from the ground.

If the imaging sensors 450a, 450b have dead zones 453, there is a possibility of failing to detect an object proximate or adjacent the robot 100. In the example shown in FIG. 10A, the robot 100 includes an imaging sensor 450 mounted on the head 160, which can pan and tilt via the neck 150. As a result, the robot 100 can move the imaging sensor 450 on the head to view the dead zones 453 of the other imaging sensors 450a, 450b, thus providing complete or substantially complete fields of view 452 about the robot 100 for object detection. When placement of an imaging sensor 450 on the head 160 is not possible or if an imaging sensor 450 cannot be moved to view the dead zones 453, other techniques may be employed to view the dead zones 453. In addition to dead zones 453, some objects within the field of view 452 of the imaging sensor 450 can be difficult to detect, due to size, shape, reflectivity, and/or color. For example, sometimes highly reflective or specular objects can be difficult to detect. In other examples, very dark or black objects can be difficult to detect. Moreover, slender objects (i.e., having a very thin profile) may be difficult to detect. Hard to detect objects may be become relatively more detectable when viewed from multiple angles or sensed from multiple sensors.

In the example shown in FIGS. 1, 4C and 10A, the robot includes one or more sonar proximity sensors 410, 410S disposed around the base body 120 are arranged to point upward (e.g., substantially in the Z direction) and optionally angled outward away from the Z axis, thus creating a detection curtain around the robot 100. The sonar proximity sensors 410, 410S can be arranged and aimed to sense objects within the dead zone 453 of each imaging sensor 450.

In some implementations, the robot 100 (via the controller 500 or the sensor system 400) moves or pans the imaging sensors 450, 450a, 450b to gain view-ability of the corresponding dead zones 453. An imaging sensor 450 can be pointed in any direction 360° (+/−)180° by moving its associated imaging axis 455.

In some examples, the robot 100 maneuvers itself on the ground to move the imaging axis 455 and corresponding field of view 452 of each imaging sensor 450 to gain perception of the volume of space once in a dead zone 453. For example, the robot 100 may pivot in place, holonomically move laterally, move forward or backward, or a combination thereof. In additional examples, if the imaging sensor 450 has a limited field of view 452 and/or detection field 457, the controller 500 or the sensor system 400 can actuate the imaging sensor 450 in a side-to-side and/or up and down scanning manner to create a relatively wider and/or taller field of view to perform robust ODOA. Panning the imaging sensor 450 (by moving the imaging axis 455) increases an associated horizontal and/or vertical field of view, which may allow the imaging sensor 450 to view not only all or a portion of its dead zone 453, but the dead zone 453 of another imaging sensor 450 on the robot 100.

In some examples, each imaging sensor 450 may have an associated actuator (not shown) moving the imaging sensor 450 in the scanning motion. In additional examples, the imaging sensor 450 includes an associated rotating a mirror, prism, variable angle micro-mirror, or MEMS mirror array to increase the field of view 452 and/or detection field 457 of the imaging sensor 450.

Figure 20:
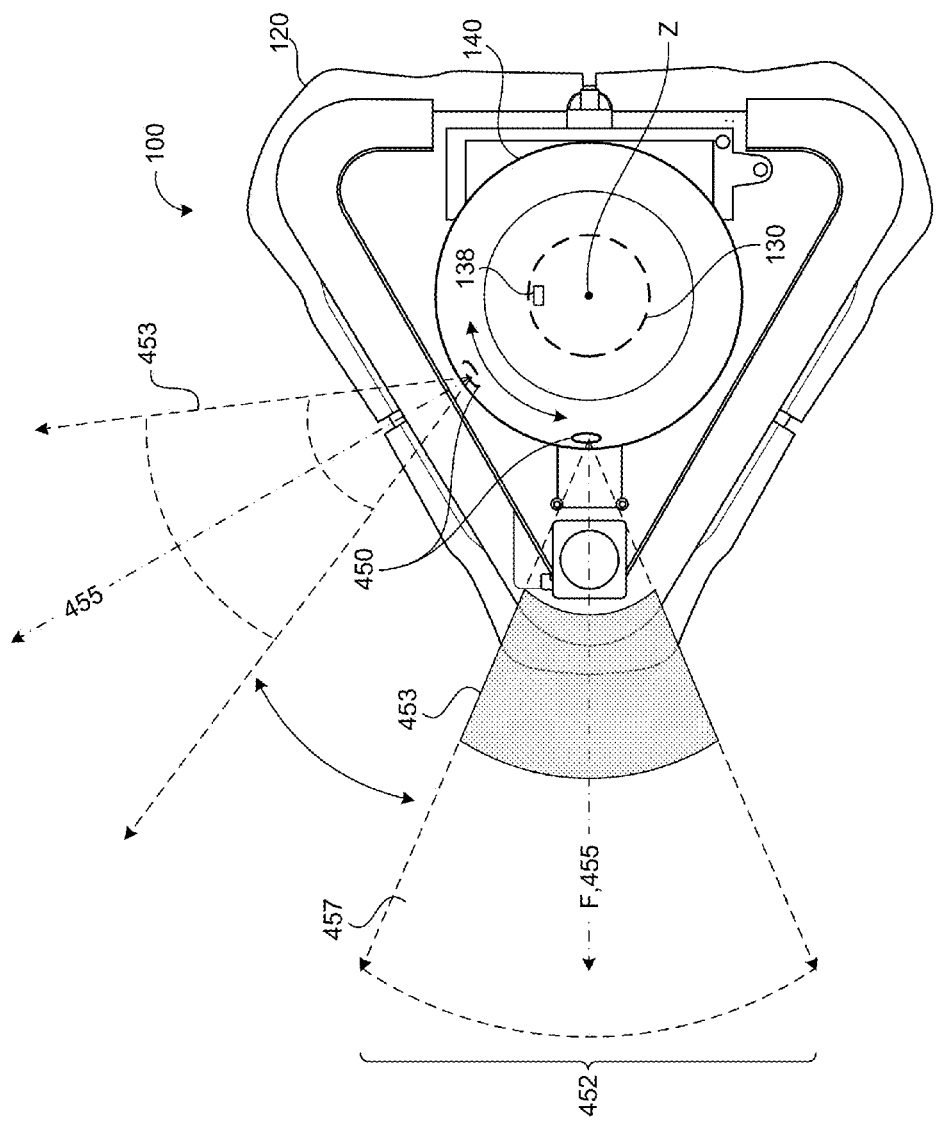
FIG. 20 is a top view of an exemplary mobile robot having a torso rotating with respect to its base.

In the example shown in FIG. 20, the torso 140 pivots about the Z-axis on the leg 130, allowing the robot 100 to move an imaging sensor 450 disposed on the torso 140 with respect to the forward drive direction F defined by the base 120. In some examples, the leg 130 pivots about the Z-axis, thus moving the torso 140 about the Z-axis. In either example, an actuator 138 (such as a rotary actuator) in communication with the controller 500 rotates the torso 140 with respect to the base 120 (e.g., by either rotating the torso 140 with respect to the leg 130 and/or rotating the leg 130 with respect to the base 120). The rotating torso 140 moves the imaging sensor 450 in a panning motion about the Z-axis providing up to a 360° field of view 452 about the robot 100. The robot 100 may pivot the torso 140 in a continuous 360° or +/− an angle ≤180° with respect to the forward drive direction F.

Figure 21:
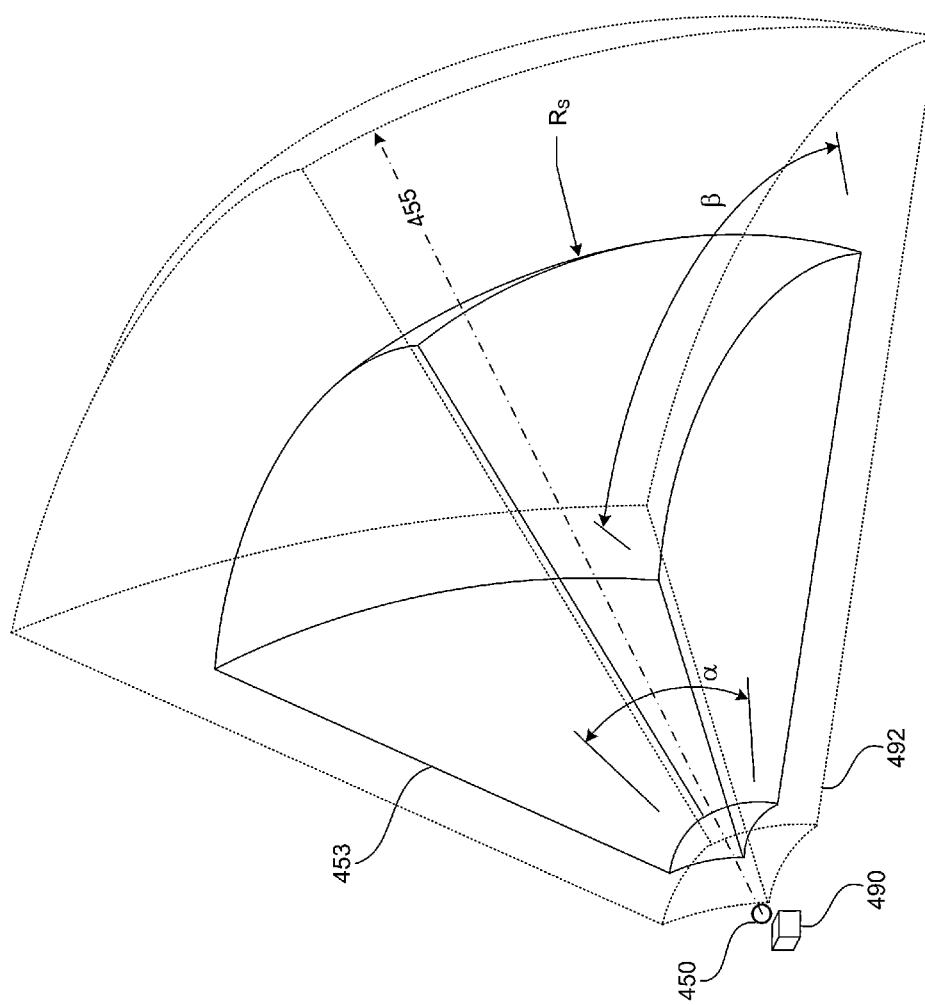
FIG. 21 is a schematic view of an exemplary imaging sensor having a dead zone and a dead zone sensor having a field of view enveloping the dead zone.
Figure 22:
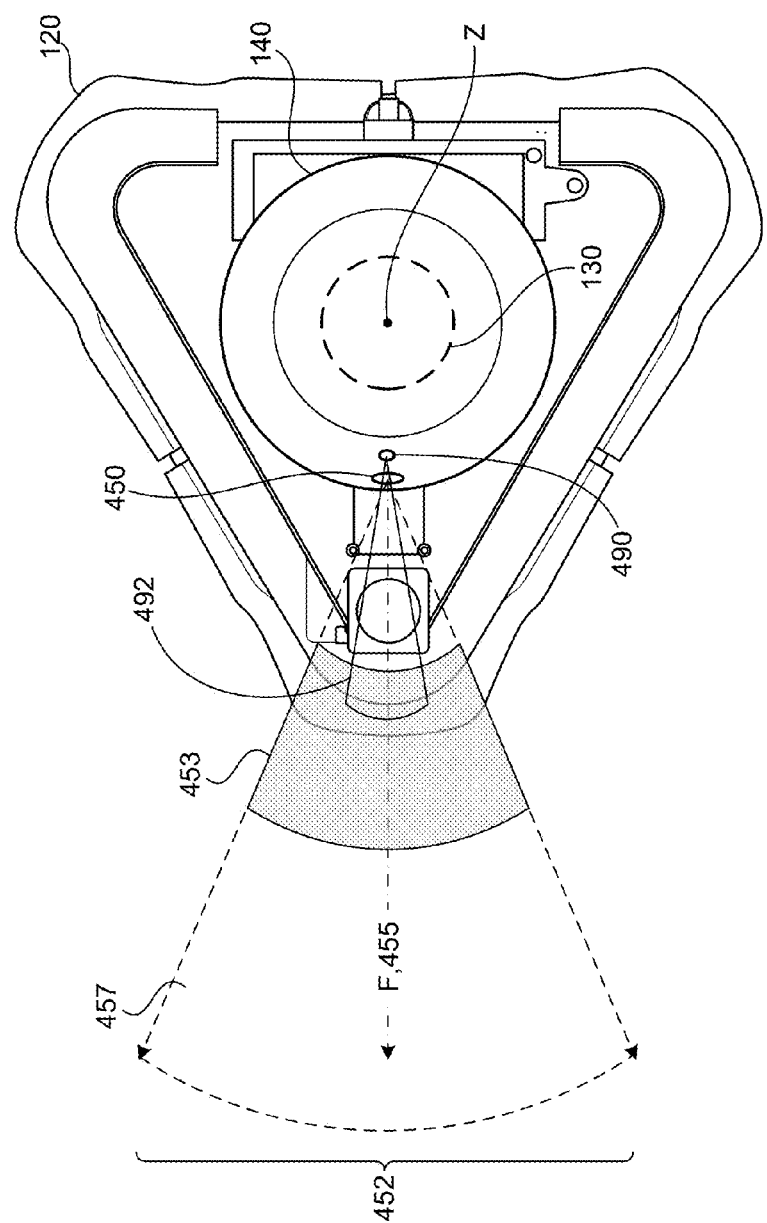
FIG. 22 is a top view of an exemplary mobile robot having a dead zone sensor arranged to detect objects in a dead zone of an imaging sensor.

Referring to FIG. 21, in some implementations, the robot 100 includes a dead zone sensor 490 associated with each imaging sensor 450 and arranged to sense objects within the dead zone 453 of the associated imaging sensor 450. The dead zone sensor 490 may be a sonar sensor, camera, ultrasonic sensor, LIDAR, LADAR, optical sensor, infrared sensor, etc. In the example shown, the dead zone sensor 490 is arranged to have field of view 492 enveloping or substantially enveloping the dead zone 453. FIG. 22 provides a top of view of a robot 100 having a dead zone sensor 490 disposed on the torso 140 adjacent the imaging sensor 450 and arranged to have its field view 492 extending into the dead zone 453. In the example shown the dead zone field of view 492 is substantially centered within the dead zone 453; however, other arrangements are possible as well (e.g., off-center).

Figure 23:
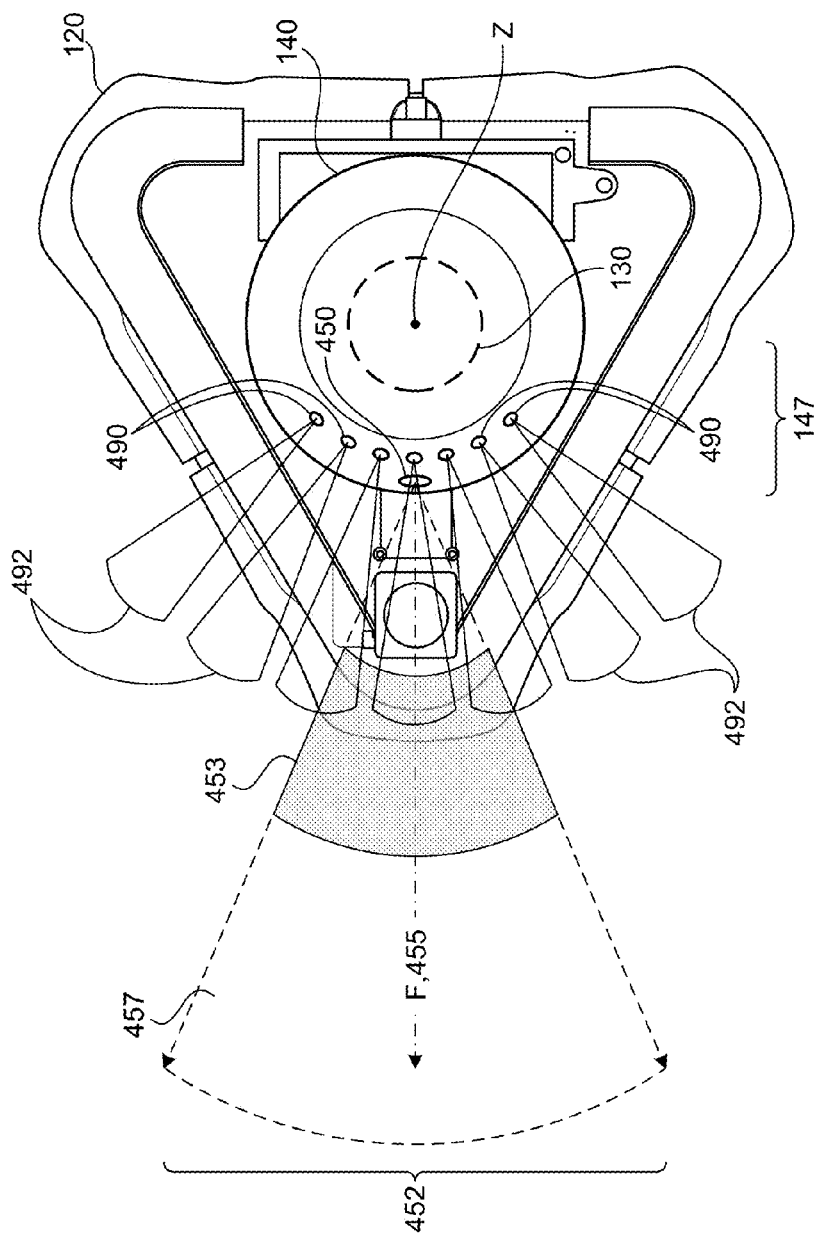
FIG. 23 is a top view of an exemplary mobile robot having an array of dead zone sensors.

FIG. 23 illustrates an exemplary robot 100 having an array of dead zone sensors 490 disposed on a forward portion 147 of the torso 140. The array of dead zone sensors 490 not only provide coverage of the dead zone 453 shown, but also additional areas about the robot 100 not previously within the field of view of a sensor (e.g., the areas on each side of the field of view 452 of the imaging sensor 450). This allows the robot 100 to sense nearby objects before moving or turning into them.

Figure 24:
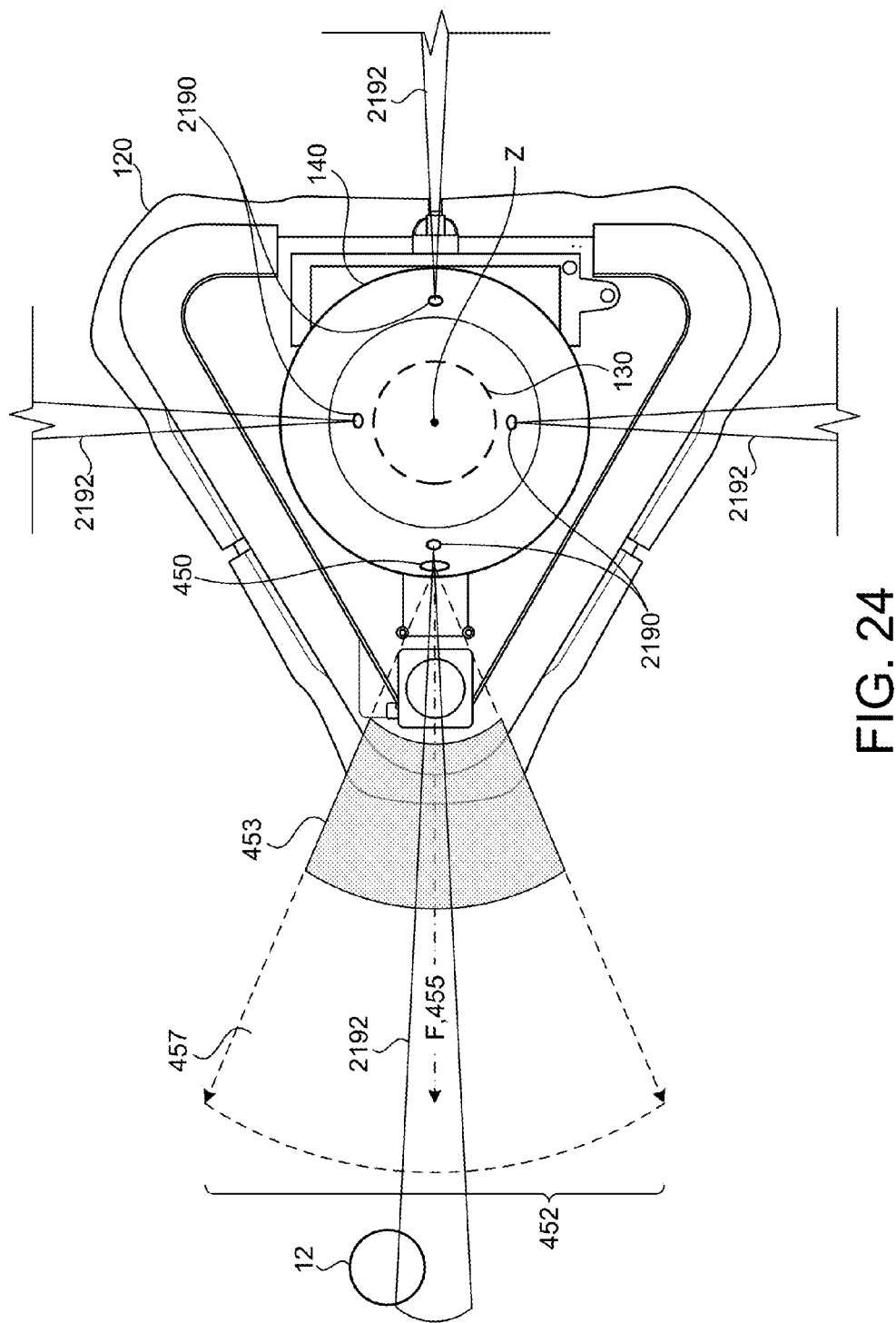
FIG. 24 is a top view of an exemplary mobile robot having long range sensors arranged about a vertical axis of the robot.

In the example shown in FIG. 24, the robot 100 includes at least one long range sensor 2190 arranged and configured to detect an object 12 relatively far away from the robot 100 (e.g., >3 meters). The long range sensor 2190 may be an imaging sensor 450 (e.g., having optics or a zoom lens configured for relatively long range detection). In additional examples, the long range sensor 2190 is a camera (e.g., with a zoom lens), a laser range finder, LIDAR, RADAR, etc. In the example shown, the robot 100 includes four long range sensors 2190 arranged with corresponding fields of view 2192 along forward, aft, right, and left drive directions. Other arrangements are possible as well.

Detection of far off objects allows the robot 100 (via the controller 500) to execute navigational routines to avoid the object, if viewed as an obstacle, or approach the object, if viewed as a destination (e.g., for approaching a person for executing a video conferencing session). Awareness of objects outside of the field of view of the imaging sensor(s) 450 on the robot 100, allows the controller 500 to avoid movements that may place the detected object 12 in a dead zone 453. Moreover, in person following routines, when a person moves out of the field of view of an imaging sensor 450, the long range sensor 2190 may detect the person and allow the robot 100 to maneuver to regain perception of the person in the field of view 452 of the imaging sensor 450.

Referring to FIG. 25, in some implementations, the controller 500 (e.g., a device having one or more computing processors in communication with memory capable of storing instructions executable on the computing processor(s)) executes a control system 510, which includes a behavior system 510a and a control arbitration system 510b in communication with each other. The control arbitration system 510b allows robot applications 520 to be dynamically added and removed from the control system 510, and facilitates allowing applications 520 to each control the robot 100 without needing to know about any other applications 520. In other words, the control arbitration system 510b provides a simple prioritized control mechanism between applications 520 and resources 540 of the robot 100. The resources 530 may include the drive system 200, the sensor system 400, and/or any payloads or controllable devices in communication with the controller 500.

The applications 520 can be stored in memory of or communicated to the robot 100, to run concurrently on (e.g., on a processor) and simultaneously control the robot 100. The applications 520 may access behaviors 600 of the behavior system 510a. The independently deployed applications 520 are combined dynamically at runtime and to share robot resources 540 (e.g., drive system 200, leg 130, torso 140, neck 150 and/or head 160) of the robot 100. A low-level policy is implemented for dynamically sharing the robot resources 540 among the applications 520 at run-time. The policy determines which application 520 has control of the robot resources 540 required by that application 520 (e.g. a priority hierarchy among the applications 520). Applications 520 can start and stop dynamically and run completely independently of each other. The control system 510 also allows for complex behaviors 600 which can be combined together to assist each other.

The control arbitration system 510b includes one or more application(s) 520 in communication with a control arbiter 560. The control arbitration system 510b may include components that provide an interface to the control arbitration system 510b for the applications 520. Such components may abstract and encapsulate away the complexities of authentication, distributed resource control arbiters, command buffering, coordinate the prioritization of the applications 520 and the like. The control arbiter 560 receives commands from every application 520 generates a single command based on the applications' priorities and publishes it for its associated resources 540. The control arbiter 560 receives state feedback from its associated resources 540 and may send it back up to the applications 520. The robot resources 540 may be a network of functional modules (e.g. actuators, drive systems, and groups thereof) with one or more hardware controllers. The commands of the control arbiter 560 are specific to the resource 540 to carry out specific actions.

A dynamics model 530 executable on the controller 500 is configured to compute the center for gravity (CG), moments of inertia, and cross products of inertial of various portions of the robot 100 for the assessing a current robot state. The dynamics model 530 may be configured to calculate the center of gravity $CG_R$ of the robot 100, the center of gravity $CG_B$ of the base 120, the center of gravity $CG_L$ of the leg 130, the center of gravity of other portions of the robot 100. The dynamics model 530 may also model the shapes, weight, and/or moments of inertia of these components. In some examples, the dynamics model 530 communicates with the inertial moment unit (IMU) 470 or portions of one (e.g., accelerometers and/or gyros) in communication with the controller 500 for calculating the various centers of gravity of the robot 100. The dynamics model 530 can be used by the controller 500, along with other programs 520 or behaviors 600 to determine operating envelopes of the robot 100 and its components.

In some implementations, a behavior 600 is a plug-in component that provides a hierarchical, state-full evaluation function that couples sensory feedback from multiple sources, such as the sensor system 400, with a-priori limits and information into evaluation feedback on the allowable actions of the robot 100. Since the behaviors 600 are pluggable into the application 520 (e.g. residing inside or outside of the application 520), they can be removed and added without having to modify the application 520 or any other part of the control system 510. Each behavior 600 is a standalone policy. To make behaviors 600 more powerful, it is possible to attach the output of multiple behaviors 600 together into the input of another so that you can have complex combination functions. The behaviors 600 are intended to implement manageable portions of the total cognizance of the robot 100.

In the example shown, the behavior system 510a includes an obstacle detection/obstacle avoidance (ODOA) behavior 600a for determining responsive robot actions based on obstacles perceived by the sensor (e.g., turn away; turn around; stop before the obstacle, etc.). A person follow behavior 600b may be configured to cause the drive system 200 to follow a particular person based on sensor signals of the sensor system 400 (providing a local sensory perception). A speed behavior 600c (e.g., a behavioral routine executable on a processor) may be configured to adjust the speed setting of the robot 100 and a heading behavior 600d may be configured to alter the heading setting of the robot 100. The speed and heading behaviors 600c, 600d may be configured to execute concurrently and mutually independently. For example, the speed behavior 600c may be configured to poll one of the sensors (e.g., the set(s) of proximity sensors 410), and the heading behavior 600d may be configured to poll another sensor (e.g., the kinetic bump sensor).

Figure 25A:
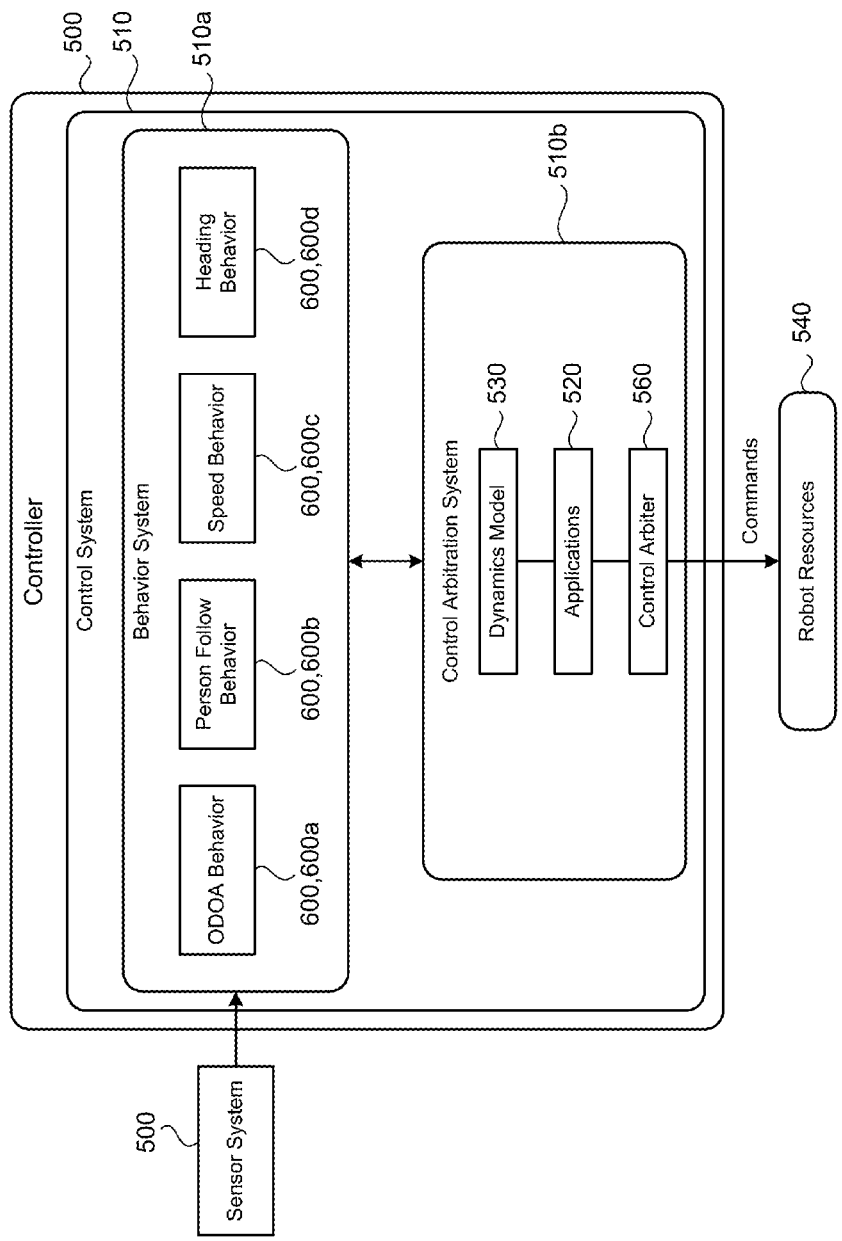
FIG. 25A is a schematic view of an exemplary control system executed by a controller of a mobile robot.
Figure 25B:
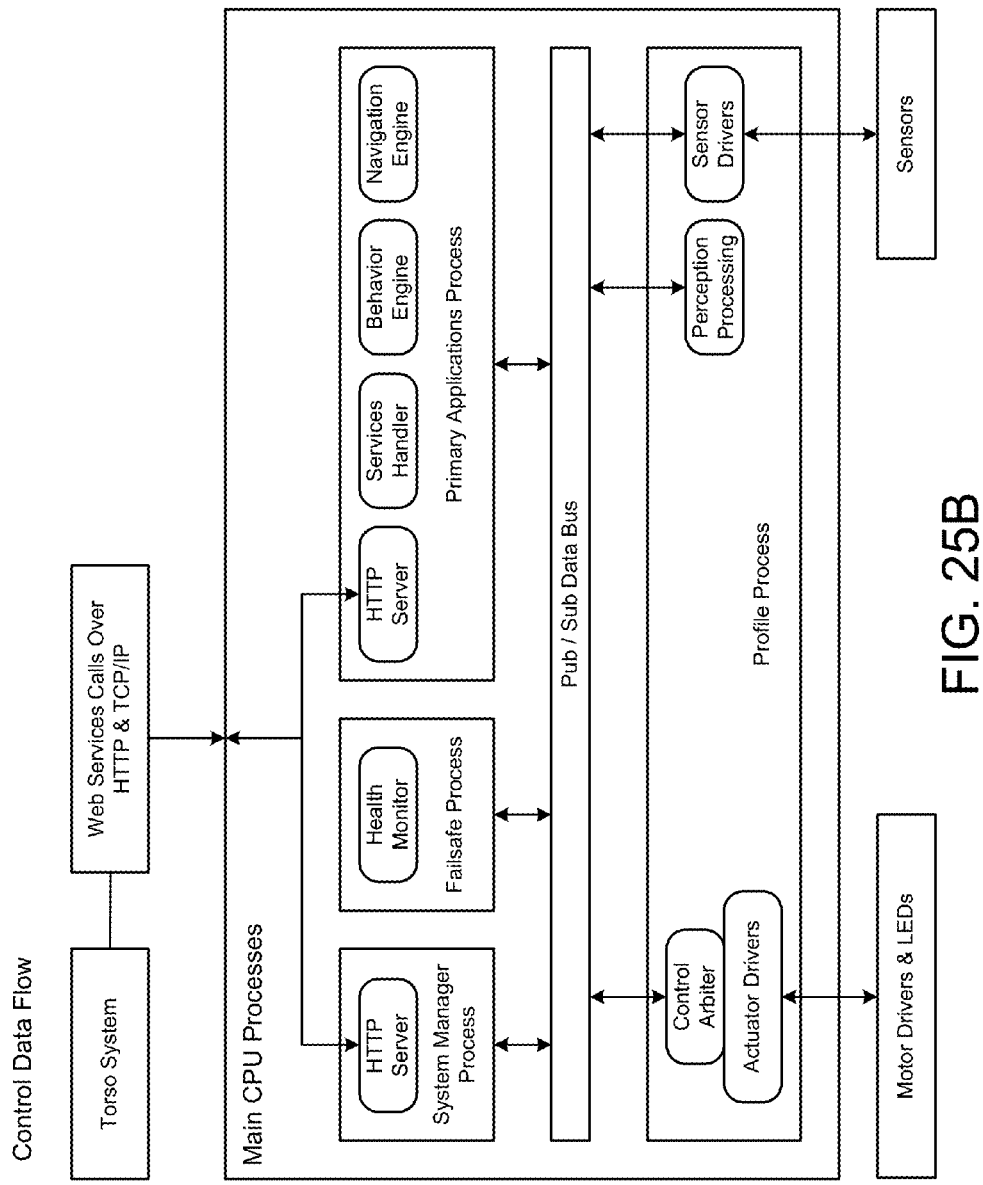
FIG. 25B is a schematic view of an exemplary processes executed by a controller of a mobile robot.

Referring to FIGS. 25A and 25B, in some implementations, the controller 500 (e.g., a device having one or more computing processors in communication with memory capable of storing instructions executable on the computing processor(s)) executes a control system 510, which includes a behavior system 510a and a control arbitration system 510b in communication with each other. The control arbitration system 510b allows robot applications 520 to be dynamically added and removed from the control system 510, and facilitates allowing applications 520 to each control the robot 100 without needing to know about any other applications 520. In other words, the control arbitration system 510b provides a simple prioritized control mechanism between applications 520 and resources 540 of the robot 100.

The applications 520 can be stored in memory of or communicated to the robot 100, to run concurrently on (e.g., on a processor) and simultaneously control the robot 100. The applications 520 may access behaviors 600 of the behavior system 510a. The independently deployed applications 520 are combined dynamically at runtime and to share robot resources 540 (e.g., drive system 200, leg 130, torso 140, neck 150 and/or head 160) of the robot 100. A low-level policy is implemented for dynamically sharing the robot resources 540 among the applications 520 at run-time. The policy determines which application 520 has control of the robot resources 540 required by that application 520 (e.g. a priority hierarchy among the applications 520). Applications 520 can start and stop dynamically and run completely independently of each other. The control system 510 also allows for complex behaviors 600 which can be combined together to assist each other.

The control arbitration system 510b includes one or more application(s) 520 in communication with a control arbiter 560. The control arbitration system 510b may include components that provide an interface to the control arbitration system 510b for the applications 520. Such components may abstract and encapsulate away the complexities of authentication, distributed resource control arbiters, command buffering, coordinate the prioritization of the applications 520 and the like. The control arbiter 560 receives commands from every application 520 generates a single command based on the applications' priorities and publishes it for its associated resources 540. The control arbiter 560 receives state feedback from its associated resources 540 and may send it back up to the applications 520. The robot resources 540 may be a network of functional modules (e.g. actuators, drive systems, and groups thereof) with one or more hardware controllers. The commands of the control arbiter 560 are specific to the resource 540 to carry out specific actions.

A dynamics model 530 executable on the controller 500 is configured to compute the center for gravity (CG), moments of inertia, and cross products of inertial of various portions of the robot 100 for the assessing a current robot state. The dynamics model 530 may be configured to calculate the center of gravity $CG_R$ of the robot 100, the center of gravity $CG_B$ of the base 120, the center of gravity $CG_L$ of the leg 130, the center of gravity of other portions of the robot 100. The dynamics model 530 may also model the shapes, weight, and/or moments of inertia of these components. In some examples, the dynamics model 530 communicates with the inertial moment unit (IMU) 470 or portions of one (e.g., accelerometers and/or gyros) in communication with the controller 500 for calculating the various centers of gravity of the robot 100. The dynamics model 530 can be used by the controller 500, along with other programs 520 or behaviors 600 to determine operating envelopes of the robot 100 and its components.

In some implementations, a behavior 600 is a plug-in component that provides a hierarchical, state-full evaluation function that couples sensory feedback from multiple sources, such as the sensor system 400, with a-priori limits and information into evaluation feedback on the allowable actions of the robot 100. Since the behaviors 600 are pluggable into the application 520 (e.g. residing inside or outside of the application 520), they can be removed and added without having to modify the application 520 or any other part of the control system 510. Each behavior 600 is a standalone policy. To make behaviors 600 more powerful, it is possible to attach the output of multiple behaviors 600 together into the input of another so that you can have complex combination functions. The behaviors 600 are intended to implement manageable portions of the total cognizance of the robot 100.

In the example shown, the behavior system 510a includes an obstacle detection/obstacle avoidance (ODOA) behavior 600a for determining responsive robot actions based on obstacles perceived by the sensor (e.g., turn away; turn around; stop before the obstacle, etc.). A person follow behavior 600b may be configured to cause the drive system 200 to follow a particular person based on sensor signals of the sensor system 400 (providing a local sensory perception). A speed behavior 600c (e.g., a behavioral routine executable on a processor) may be configured to adjust the speed setting of the robot 100 and a heading behavior 600d may be configured to alter the heading setting of the robot 100. The speed and heading behaviors 600c, 600d may be configured to execute concurrently and mutually independently. For example, the speed behavior 600c may be configured to poll one of the sensors (e.g., the set(s) of proximity sensors 410), and the heading behavior 600d may be configured to poll another sensor (e.g., the kinetic bump sensor).

Figure 26:
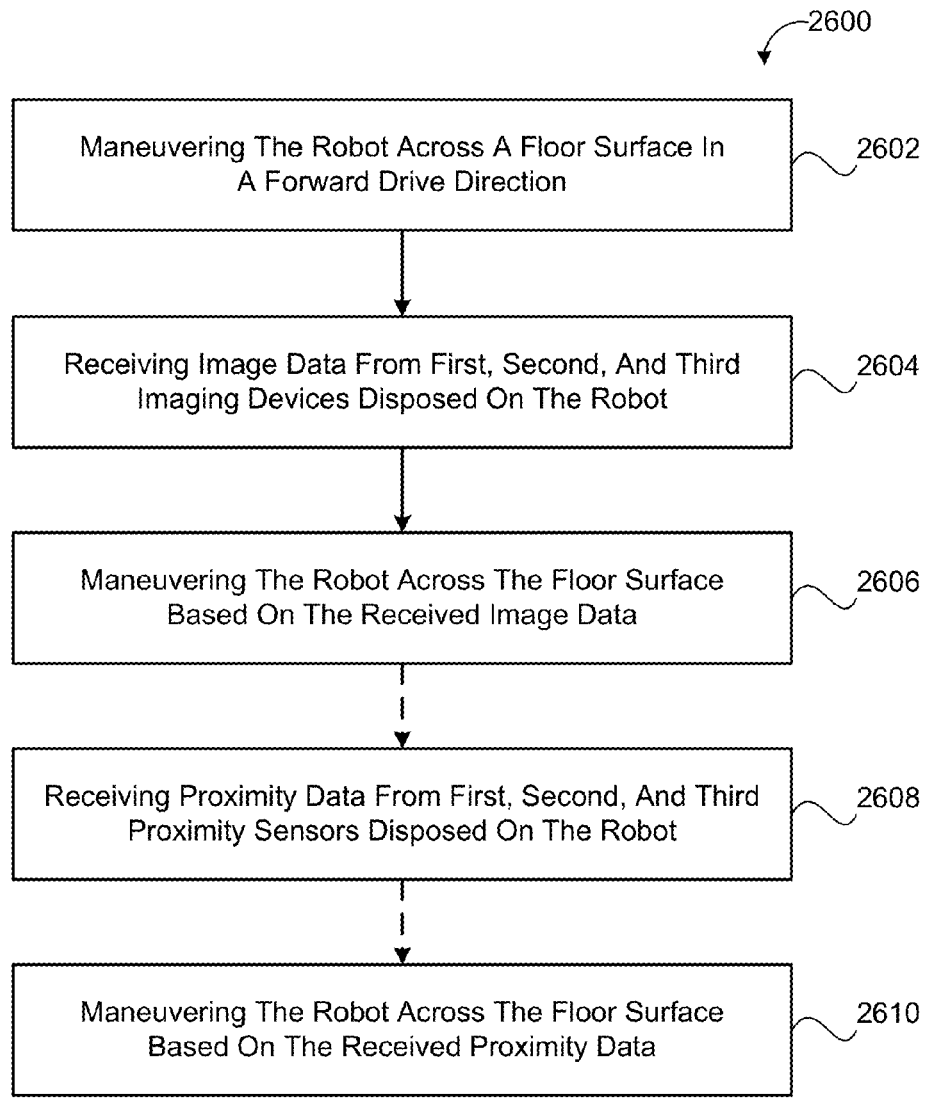
FIG. 26 provides an exemplary arrangement of operations for a method of operating a mobile robot.

FIG. 26 provides an exemplary arrangement 2600 of operations for a method of operating a mobile robot 100. The method includes maneuvering 2602 the robot 100 across a floor surface in a forward drive direction F, receiving 2604 image data from first, second, and third imaging devices 450a, 450b, 450c disposed on the robot 100, and maneuvering 2606 the robot across the floor surface based on the received image data. The first imaging sensor 450a is arranged to aim downward and away from the robot 100 (e.g., along the forward direction F). The second imaging sensor 450b is arranged to aim substantially parallel with the floor surface. The third imaging sensor 450c is arranged to aim upward and away from the robot 100 (e.g., along the forward direction F).

In some implementations, the method includes receiving three-dimensional depth image data of a scene 10 about the robot 100 along a drive direction F of the robot 100, determining a local perceptual space corresponding to an environment around the robot 100 based on the received three-dimensional depth image data, and determining a location of an object 12 in the scene 10. The method includes assigning a confidence level for the object location and maneuvering the robot 100 in the scene 10 based on the object location and corresponding confidence level. The method may include constructing an object occupancy map 1200 of the scene 10. In some examples, the method includes degrading the confidence level of each object location over time unless persisted with updated three-dimensional depth image data.

The method may include scanning at least one imaging sensor 450 side-to-side with respect to the forward drive direction F to increase a lateral field of view 452 of the imaging sensor 450.

In some implementations, the method includes receiving 2608 proximity data from first, second, and third proximity sensors 410a, 410b, 410c disposed on the robot 100 and maneuvering 2610 the robot 100 across the floor surface based on the received proximity data. The first proximity sensor 410a has a sensing axis 412a arranged substantially parallel with an imaging axis 455a of the first imaging sensor 450a. The second proximity sensor 410b has a sensing axis 412b arranged substantially parallel with an imaging axis 455b of the second imaging sensor 450b. The third proximity sensor 410c has a sensing axis 412c arranged substantially parallel with an imaging axis 455c of the third imaging sensor 450c.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A mobile robot comprising:
   a robot body;
   a drive system supporting the robot body and configured to maneuver the robot over a floor surface, the drive system having a forward drive direction;
   a controller in communication with the drive system; and
   a sensor pod in communication with the controller, the sensor pod comprising:
      a first interface supported by the robot body;
      a second interface spaced from the first interface and configured to receive a payload;
      a collar rotatably supported between the first and second interfaces and having a curved wall formed at least partially as a surface of revolution about a vertical collar axis of rotation with respect to the floor surface;
      a volumetric point cloud sensor housed by the collar and observing the volume of space adjacent the robot from within the collar along an observation axis extending through the curved wall, the volumetric point cloud sensor capturing three dimensional volumetric point clouds representative of obstacles within the observed volume of space; and
      a collar actuator rotating the collar and the volumetric point cloud sensor together about the vertical collar axis of rotation relative to the first and second interfaces and the robot body;
      wherein all rotating portions of the volumetric point cloud sensor extend a lesser distance from the vertical collar axis than an outermost point of the collar.

2. The mobile robot of claim 1, wherein the surface of revolution of the curved wall sweeps about 360 degrees about the vertical collar axis to form a substantially complete perimeter of the collar.

3. The mobile robot of claim 1, wherein the collar actuator moves the collar both clockwise and counter clockwise about the vertical collar axis of rotation.

4. The mobile robot of claim 1, wherein the sensor pod further comprises a shroud covering the rotating collar.

5. The mobile robot of claim 1, wherein the sensor pod comprises at least two volumetric point cloud sensors arranged to observe the volume of space adjacent the mobile robot from within the collar along different observation axes extending through the curved wall, each volumetric point cloud sensors capturing separate three dimensional volumetric point clouds of obstacles within the observed volume of space.

6. The mobile robot of claim 5, wherein the captured separate three dimensional volumetric point clouds are of non-overlapping sub-volumes within the observed volume of space.

7. The mobile robot of claim 5, wherein the observation axes of the at least two volumetric point cloud sensors are angled with respect to a plane normal to the vertical collar axis to observe separate sub-volumes of the observed volume of space, the separate sub-volumes being displaced from one another along the vertical collar axis by a distance greater than twice a diameter of the collar.

8. The mobile robot of claim 1, wherein the observation axis of the volumetric point cloud sensor is angled with respect to a plane normal to the vertical collar axis to observe the volume of space adjacent the robot at a height along the vertical collar axis that is greater than or equal to a diameter of the collar.

9. The mobile robot of claim 1, wherein the sensor pod comprises:
   a first volumetric point cloud sensor housed by the collar and observing a volume of space adjacent the sensor pod from within the collar along a first observation axis extending through the curved wall, the first volumetric point cloud sensor capturing three dimensional volumetric point clouds representative of obstacles within the observed volume of space; and
   a second volumetric point cloud sensor housed by the collar and observing the volume of space adjacent the sensor pod from within the collar along a second observation axis extending through the curved wall, the second observation axis different from the first observation axis, the second volumetric point cloud sensor capturing three dimensional volumetric point clouds representative of obstacles within the observed volume of space.

10. The mobile robot of claim 9, wherein the first observation axis is arranged at an angle θa with respect to a plane normal to the vertical collar axis according to the following relationship:

$$\theta a = 90° - (\tfrac{1}{2} VFOV_a + \tan^{-1}((W-O_a)(H_a)))$$

wherein $VFOV_a$ is the vertical field of view of the first volumetric point cloud sensor, W is the width from a center vertical axis of the robot to a forward most edge of the robot, $O_a$ is an offset distance of the first volumetric point cloud sensor from the vertical collar axis, and $H_a$ is a height of the first volumetric point cloud sensor with respect to the forward most edge of the robot.

11. The mobile robot of claim 9, wherein the second observation axis is arranged at an angle θc with respect to a plane normal to the vertical collar axis according to the following relationship:

$$\theta c = 90° - (\tfrac{1}{2} VFOV_c + \tan^{-1}((W-O_c)/H_c))$$

wherein $VFOV_c$ is the vertical field of view of the second volumetric point cloud sensor, W is the width from a center vertical axis of the robot to a forward most edge of the robot, $O_c$ is an offset distance of the second volumetric point cloud sensor from the vertical collar axis, and $H_c$ is a height of the second volumetric point cloud sensor, W is the width from a center vertical axis of the robot to a forward most edge of the robot with respect to the forward most edge of the robot.

12. The mobile robot of claim 9, wherein the second volumetric point cloud sensor is offset from a center axis of the robot by an offset distance Ob equal to between about 0.8 and about 1.2 times an offset distance Ot between the first volumetric point cloud sensor and the center axis of the robot.

13. The mobile robot of claim 9, wherein the second volumetric point cloud sensor is offset from the center axis of the robot by an offset distance Ob substantially equal to an offset distance Ot between the first volumetric point cloud sensor and the center axis of the robot.

14. The mobile robot of claim 9, wherein the second observation axis is angled with respect to a plane normal to the vertical collar axis by an angle of between about 45° and about 65°.

15. The mobile robot of claim 1, further comprising an actuator moving a portion of the robot body through a volume of space adjacent the mobile robot, wherein the actuator moves, with at least one degree of freedom, a manipulator or an end effector extending from the robot body into the observed volume of space.

16. A sensor pod of a mobile robot having a robot body, the sensor pod comprising:

a first interface supported by the robot body;

a second interface spaced from the first interface and configured to receive a payload;

a collar rotatably supported between the first and second interfaces and having a curved wall formed at least partially as a surface of revolution about a vertical collar axis of rotation with respect to a floor surface supporting the mobile robot;

a first volumetric point cloud sensor housed by the collar and observing a volume of space adjacent the sensor pod from within the collar along a first observation axis extending through the curved wall, the first volumetric point cloud sensor capturing three dimensional volumetric point clouds representative of obstacles within the observed volume of space;

a second volumetric point cloud sensor housed by the collar and observing the volume of space adjacent the sensor pod from within the collar along a second observation axis extending through the curved wall, the second observation axis different from the first observation axis, the second volumetric point cloud sensor capturing three dimensional volumetric point clouds representative of obstacles within the observed volume of space; and a collar actuator rotating the collar and the first and second volumetric point cloud sensors together about the vertical collar axis of rotation relative to the first and second interfaces and the robot body.

17. The sensor pod of claim 16, wherein the observation axis of the second volumetric point cloud sensor is angled with respect to a plane normal to the vertical collar axis and with respect to the first observation axis to observe a sub-volume of the observed volume of space displaced along the vertical collar axis by a distance greater than or equal to a diameter of the collar.

18. The sensor pod of claim 16, wherein the first observation axis is angled with respect to a plane normal to the vertical collar axis by between about 45° and about 65°.

19. The sensor pod of claim 16, wherein all rotating portions of the volumetric point cloud sensors extend a lesser distance from the vertical collar axis of rotation than an outermost point of the collar.

20. The sensor pod of claim 16, wherein the surface of revolution of the curved wall sweeps about 360 degrees about the vertical collar axis to form a substantially complete perimeter of the collar.

21. A sensor pod of a mobile robot having a robot body, the sensor pod comprising:

a first interface supported by the robot body;

a second interface spaced from the first interface and configured to receive a payload;

a collar rotatably supported between the first and second interfaces, the collar having a curved wall formed at least partially as a surface of revolution about a vertical collar axis of rotation with respect to a floor surface supporting the mobile robot;

a volumetric point cloud sensor housed by the collar and observing the volume of space adjacent the robot from within the collar along an observation axis extending through the curved wall, the volumetric point cloud sensor capturing three dimensional volumetric point clouds representative of obstacles within the observed volume of space;

a collar actuator rotating the collar and the volumetric point cloud sensor together about the vertical collar axis of rotation relative to the first and second interfaces and the robot body; and a channel extending through the collar from the first interface to the second interface.

22. The sensor pod of claim 21, wherein all rotating portions of the volumetric point cloud sensor extend a lesser distance from the vertical collar axis than an outermost point of the collar.

23. The sensor pod of claim 21, wherein the volumetric point cloud sensor comprises:

a speckle emitter emitting a speckle pattern of light onto a scene about the sensor pod; and an imager receiving reflections of the speckle pattern from an object in the scene;

wherein a controller:

stores reference images of the speckle pattern as reflected off a reference object in the scene, the reference images captured at different distances from the reference object; and compares at least one target image of the speckle pattern as reflected off a target object in the scene with the reference images for determining a distance of the reflecting surfaces of the target object.

24. The sensor pod of claim 23, wherein the controller determines a primary speckle pattern on the target object and computes at least one of a respective cross-correlation and a decorrelation between the primary speckle pattern and the speckle patterns of the reference images.

25. The sensor pod of claim 21, wherein the volumetric point cloud sensor emits light onto a scene about the sensor pod and captures images of the scene, the volumetric point cloud sensor determines a time-of-flight between emitting the light and receiving reflected light from the scene.

* * * * *

UNITED STATES PATENT AND TRADEMARK OFFICE
CERTIFICATE OF CORRECTION

Page 1 of 1

PATENT NO. : 8,958,911 B2
APPLICATION NO. : 13/555529
DATED : February 17, 2015
INVENTOR(S) : Cheuk Wah Wong et al.

It is certified that error appears in the above-identified patent and that said Letters Patent is hereby corrected as shown below:

In the Claims,

At column 48, claim number 10, line number 22, should read

" $\theta a = 90° - \left(\frac{1}{2} VFOV_a + \tan^{-1}((W - O_a)/H_a)\right)$ ".

Signed and Sealed this
Eighth Day of September, 2015

Michelle K. Lee
*Director of the United States Patent and Trademark Office*